United States Patent
Mladek et al.

(10) Patent No.: US 9,532,561 B2
(45) Date of Patent: Jan. 3, 2017

(54) DEVICE FOR KILLING INSECTS WITH HEAT

(71) Applicants: Harold Richard Mladek, Ravenna, OH (US); Jeffrey Lynn Nichols, Uniontown, OH (US)

(72) Inventors: Harold Richard Mladek, Ravenna, OH (US); Jeffrey Lynn Nichols, Uniontown, OH (US)

( * ) Notice: Subject to any disclaimer, the term of this patent is extended or adjusted under 35 U.S.C. 154(b) by 252 days.

(21) Appl. No.: 14/145,878

(22) Filed: Dec. 31, 2013

(65) Prior Publication Data

US 2015/0181856 A1 Jul. 2, 2015

(51) Int. Cl.
*A01M 1/20* (2006.01)
*A01M 19/00* (2006.01)

(52) U.S. Cl.
CPC .............. *A01M 1/2094* (2013.01); *A01M 1/20* (2013.01); *A01M 19/00* (2013.01)

(58) Field of Classification Search
CPC ........ A01M 1/2094; A01M 1/20; A01M 1/22; A01M 19/00
USPC ...... 43/123, 132.1, 124; 126/9 R, 9 B, 21 A, 126/21 R; 219/385, 386, 391, 402, 405, 219/408, 409
See application file for complete search history.

(56) References Cited

U.S. PATENT DOCUMENTS

| | | | | |
|---|---|---|---|---|
| 497,275 A | * | 5/1893 | Glasman | ............. A47J 37/0763 126/9 R |
| 1,456,382 A | * | 5/1923 | Kincannon | ............. F24B 1/003 126/9 B |
| 2,119,799 A | * | 6/1938 | Sivey | ...................... F24B 1/205 126/9 R |
| 2,645,993 A | * | 7/1953 | Voss | ........................ A23B 4/052 126/9 R |
| 3,146,773 A | * | 9/1964 | Melzer | ................ A47J 37/0763 126/9 R |
| 3,437,085 A | * | 4/1969 | Perry | ...................... F23C 3/006 126/21 A |
| 3,452,369 A | * | 7/1969 | Jones | ..................... A61H 33/06 219/400 |
| 3,489,131 A | * | 1/1970 | Richins | ................... F24B 1/205 126/9 R |
| 3,529,582 A | * | 9/1970 | Hurko | ................... F24C 15/325 126/21 R |
| 3,858,495 A | * | 1/1975 | Gotwalt | .............. A47J 37/0694 99/421 A |

(Continued)

*Primary Examiner* — Darren W Ark
(74) *Attorney, Agent, or Firm* — Lonnie R Drayer

(57) ABSTRACT

A device for killing insects, such as bedbugs, with heat includes four side panels and two end panels. Each of the side panels is fixed to two adjacent side panels along complementary mitered edges provided with interlocking male protrusions and female indentations. The side panels are fixed to the end panels by portions of the side panels that mate with complementary channels provided by the end panels and locking mechanisms. The device further includes a mechanism located either inside or outside the device for providing heated air to the interior of the device and a mechanism for circulating the heated air inside the device for killing any insects that may be infesting items such as clothing and bedding placed inside the device. The interior of the device may be provided with mechanisms such as racks and hanger rods for supporting items placed inside the device. The interior of the device may be provided with mechanisms for directing the flow of hot air inside the device.

20 Claims, 60 Drawing Sheets

(56) References Cited

U.S. PATENT DOCUMENTS

| | | | | |
|---|---|---|---|---|
| 4,336,443 A * | 6/1982 | Benedetto | F27D 11/02 126/21 A |
| 4,374,318 A * | 2/1983 | Gilliom | A47J 37/0623 126/21 A |
| 4,392,038 A * | 7/1983 | Day | H05B 6/6405 126/21 A |
| 4,430,541 A * | 2/1984 | Day, Jr. | F24C 15/322 126/21 A |
| 4,455,924 A * | 6/1984 | Wenzel | F24C 15/327 126/21 A |
| 4,569,327 A * | 2/1986 | Velten | A47J 37/0763 126/9 R |
| 4,627,409 A * | 12/1986 | Kagomoto | F24C 15/322 126/21 A |
| 4,817,329 A * | 4/1989 | Forbes | A01M 1/2094 43/132.1 |
| 4,829,158 A * | 5/1989 | Burnham | F24C 15/325 126/21 A |
| 4,922,887 A * | 5/1990 | Foxford | F24C 3/14 126/9 R |
| 4,961,283 A * | 10/1990 | Forbes | A01M 1/2094 43/132.1 |
| 4,971,045 A * | 11/1990 | Probst | F24B 1/205 126/9 B |
| 5,047,610 A * | 9/1991 | Chang | F24C 15/322 126/21 A |
| 5,119,799 A * | 6/1992 | Cowan | F24B 1/022 126/9 R |
| 5,160,829 A * | 11/1992 | Chang | A47J 37/0623 126/21 A |
| 5,203,108 A * | 4/1993 | Washburn, Jr. | A01M 17/008 43/132.1 |
| 5,279,214 A * | 1/1994 | Lamendola | A47J 37/0704 126/9 R |
| 5,285,770 A * | 2/1994 | Kim | A47J 37/079 126/9 B |
| 5,575,195 A * | 11/1996 | Foxford | A47J 37/0763 126/9 B |
| 5,584,233 A * | 12/1996 | Glucksman | A21B 7/005 126/21 A |
| 5,588,355 A * | 12/1996 | Mead | A23B 4/052 126/38 |
| 5,711,210 A * | 1/1998 | Kaufman | A47J 27/10 126/9 R |
| 5,801,362 A * | 9/1998 | Pearlman | A47J 37/0623 126/21 A |
| 6,026,802 A * | 2/2000 | Patterson | F24C 1/16 126/9 B |
| 6,035,768 A * | 3/2000 | Kaufman | A47J 33/00 126/9 R |
| 6,069,344 A * | 5/2000 | Krasznai | F24C 15/322 219/400 |
| 6,307,185 B1 * | 10/2001 | Loveless | F24C 7/10 219/400 |
| 6,321,640 B1 * | 11/2001 | Tseng | A47J 37/0704 126/9 R |
| 6,425,387 B1 * | 7/2002 | Rohback, Jr. | F24B 1/205 126/9 R |
| 6,439,111 B1 * | 8/2002 | Lu | A47J 37/0763 126/9 R |
| 6,681,757 B1 * | 1/2004 | Rivero | F24B 1/022 126/9 R |
| 6,708,604 B1 * | 3/2004 | Deichler, Jr. | A47J 37/0763 126/9 R |
| 6,905,332 B1 * | 6/2005 | Neal | A21B 1/24 110/336 |
| 7,049,567 B2 * | 5/2006 | Kim | H05B 6/6429 126/21 A |
| 7,216,464 B2 * | 5/2007 | Neal | A21B 1/24 126/19 R |
| 7,235,763 B2 * | 6/2007 | Christiaansen | H05B 6/6485 219/460.1 |
| 8,028,689 B2 * | 10/2011 | Bruno | A47J 37/079 126/9 B |
| 8,272,375 B1 * | 9/2012 | Bourgeois | F24C 5/20 126/9 R |
| 8,479,439 B2 | 7/2013 | DeMonte et al. | |
| 8,479,440 B2 | 7/2013 | DeMonte et al. | |
| 8,689,481 B2 * | 4/2014 | Lindsey | A01M 1/2094 43/132.1 |
| 8,701,649 B2 * | 4/2014 | Kukuliyev | A47J 37/0763 126/9 B |
| 8,742,296 B2 * | 6/2014 | Bermudez | A47C 31/007 43/132.1 |
| 9,101,125 B2 * | 8/2015 | Knote | A01M 1/2094 |
| 9,226,489 B2 * | 1/2016 | Pattison | A01M 1/2094 |
| 9,265,241 B2 * | 2/2016 | Raud | A01M 1/2094 |
| 9,326,498 B2 * | 5/2016 | Lindsey | A01M 1/2094 |
| 9,339,021 B2 * | 5/2016 | Lander | A01M 1/2088 |
| 9,345,796 B2 * | 5/2016 | Stewart | A61L 2/10 |
| 2005/0108920 A1 * | 5/2005 | Takenoshita | A01M 17/008 43/132.1 |
| 2007/0006863 A1 * | 1/2007 | Barbarich | A47J 37/0763 126/9 R |
| 2009/0211148 A1 * | 8/2009 | McCarty | A01M 1/2094 43/124 |
| 2009/0302023 A1 * | 12/2009 | Caterina | H05B 3/267 219/386 |
| 2010/0329649 A1 | 12/2010 | Potter et al. | |
| 2011/0186558 A1 | 8/2011 | Campbell | |
| 2011/0289825 A1 * | 12/2011 | James | A01M 1/2094 43/132.1 |
| 2011/0308139 A1 * | 12/2011 | James | A01M 1/2094 43/132.1 |
| 2012/0060407 A1 | 3/2012 | Lindsey | |
| 2012/0186138 A1 * | 7/2012 | Bell | A01M 13/003 43/125 |
| 2012/0186139 A1 | 7/2012 | O'Brien et al. | |
| 2012/0186140 A1 * | 7/2012 | Raud | A01M 1/2094 43/132.1 |
| 2012/0192479 A1 * | 8/2012 | Schmitz | A01M 1/2094 43/132.1 |
| 2012/0204478 A1 | 8/2012 | Gere et al. | |
| 2012/0204852 A1 * | 8/2012 | Boucher | F24C 1/16 126/9 B |
| 2012/0233907 A1 | 9/2012 | Pattison et al. | |
| 2012/0285944 A1 | 11/2012 | Bermudez | |
| 2012/0304528 A1 | 12/2012 | Hosli et al. | |
| 2013/0044997 A1 | 2/2013 | French | |
| 2013/0145681 A1 | 6/2013 | Lindsey | |
| 2013/0220313 A1 * | 8/2013 | Ellis | A47J 33/00 126/9 B |
| 2013/0263496 A1 * | 10/2013 | Maloney | A01M 1/2094 43/132.1 |
| 2013/0269239 A1 * | 10/2013 | Whitley | A01M 19/00 43/132.1 |
| 2014/0013653 A1 * | 1/2014 | Lander | A01M 1/2088 43/132.1 |
| 2014/0041284 A1 * | 2/2014 | Nugent | A01M 1/2094 43/132.1 |
| 2014/0261371 A1 * | 9/2014 | Van Camp | A21B 1/245 126/21 A |
| 2014/0261372 A1 * | 9/2014 | Knight | F24B 1/207 126/21 A |
| 2014/0290124 A1 * | 10/2014 | Aidan | A01M 1/2094 43/132.1 |
| 2015/0000185 A1 * | 1/2015 | Pratt | A01M 5/02 43/132.1 |
| 2015/0052800 A1 * | 2/2015 | Timbrook, Jr. | A01M 1/2094 43/132.1 |
| 2015/0082688 A1 * | 3/2015 | Schmitz | A01M 1/2094 43/132.1 |
| 2015/0128483 A1 * | 5/2015 | Krupp | F24H 3/025 43/132.1 |
| 2015/0181857 A1 * | 7/2015 | Mladek | A01M 1/2094 43/132.1 |

(56) References Cited

U.S. PATENT DOCUMENTS

| | | | |
|---|---|---|---|
| 2015/0223443 A1* | 8/2015 | Lindsey | A01M 1/2094 43/124 |
| 2015/0230622 A1* | 8/2015 | Orbelian | A47C 31/007 43/132.1 |
| 2016/0073623 A1* | 3/2016 | Pattison | A01M 1/2094 43/132.1 |

* cited by examiner

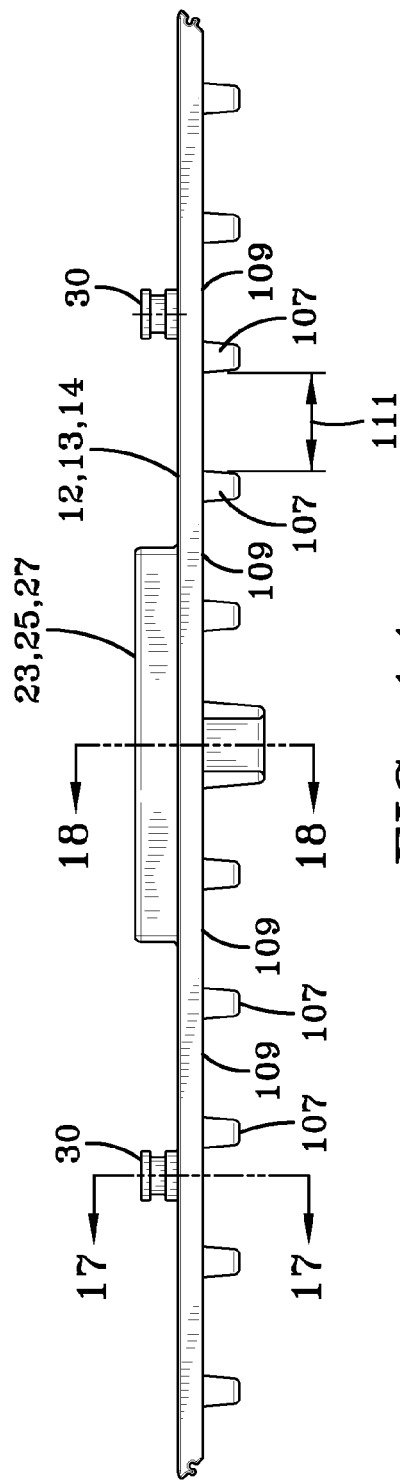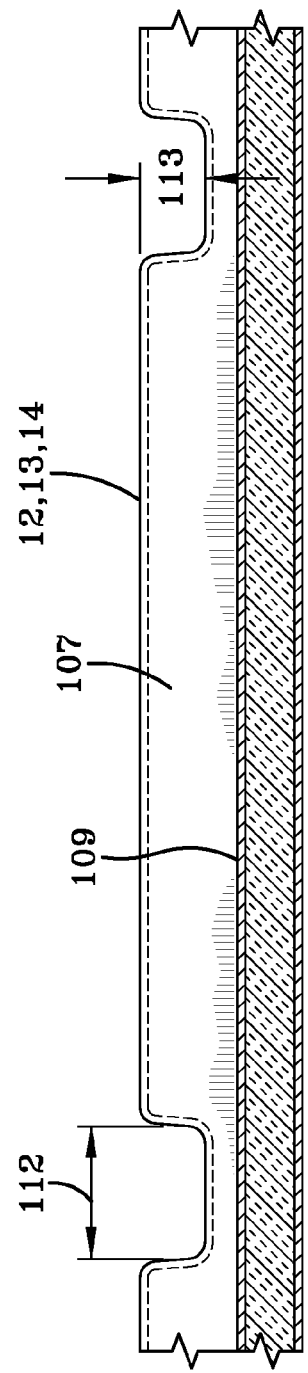

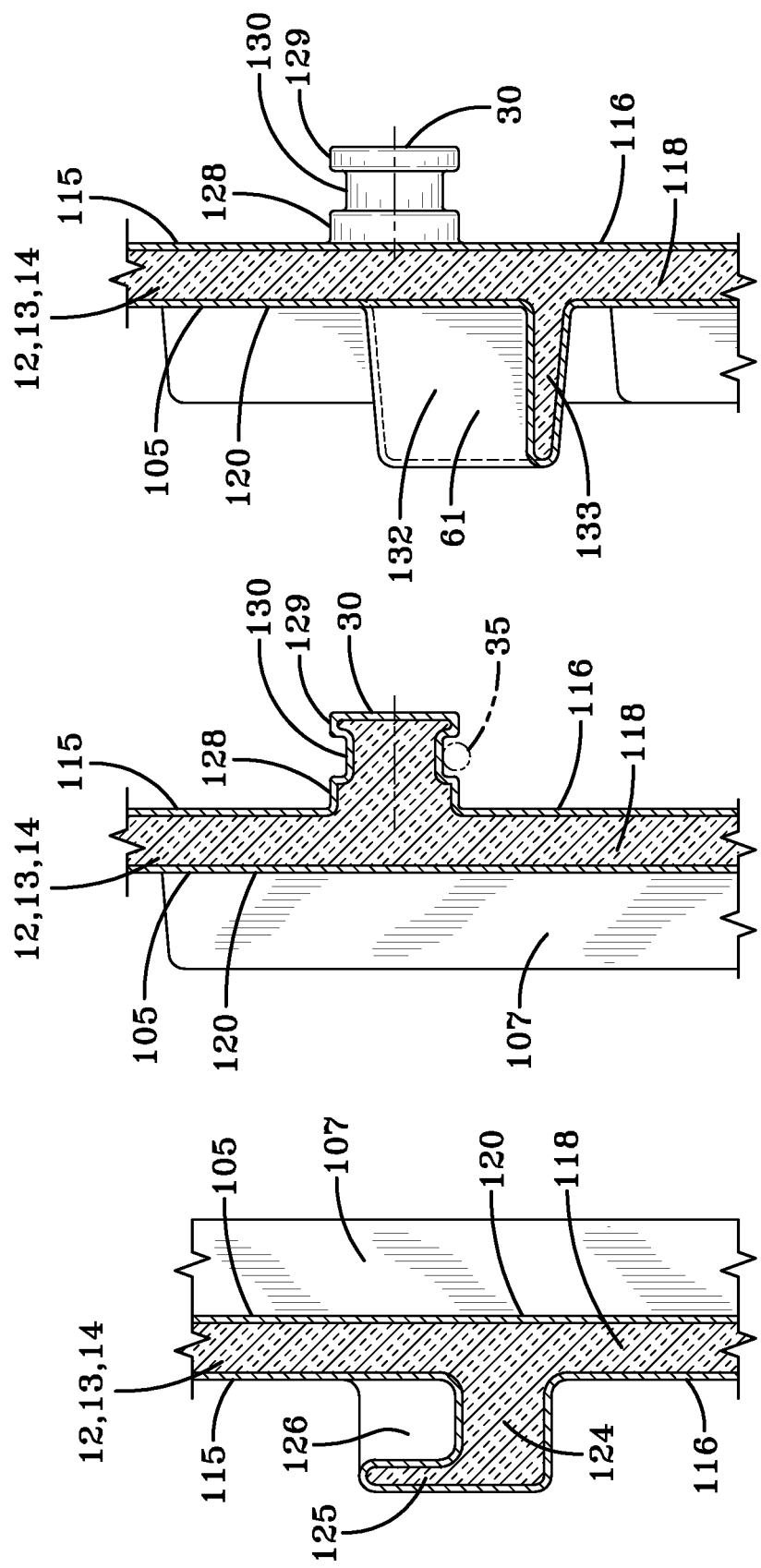

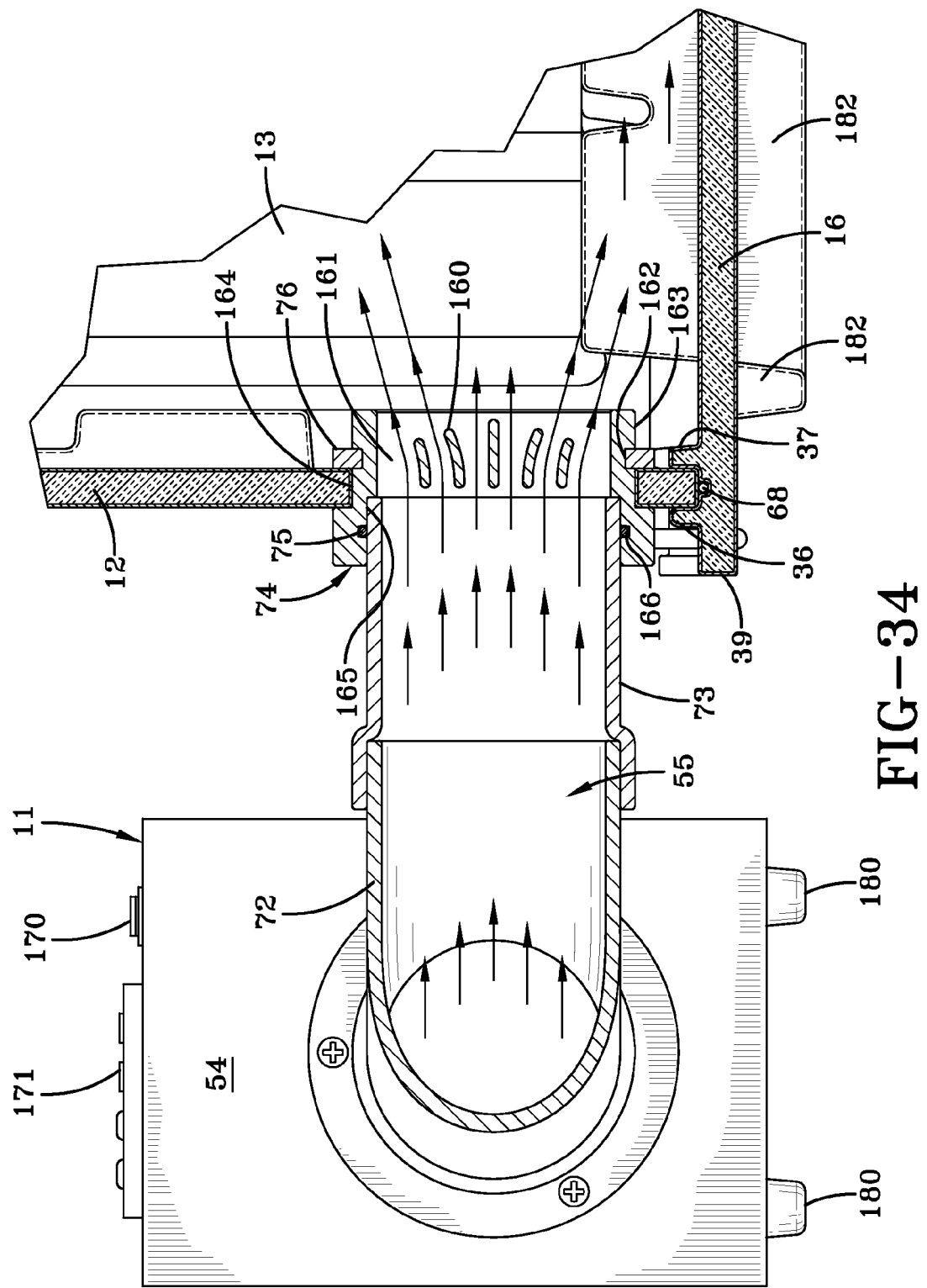

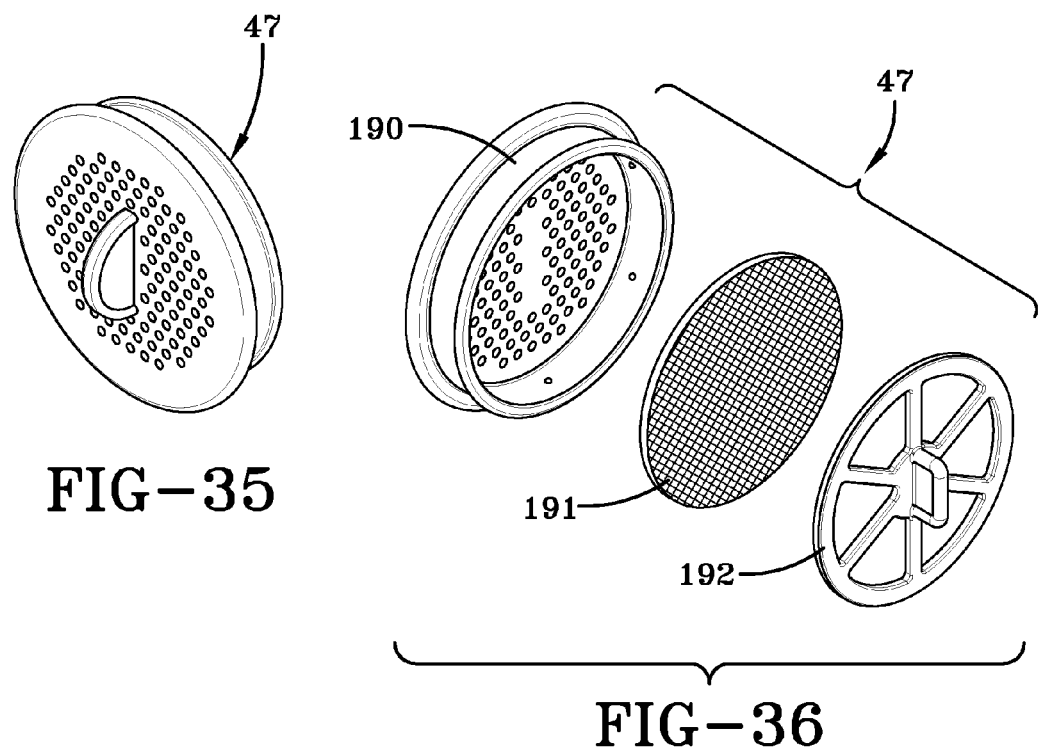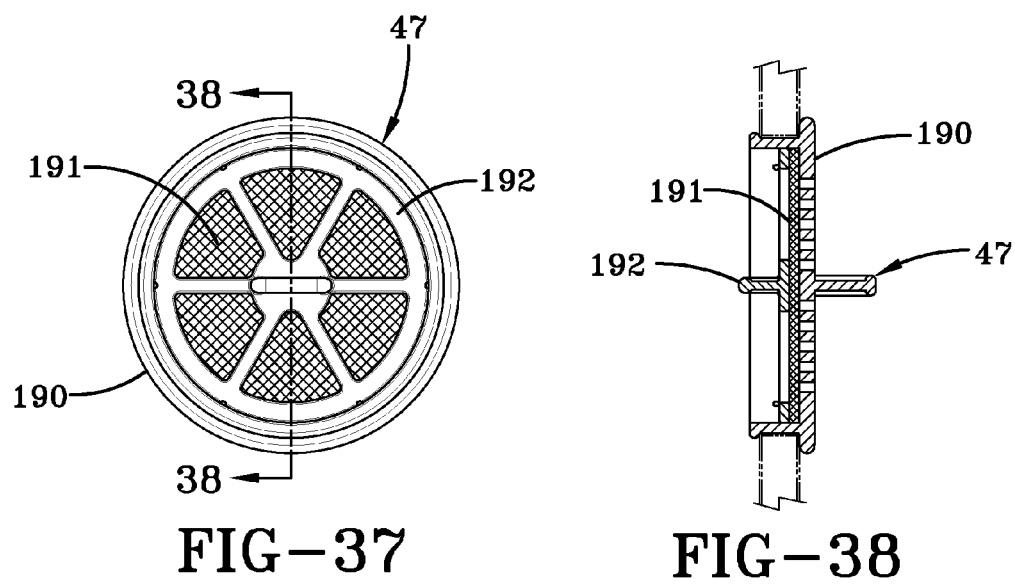

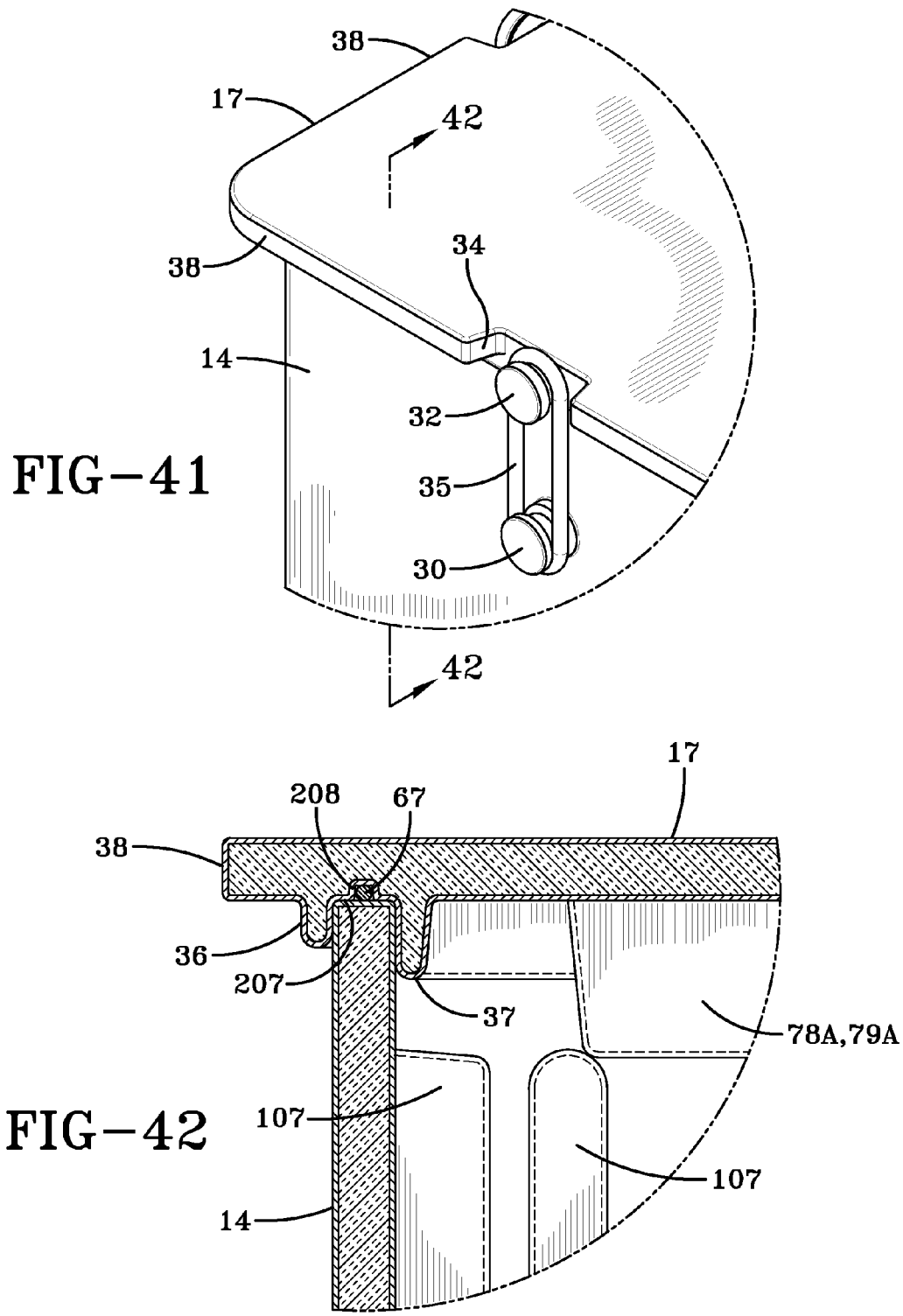

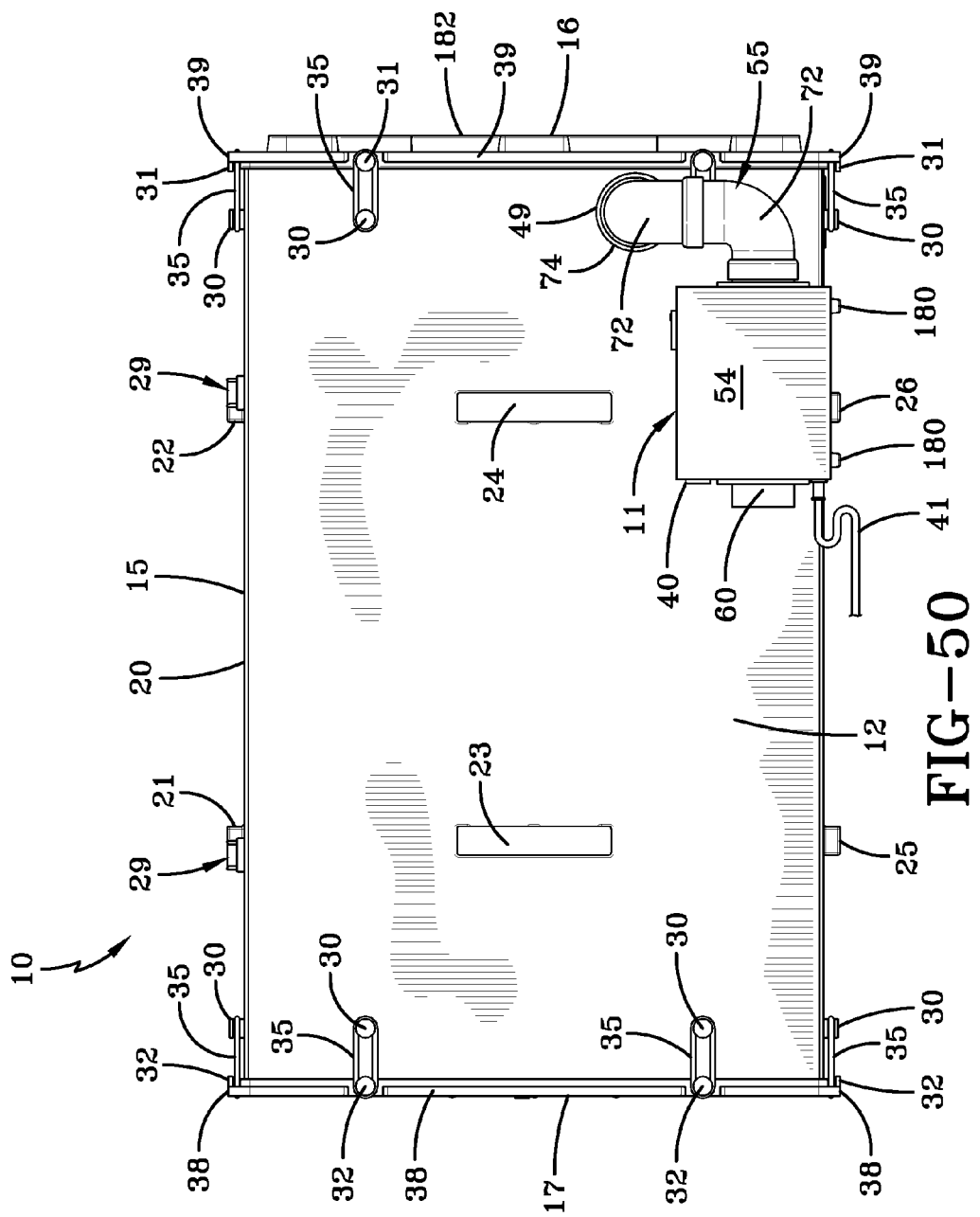

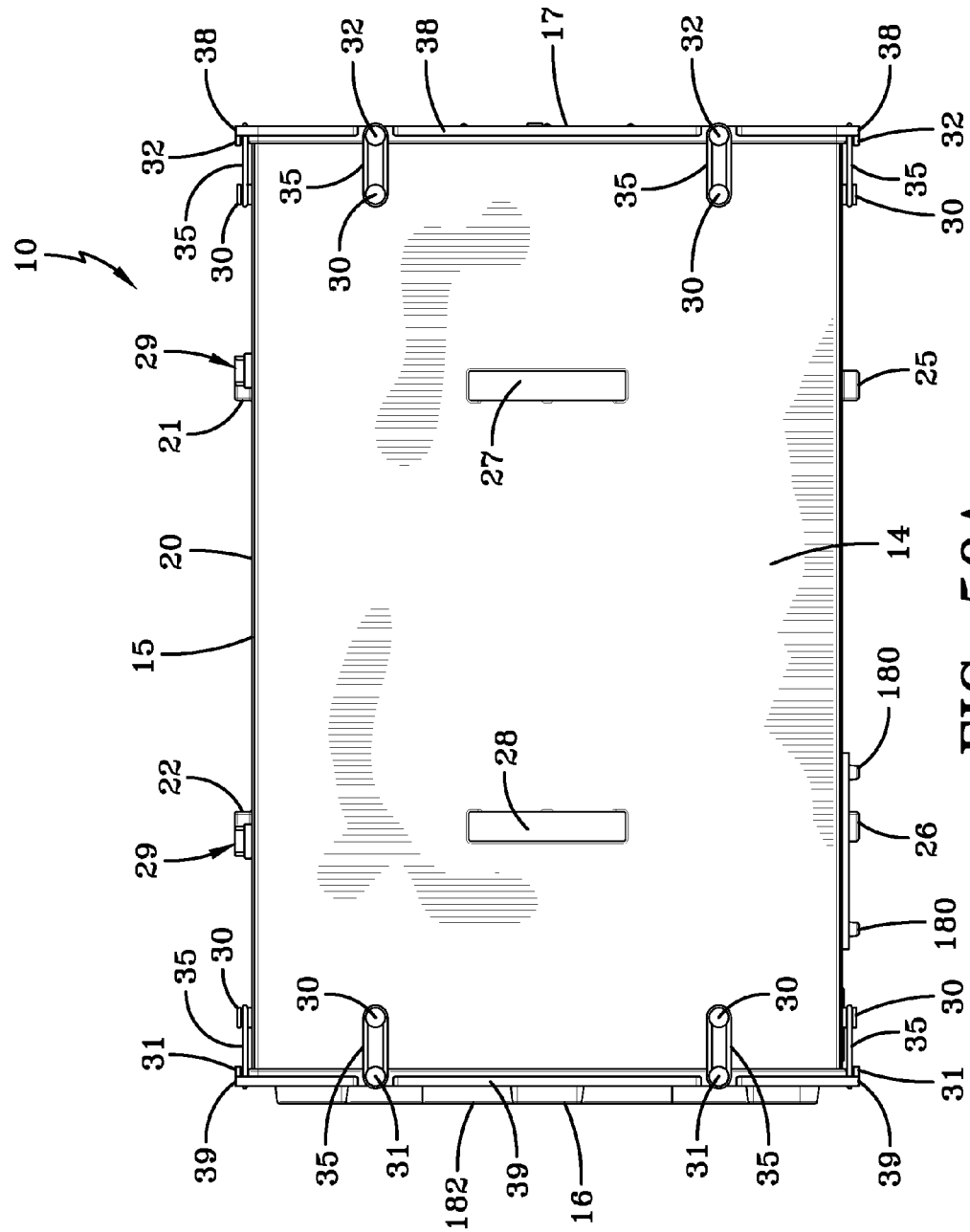

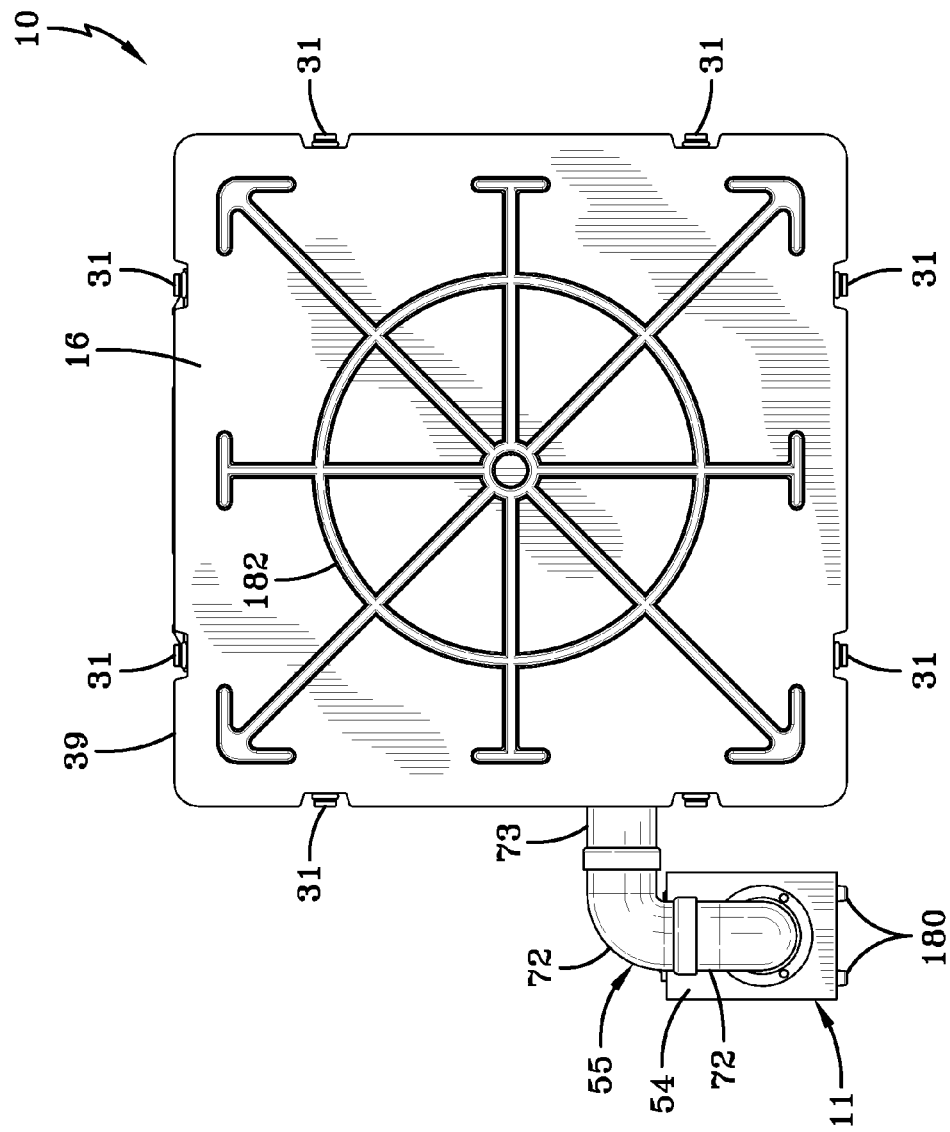

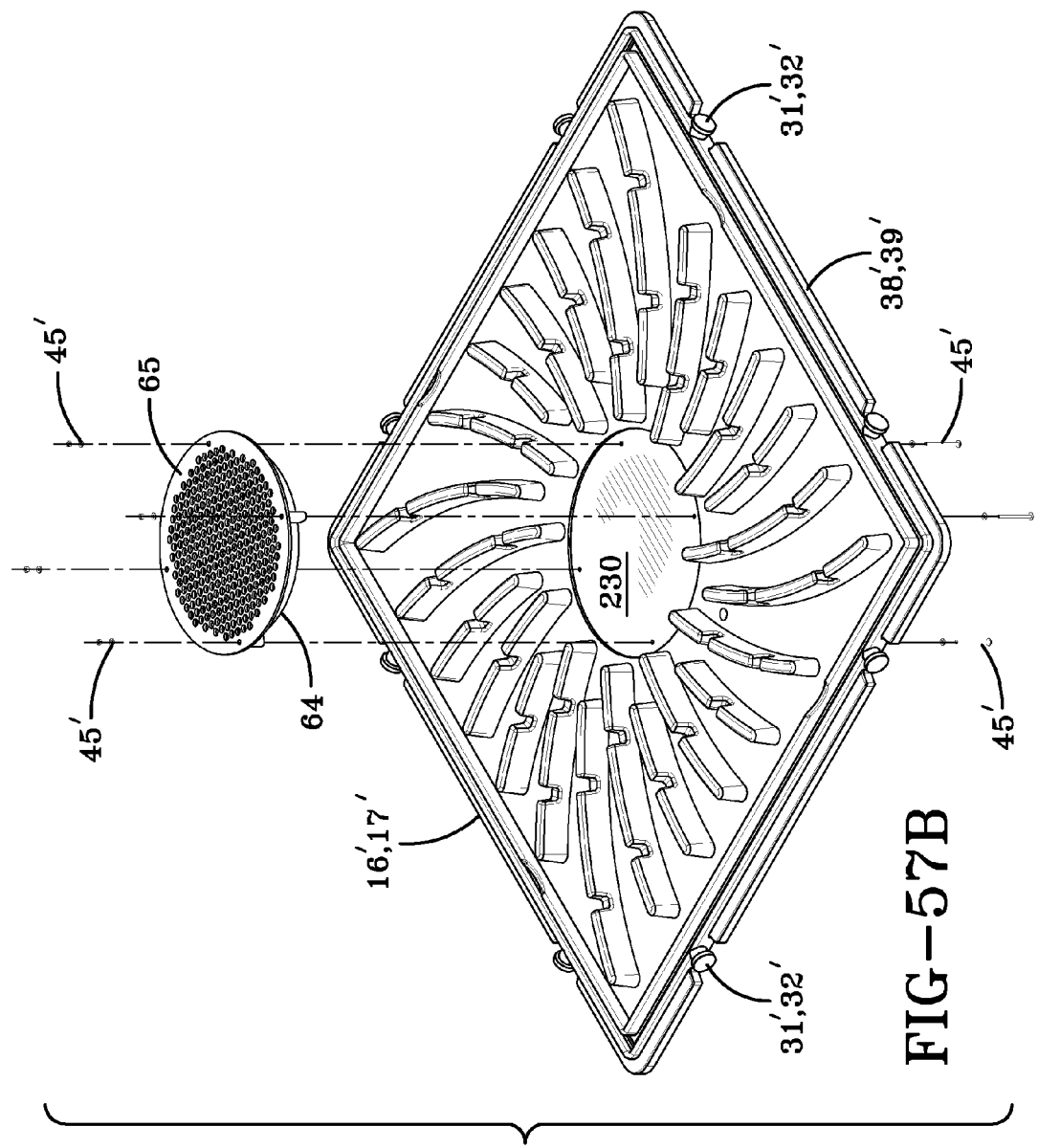

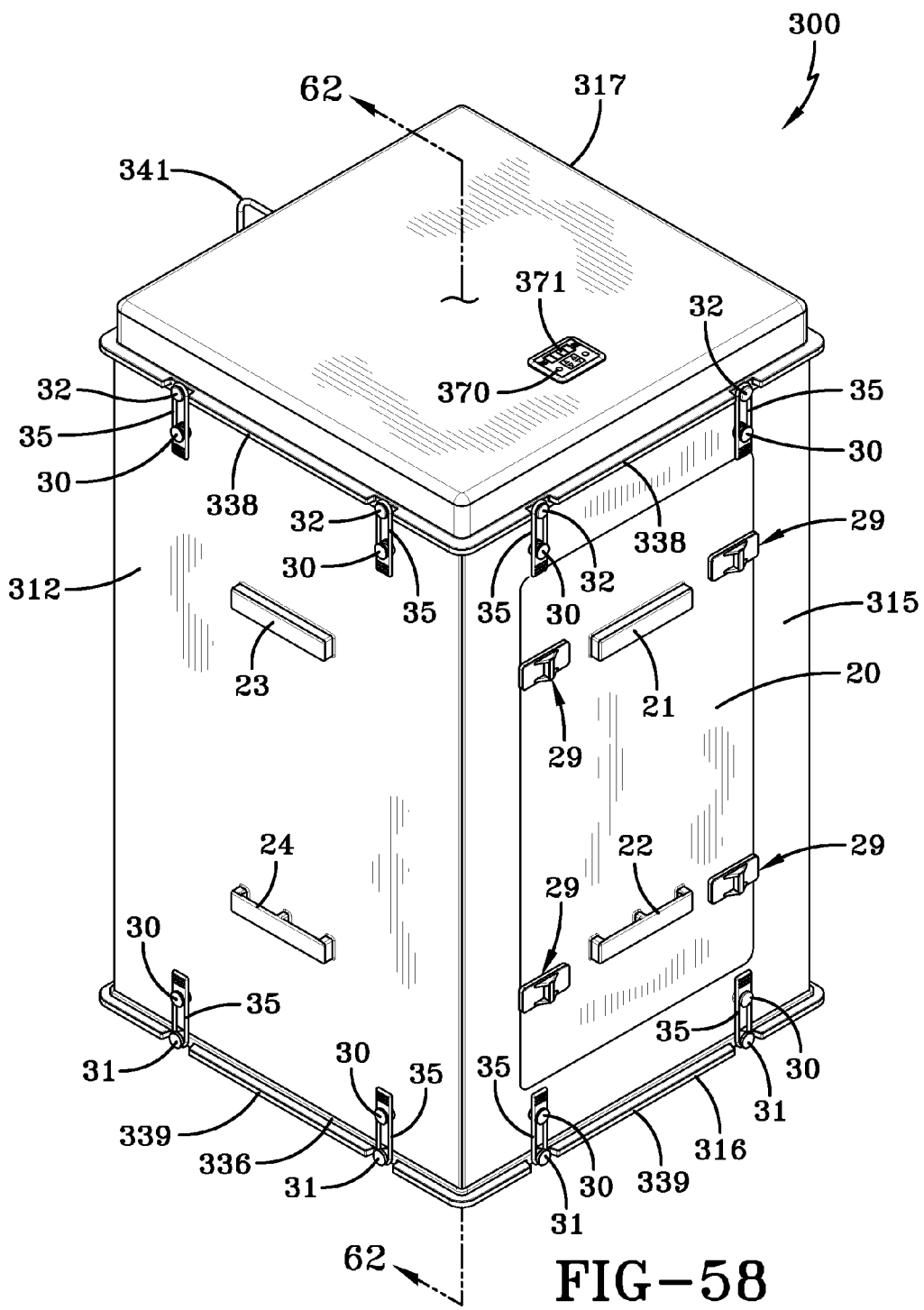

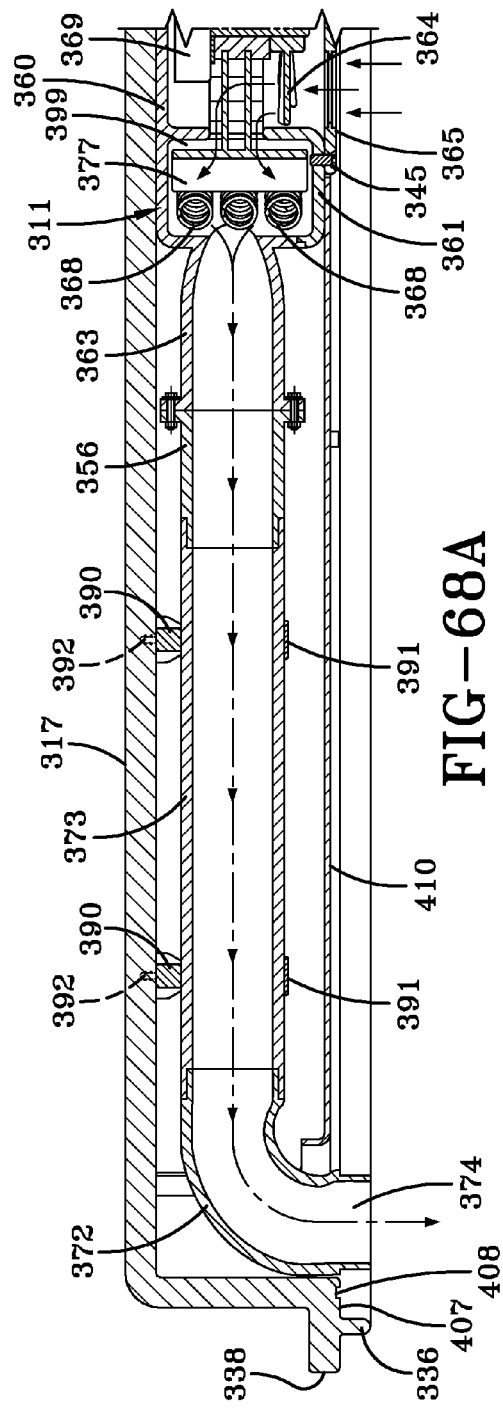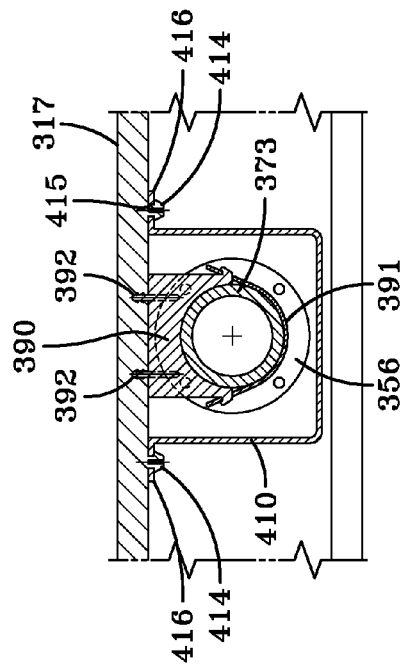
FIG-68A
FIG-68B

DEVICE FOR KILLING INSECTS WITH HEAT

FIELD OF THE INVENTION

The present invention relates to a device for killing insects using heat.

BACKGROUND OF THE INVENTION

Infestations of damaging, annoying and dangerous insects, such as bedbugs, are a common problem related to clothing, bedding, books and other items. Fabric inhabiting pests, such as bedbugs, are making a comeback because most of the residual insecticides formerly used in their control such as dieldrin and DDT have been banned. Accordingly, as people travel there is a growing incidence of insect infestation of bedding and of garments transported in luggage. For example, bed bugs can be found in any hotel, motel, home, or other accommodation regardless of sanitation conditions. Bedbugs may be located for example in crevices associated with mattresses, box springs, sheets, upholstery, pillows, towels, garments of every type, or the like. Even when these items are examined, it is common for insects, or the eggs of insects, to go undetected and packed with garments and transported in luggage. Presently, conventional remedies appear to be limited to unpacking transported items and examining them in a remote location such as a garage or utility room prior to introducing the transported items into a residence area with treatment of infested items by dry cleaning, fumigation, or the like, to kill infestations of insects. Accordingly, the need exists for an effective and efficient device and method for killing bed bugs and other pests on and in infested items. Devices and methods for killing bed bugs and other pests, however, have proven inadequate in various respects.

DISCUSSION OF THE PRIOR ART

One approach to killing insects with heat is to heat the interior of a room or entire building to a temperature that the insects cannot survive.

U.S. Pat. No. 4,817,329 and U.S. Pat. No. 4,961,283 A disclose a method of killing insects, such as termites, in a structure by pumping heated gasses into the structure. The gas is heated to a temperature at which the insects cannot long survive then the heated gas is pumped into the attic or room(s) to be treated, and it is recommended that the hot gas be recirculated. It is also disclosed that the heat source may be a resistance heater located in the space to be treated.

U.S. Pat. No. 8,479,439 B2 and U.S. Pat. No. 8,479,440 B2 disclose a heating unit for increasing the temperature in a structure such as a house to a temperature of about 140° Fahrenheit to kill insects such as bedbugs when the heating unit is placed inside the structure. The heating unit creates an air-fuel mixture and then combusts the air-fuel mixture to achieve the necessary hot gas.

US 2010/0329649 A1 discloses an infra-red heater assembly used to combat pests, such as bedbugs, and other conditions such as mold and moisture in a building.

US 2012/0186139 A1 discloses a portable heating system and method for pest control in an affected area that includes a heat exchanger unit and an electric heater. The heat exchanger unit is placed within the affected area and is coupled to a water faucet. The heat exchanger is configured to receive a flow of water from the faucet and to emit heated air by transferring heat from the flow of water to air flowing through the heat exchanger. An electric heater further heats the air emitted by the heat exchanger.

US 2013/0044997 A1 discloses an electric convection heater for exterminating insects. A housing contains a heater and a fan. Air is discharged at elevated temperatures to elevate the temperature of objects within a room to exterminate bedbugs.

US 2012/0304528 A1 discloses a climate control unit for pest control that includes a housing configured to be positioned within an infested area. The housing includes a fan and one or more heating elements.

Another approach to killing insects with heat is to place a heat generating device inside a container that may contain insects, such as a box or luggage.

US 2012/0192479 A1 discloses a heated enclosure for killing bedbugs located within luggage. A rectangular housing is vented to allow for the inflow of air. Luggage may be placed in the housing and hot air is circulated in the housing to kill bedbugs.

US 2012/0060407 A1 discloses placing inside an enclosure such as a suitcase or box a heating film comprising a resistive material disposed on a substrate that generates infrared radiation. The heating film is disposed in the enclosure and a current is supplied to the heating film so that infrared radiation penetrates and heats items, such as clothing, disposed in the enclosure to a sufficiently high temperature for a sufficiently long period to kill pests on the infested items.

US 2013/0145681 A1 discloses methods for integrating heating elements into luggage systems for killing pets that may reside in the interior of the luggage. The preferred heating elements are infrared heating films. Alternatively heating elements may be resistive heating elements such as ribbon wire or metal alloys such as NiChrome.

Another approach to killing insects with heat is to place an infested object in a flexible soft sided enclosure provided with a heat generating device.

US 2011/0186558 A1 discloses a device in the form of a flexible warming pad that includes an enclosure, a heating element and a hanging portion. The heating element is disposed within the enclosure. The disclosed device provides a portable way for localized extermination of bed bugs though the application of elevated levels of heat to bed coverings.

US 2011/0308139 A1 discloses a pest eradication system having a soft sided flexible enclosure in which infested materials can be located for heat treatment at a temperature over a period of time lethal to insects. A heater is located external of the flexible enclosure to generate a flow of heated air inside the flexible enclosure. The flexible enclosure may include a vent that allows egress of air flow from the enclosed space.

Another approach to killing insects with heat is to place an infested object inside an inflatable enclosure and then introduce heated air into the inflatable enclosure.

US 2012/0233907 A1 discloses an inflatable enclosure that is heated with recirculating air to kill bugs on articles placed inside the enclosure.

Another approach to killing insects with heat is to place an infested object inside a hard sided enclosure and then introduce heated air into the inflatable enclosure.

US 2012/0204478 A1 discloses a heater for killing insects inside an enclosure that includes an elongated housing having an inlet at a first end to intake ambient air and an outlet with a fan located within the housing. Heating elements are mounted within the housing.

US 2012/0233907 A1 discloses a rigid enclosure, that may comprise panels that can be disassembled, and the interior of the enclosure is heated with recirculating air to kill bugs on an article placed inside the enclosure.

US 2012/0285944 A1 discloses a self-inflating heat sanitizer that uses convective heat transfer to eradicate bedbugs within an item. A heater unit propagates and reheats air as the heated air flows through the heat chamber. The structure of the heat chamber enclosure includes inflatable walls that are pressurized when heated air flows into the heat chamber enclosure.

SUMMARY OF THE INVENTION

There is provided in accordance with the present invention a device for killing insects, such as bedbugs, with heat. The device includes an enclosure having four side panels and two end panels. The side panels are fixed to the end panels by portions of the side panels that mate with complementary channels provided by the end panels and locking mechanisms. The device further includes a mechanism for providing heated air to the interior of the device and a mechanism for circulating the heated air inside the device for killing any insects that may be infesting items such as clothing and bedding placed inside the device. Some configurations of the device have the mechanism for providing heated air located on the exterior of the device and the mechanism for circulating the heated air located inside the device. In one configuration of the device both the mechanism for providing heated air and the mechanism for circulating the heated air are located inside the device. The interior of the device may be provided with mechanisms such as racks and hanger rods for supporting items such as clothing and bedding placed inside the device. The interior of the device may be provided with mechanisms for directing the flow of hot air inside the device including air ducts and protrusions extending from the side and end panels of the device.

BRIEF DESCRIPTION OF THE DRAWINGS

FIG. 14 is an end view of the side panel shown in FIGS. 10-13 looking in the direction indicated by arrow 14 in FIG. 13.

FIG. 15 is an enlarged cross section of next adjacent air flow directors in one of the rows of air flow directors taken at line 15-15 in FIG. 13.

FIG. 16 is a fragmentary cross section taken at line 16-16 of FIG. 12 of a handle on a side panel.

FIG. 17 is a fragmentary cross section taken at line 17-17 of FIG. 14 of an anchor for an elastomeric fastener on a side panel.

FIG. 18 is a fragmentary cross section taken at line 18-18 of FIG. 14 of a hanger rod support bracket on a side panel.

FIG. 34 is a cross section showing the connection of the air heater to a side panel.

FIG. 35 is a perspective view of a HEPA filter assembly.

FIG. 36 is an exploded view of the HEPA filter assembly of FIG. 35.

FIG. 37 is an end view of the HEPA filter assembly of FIG. 35.

FIG. 38 is a cross section of the HEPA filter assembly of FIG. 35 taken at line 38-38 of FIG. 37.

FIG. 41 is a fragmentary perspective view showing junction of the end panel located at the top of the device in FIGS. 1-4A to a side panel looking generally downwards toward the exterior of the device.

FIG. 42 is a fragmentary cross section taken at line 42-42 in FIG. 41 showing the junction of one of the side panels with the end panel located at the top of the device in FIGS. 1-4A.

FIG. 50 is a first side elevation view of the third configuration of the first embodiment of the device resting on one of the side panels as shown in FIG. 48.

FIG. 50A is a second side elevation view of the third configuration of the first embodiment of the device resting on one of the side panels as shown in FIG. 48 looking in the opposite direction from FIG. 50.

FIG. 51 is an end elevation view of the third configuration of the first embodiment of the device resting on one of the side panels as shown in FIG. 48.

FIG. 57B is an exploded view illustrating the air circulation fan assembly of FIG. 55 with the interior side of the alternate end panel shown in FIGS. 54 and 54A.

FIG. 58 is a perspective view of a second embodiment of a device for killing insects with heat according to the present invention.

FIG. 68A is a section view taken at line 68A-68A of FIG. 67 showing some of the interior components of the second embodiment of the device for killing insects with heat assembled with the top end panel of the device.

FIG. 68B is a section view taken at line 68B-68B of FIG. 67 showing some of the interior components of the second embodiment of the device for killing insects with heat assembled with the top end panel of the device.

DETAILED DESCRIPTION OF THE INVENTION

Figure 1A:
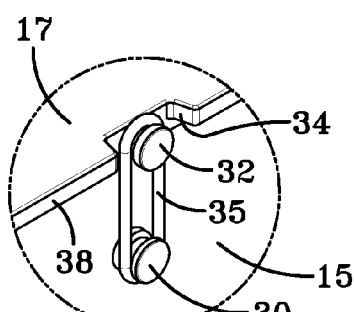
FIG. 1A is an enlarged fragmentary view of the first configuration of the first embodiment of the device showing the attachment of a side panel to an end panel located at the top of the device in FIG. 1.

As used herein and in the claims the term "top" is understood to have its usual meaning of the highest part of an item when the item is resting on a flat surface in an operative orientation of the item. As used herein and in the claims the term "bottom" is understood to have its usual meaning of the lowest part of an item when the item is resting on a flat surface in an operative orientation of the item. As used herein and in the claims terms such as "above" and "higher" are understood to have their usual meanings of indicating the location of a first item with respect to a second item when the vertical location of the first item is vertically further from the ground or floor than the second item. As used herein and in the claims terms such as "upward", "upwardly" and "up" are understood to have their usual meanings of indicating directions moving vertically away from the ground or floor. As used herein and in the claims terms such as "below" and "lower" are understood to have their usual meanings of indicating the location of a first item with respect to a second item when the vertical location of the first item is vertically closer to the ground or floor than the second item. As used herein and in the claims terms such as "downward", "downwardly" or "down" are understood to have their usual meanings of indicating directions moving vertically towards the ground or floor. As used herein and in the claims the term "exterior" is understood to mean a surface on the outside of something such as a box or container or a surface on the outside of a component that defines something such as a box or container. As used herein and in the claims the term "interior" is understood to mean a surface on the inside of something such as a box or container or a surface on the inside of a component that defines something such as a box or container. Components that are common to other embodiments and configurations of the disclosed device are identified by the same reference characters throughout the drawings and the specification.

Figure 1B:
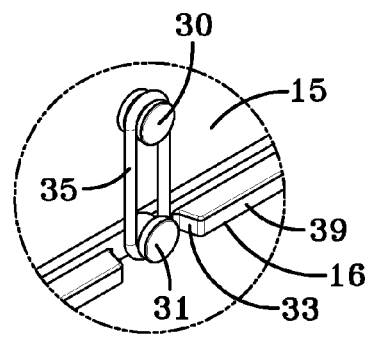
FIG. 1B is an enlarged fragmentary view of the first configuration of the first embodiment of the device showing the attachment of a side panel to an end panel located at the bottom of the device in FIG. 1.
Figure 1:
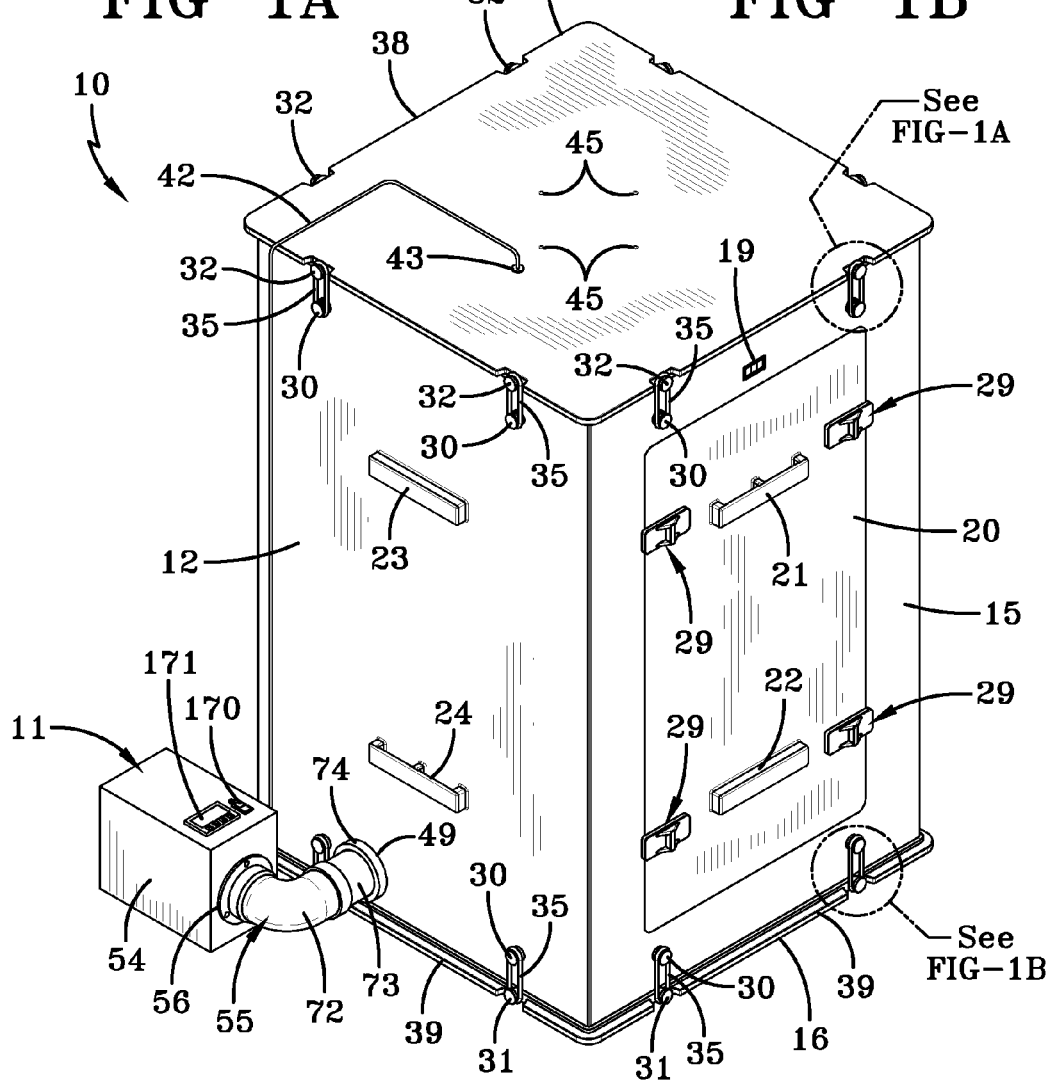
FIG. 1 is a perspective view of a first configuration of a first embodiment of a device for killing insects with heat according to the present invention.
Figure 2:
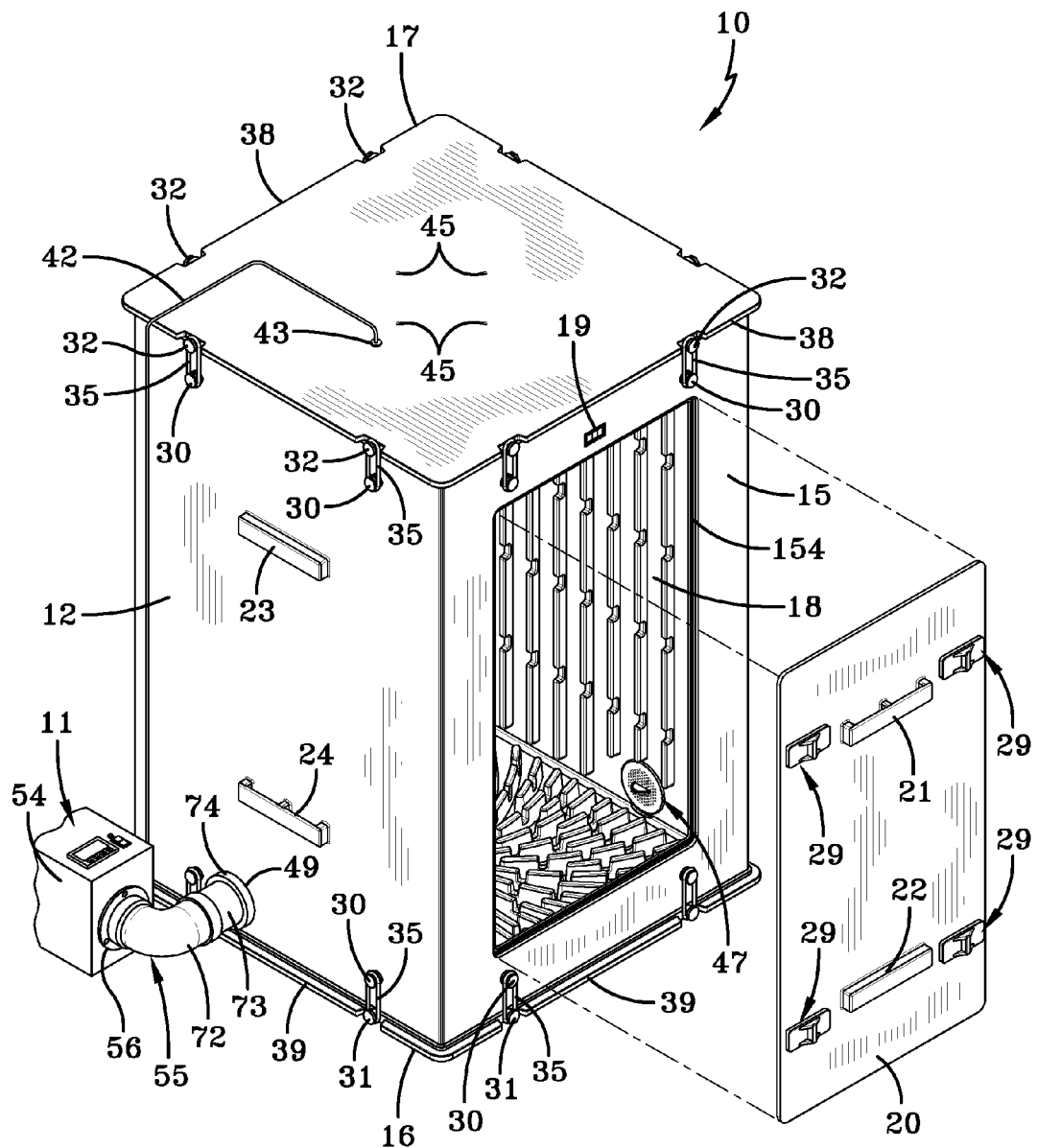
FIG. 2 is a perspective view of the first configuration of the first embodiment of the device with the door removed to show the interior of the device.
Figure 3:
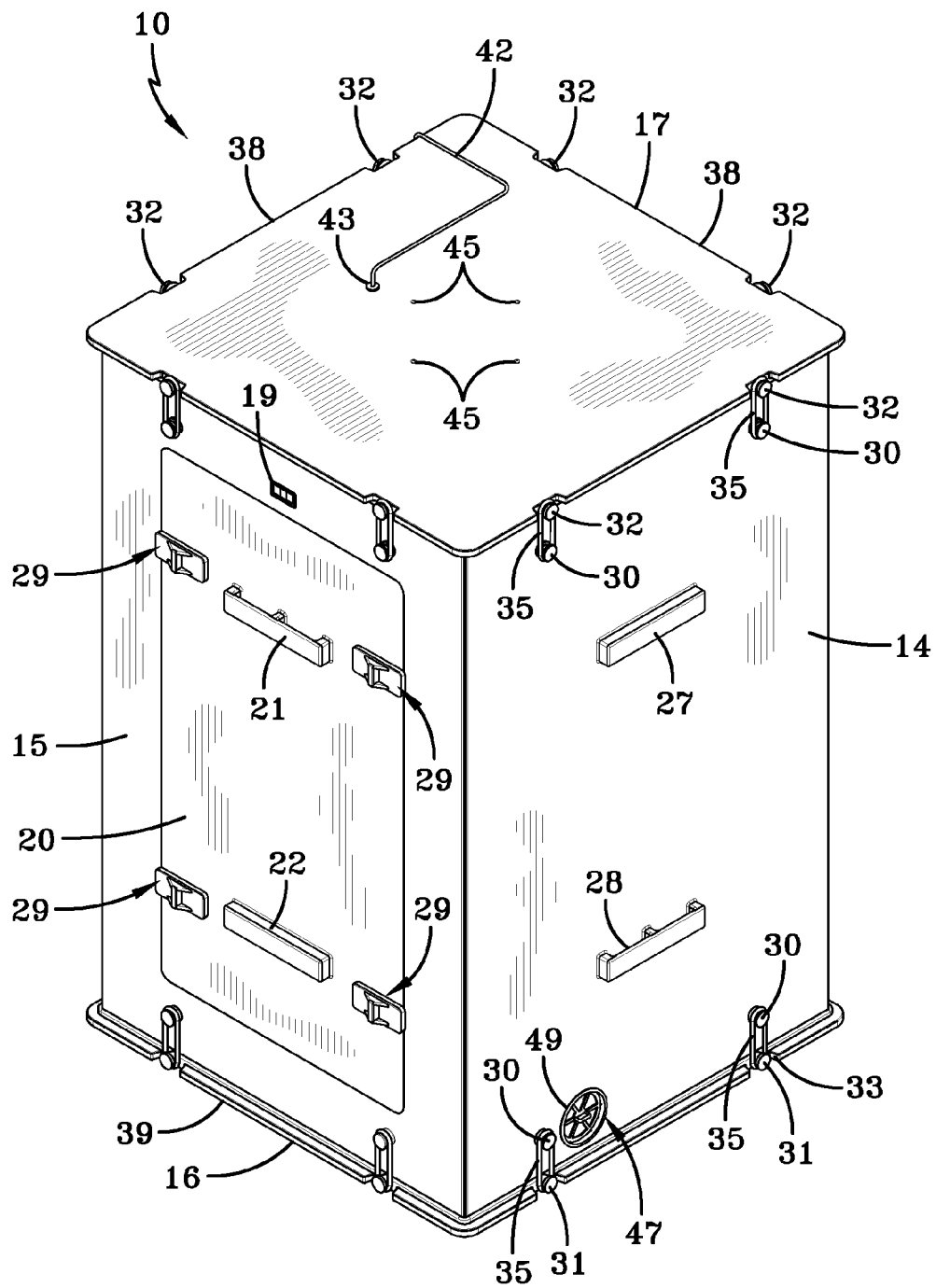
FIG. 3 is another perspective view of the first configuration of the first embodiment of the device with the device rotated 180 degrees clockwise from the view shown in FIG. 2.
Figure 4:
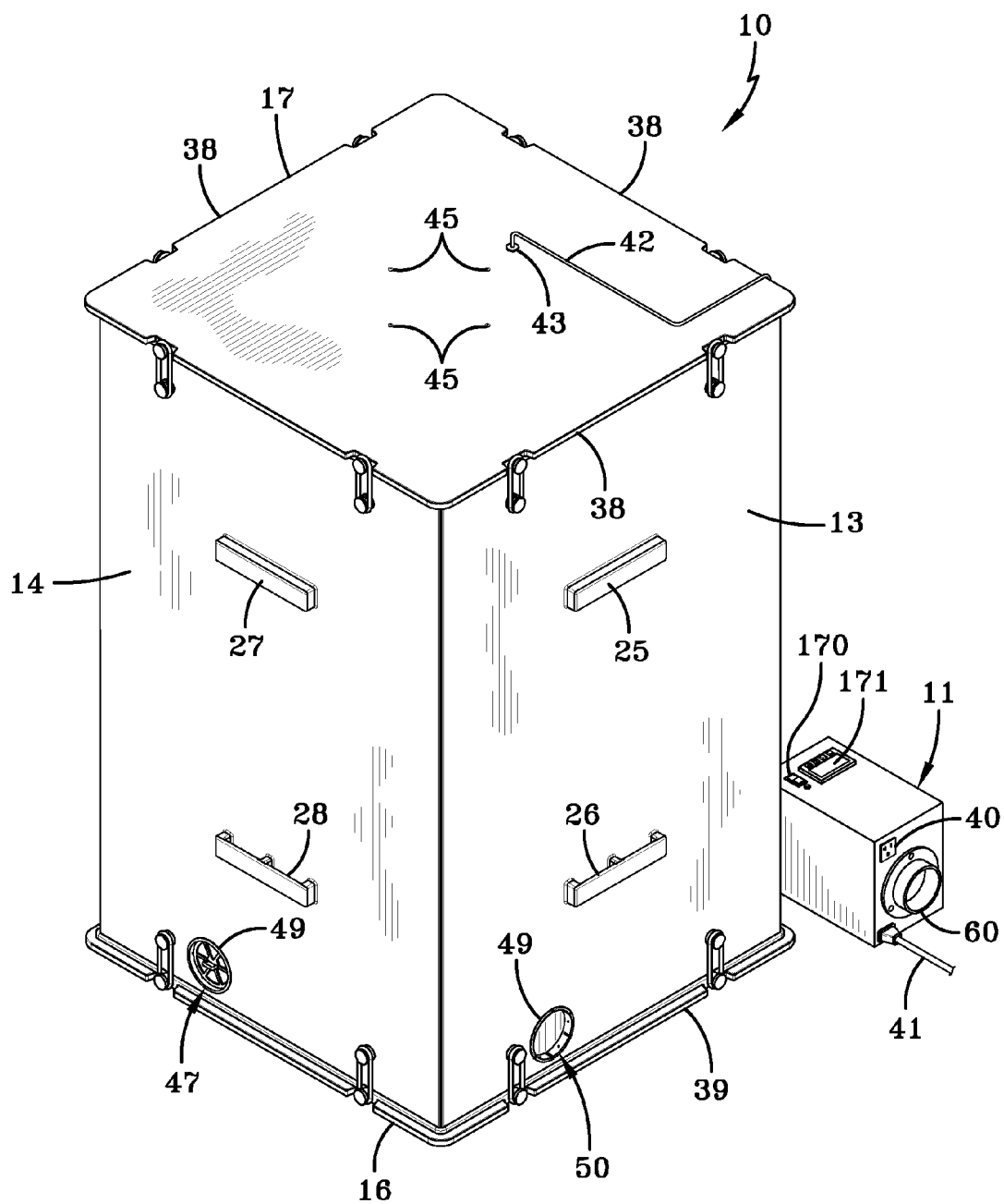
FIG. 4 is yet another perspective view of the first configuration of the first embodiment of the device with the device rotated 180 degrees counterclockwise from the view shown in FIG. 2.

Referring first to FIGS. 1-4 there is disclosed a device 10 for killing insects with heat. FIG. 1 is a perspective view of a first embodiment of a device 10 for killing insects with heat according to a first embodiment of the present invention. FIG. 1A is an enlarged fragmentary view of the device showing the attachment of a side panel 15 of the device to an end panel 17 located at the top of the device in FIG. 1. FIG. 1B is an enlarged fragmentary view of the device showing the attachment of a side panel 15 of the device to an end panel 16 located at the bottom of the device in FIG. 1. FIG. 2 is a perspective view of the device of with the door 20 removed to show the interior of the device. FIG. 3 is another perspective view of the device with the device 10 rotated 180 degrees clockwise from the view shown in FIG. 2, and FIG. 4 is yet another perspective view of the device with the device 10 rotated 180 degrees counterclockwise from the view shown in FIG. 2.

As shown in perspective in FIGS. 1 and 2-4 a first embodiment of a device 10 for killing insects with heat has a first side panel 12, a second side panel 13 and a third side panel 14. The first three side panels 12, 13, 14 each have a substantially rectangular shape and all of the first three side panels are substantially identical to one another. A fourth side panel 15 has a substantially rectangular shape with a substantially rectangular opening 18 therein. That is to say the fourth side panel 15 functions as a door frame for receiving a substantially rectangular removable door 20 having a size that is complementary to the size of the opening 18. The side panel 15 that functions as a door frame is preferably provided with a device 19 that presents a digital indicator of the temperature inside the device as sensed by a thermal sensor (not shown) located inside the device. The first 12 and third 14 side panels are spaced apart and disposed substantially parallel to one another. The second 13 and fourth 15 side panels are spaced apart and disposed substantially parallel to one another. Each of the side panels is disposed substantially perpendicular to each of the next adjacent side panels.

Figure 6:
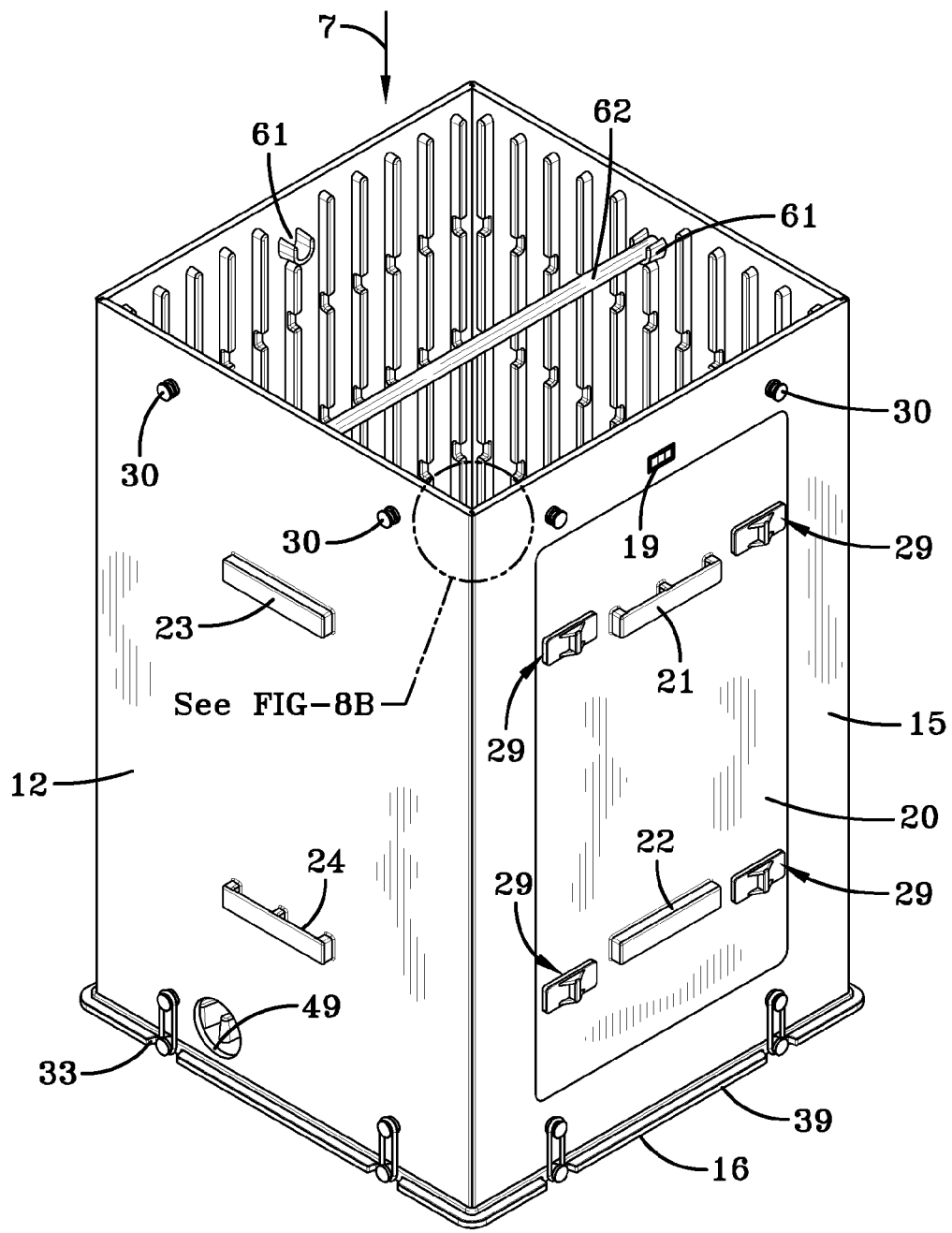
FIG. 6 is a perspective view of the first configuration of the first embodiment of the device with the top panel and the air heater removed.
Figure 7:
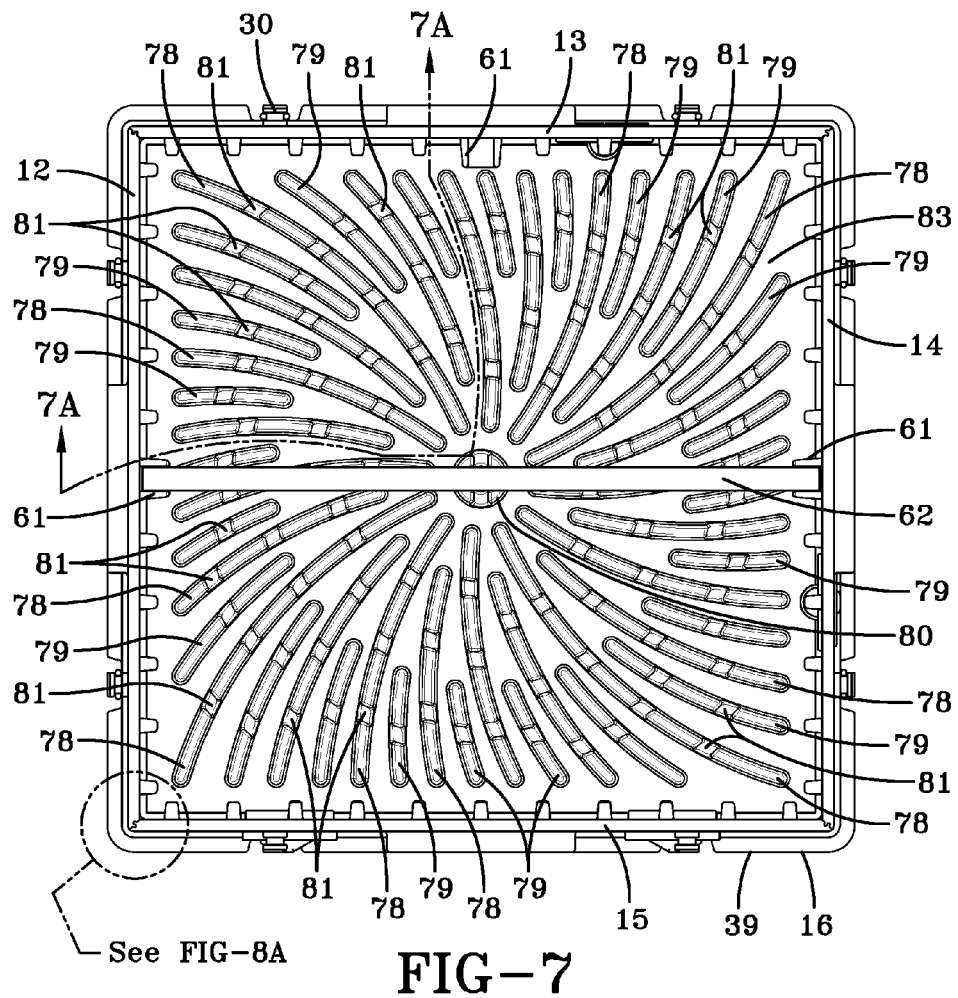
FIG. 7 is a top view looking down in the direction indicated by arrow 7 in FIG. 6 into the first configuration of the first embodiment of the device with the top panel and the air heater removed.

The device 10 is provided with a first end panel 16 that is shown located at the bottom of the device in FIGS. 1 and 2-4. The device is further provided with a second end panel 17 that is shown located at the top of the device in FIGS. 1 and 2-4. FIG. 7 is a top view looking down in the direction indicated by arrow 7 in FIG. 6 into the device 10 with the top end panel 17 and the air heater 11 removed. Looking head on at the side panels with an end panel of the device removed as shown in FIG. 7 the top edges of the four side panels 12-15 define a substantially rectangular structure. As shown for example in FIG. 5, which is an exploded view of the device, both of the end panels 16, 17 have substantially rectangular shapes. When the end panels 16, 17 are assembled with the side panels 12-15 the end panels are disposed spaced apart and substantially parallel to one another.

Figure 10:
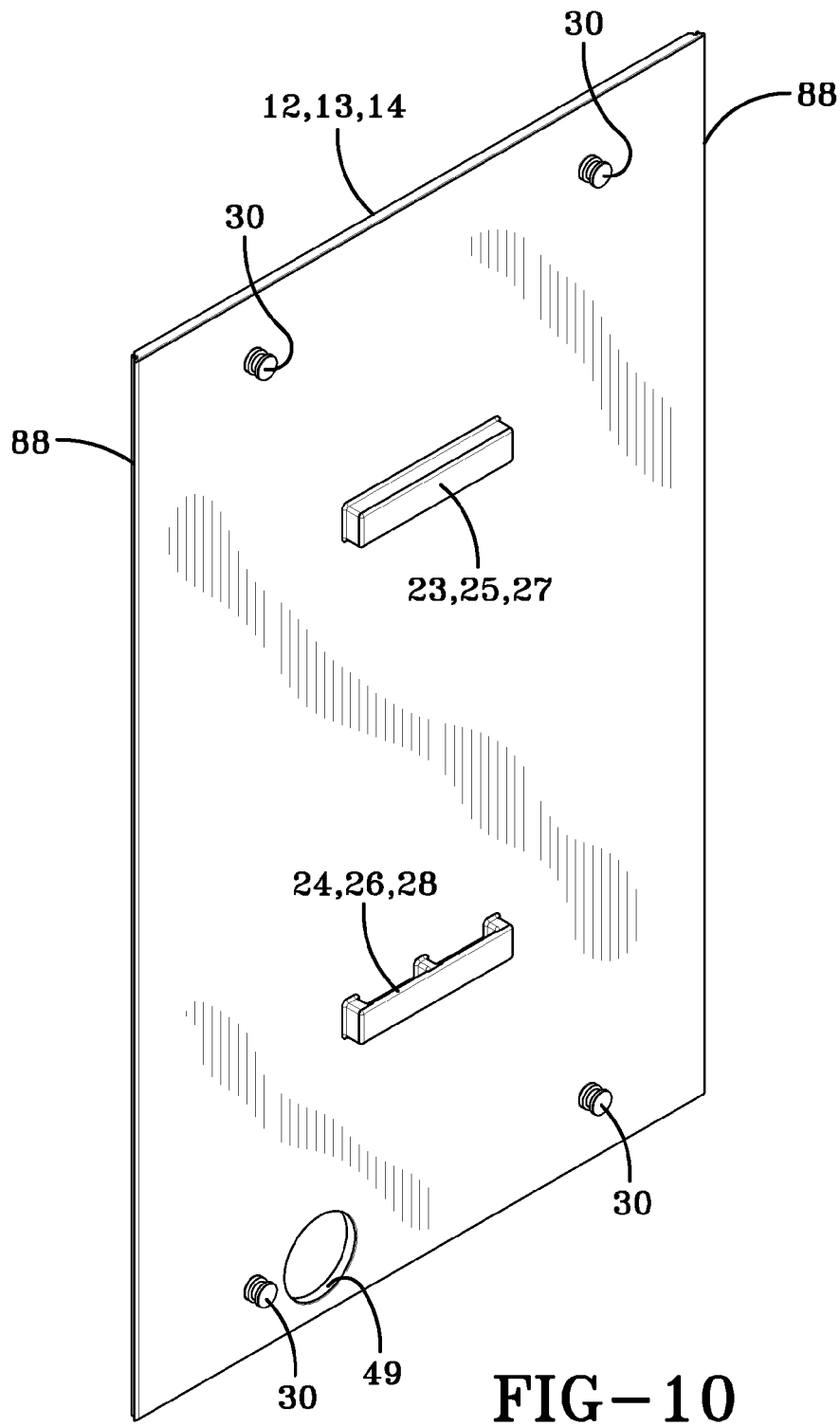
FIG. 10 is a perspective view of the exterior side of one of the side panels.
Figure 11:
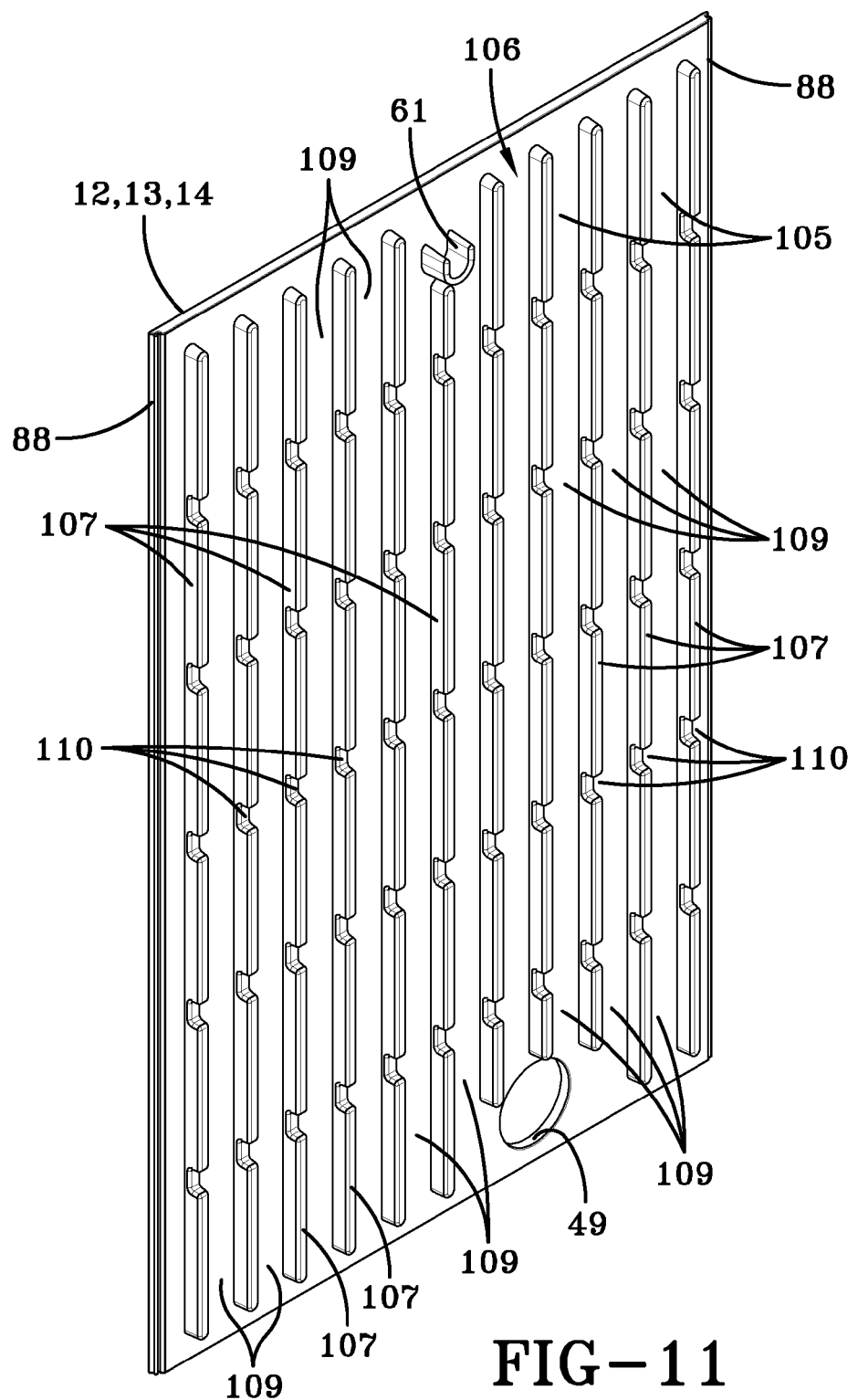
FIG. 11 is a perspective view of the interior side of one of the side panels.
Figure 12:
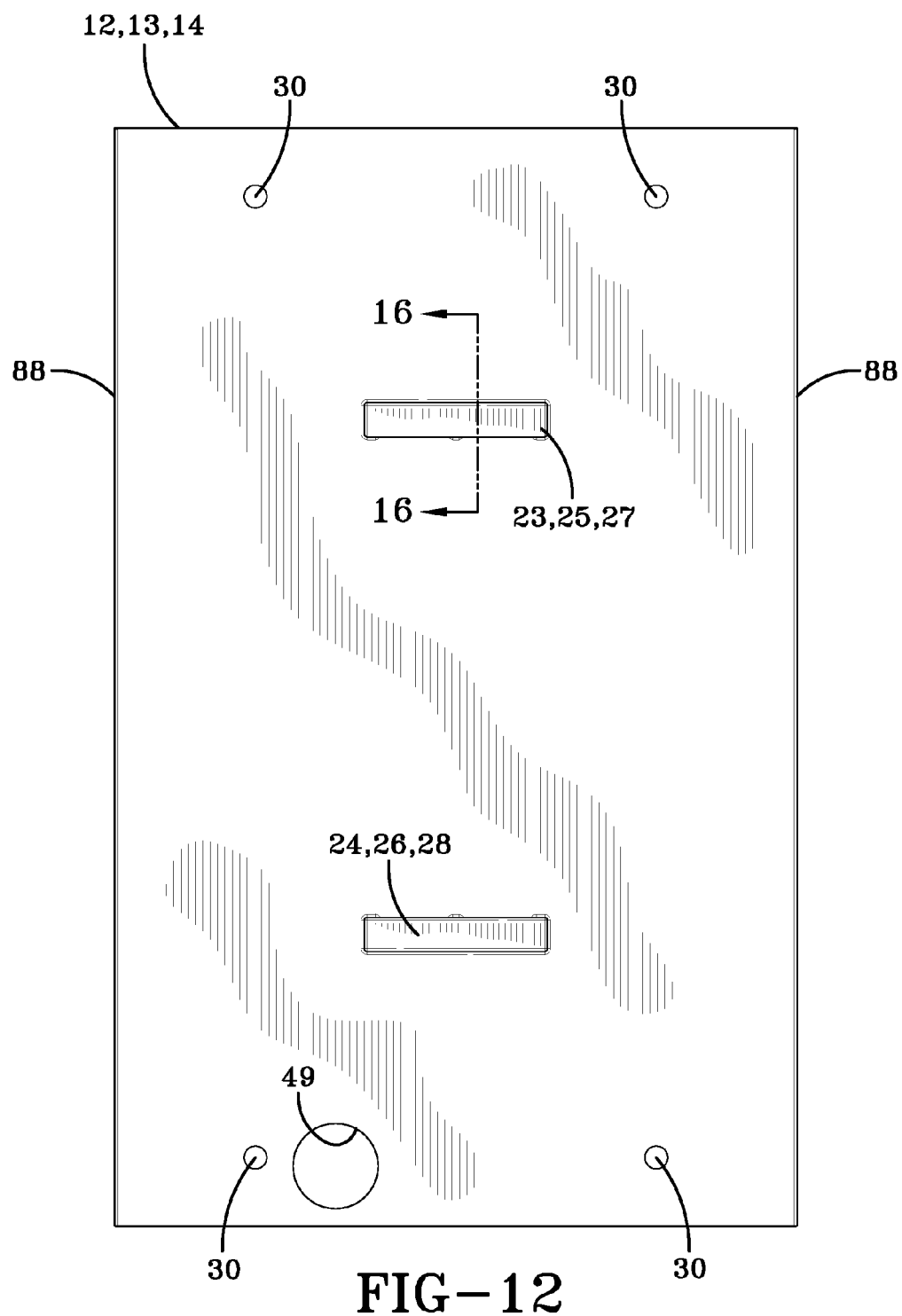
FIG. 12 is a plan view of the exterior side of one of the side panels.
Figure 13:
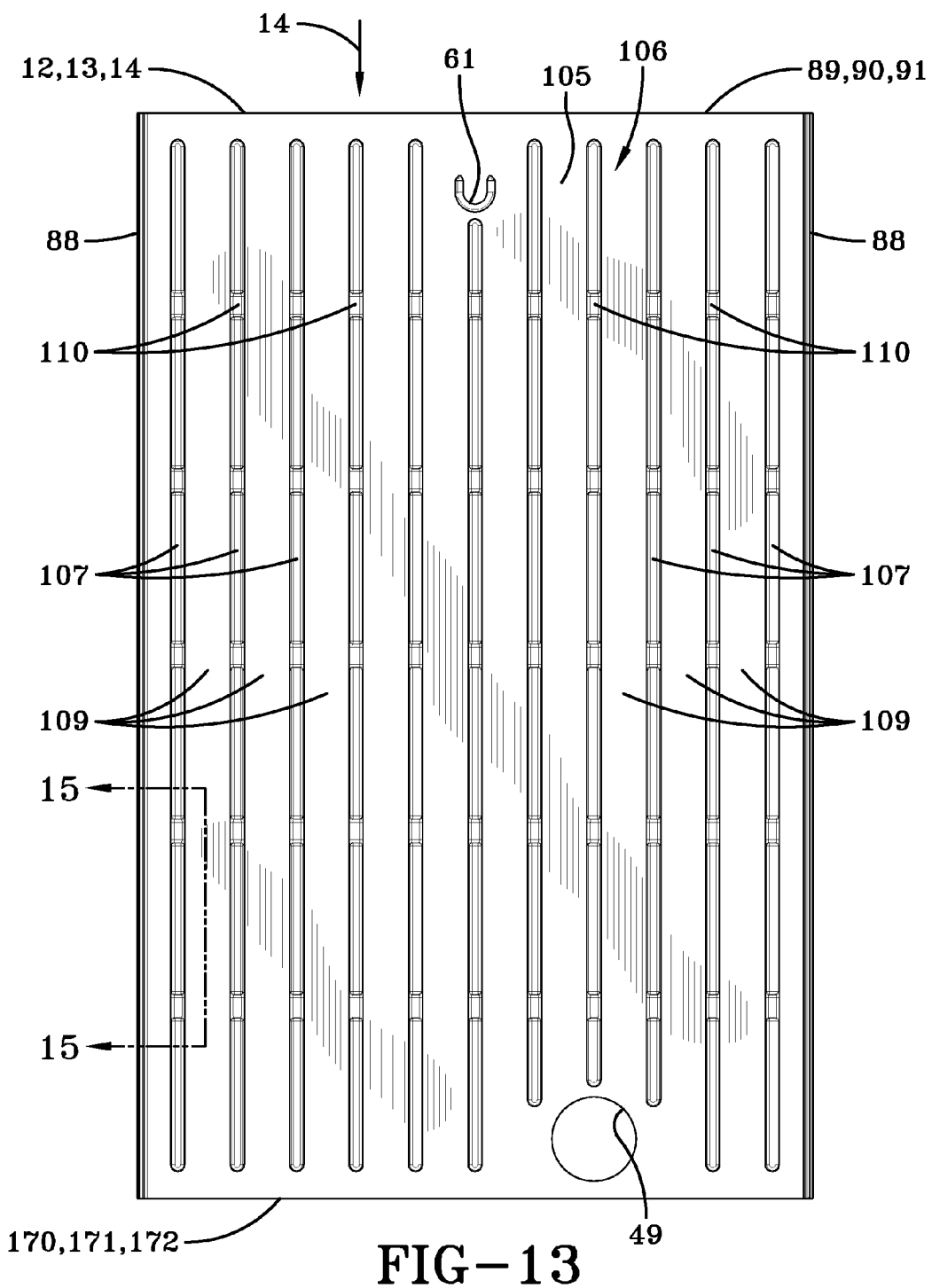
FIG. 13 is a plan view of the interior side of one of the side panels.
Figure 19:
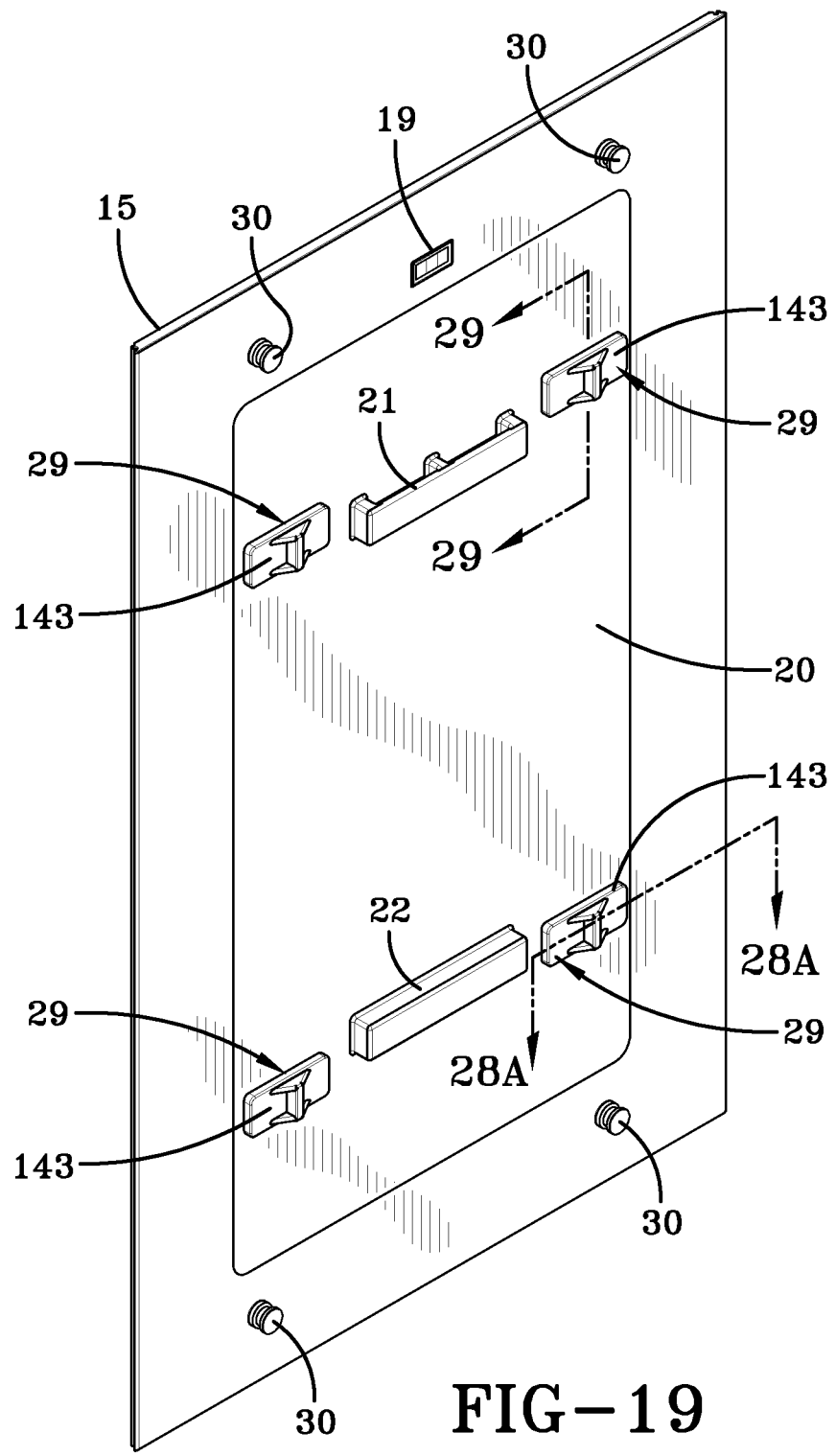
FIG. 19 is a perspective view of the exterior side of an assembly of the door receiving side panel and a removable door.
Figure 20:
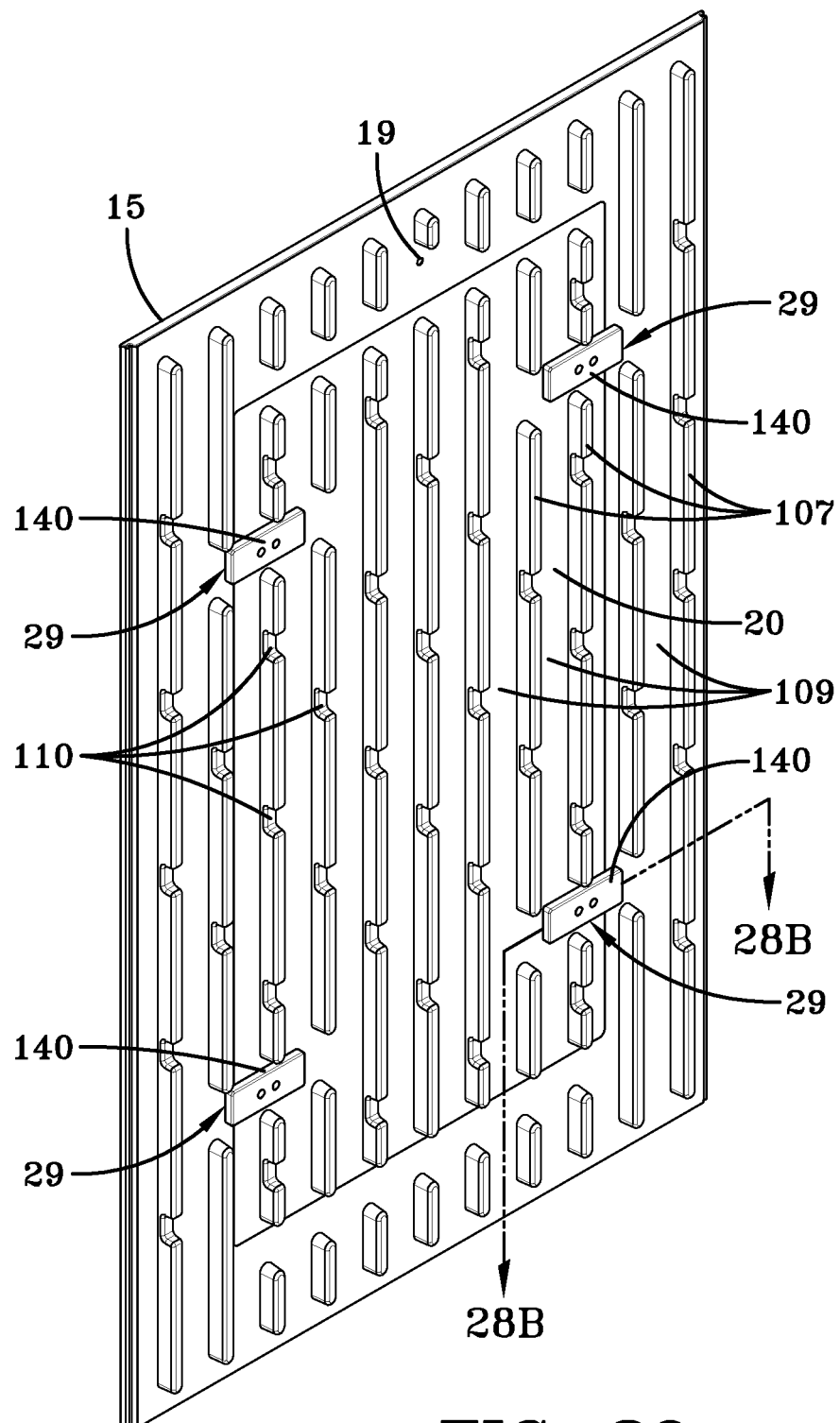
FIG. 20 is a perspective view of the interior side of the assembly of the door receiving side panel and the removable door with the latches disposed in unlocked configurations.
Figure 21:
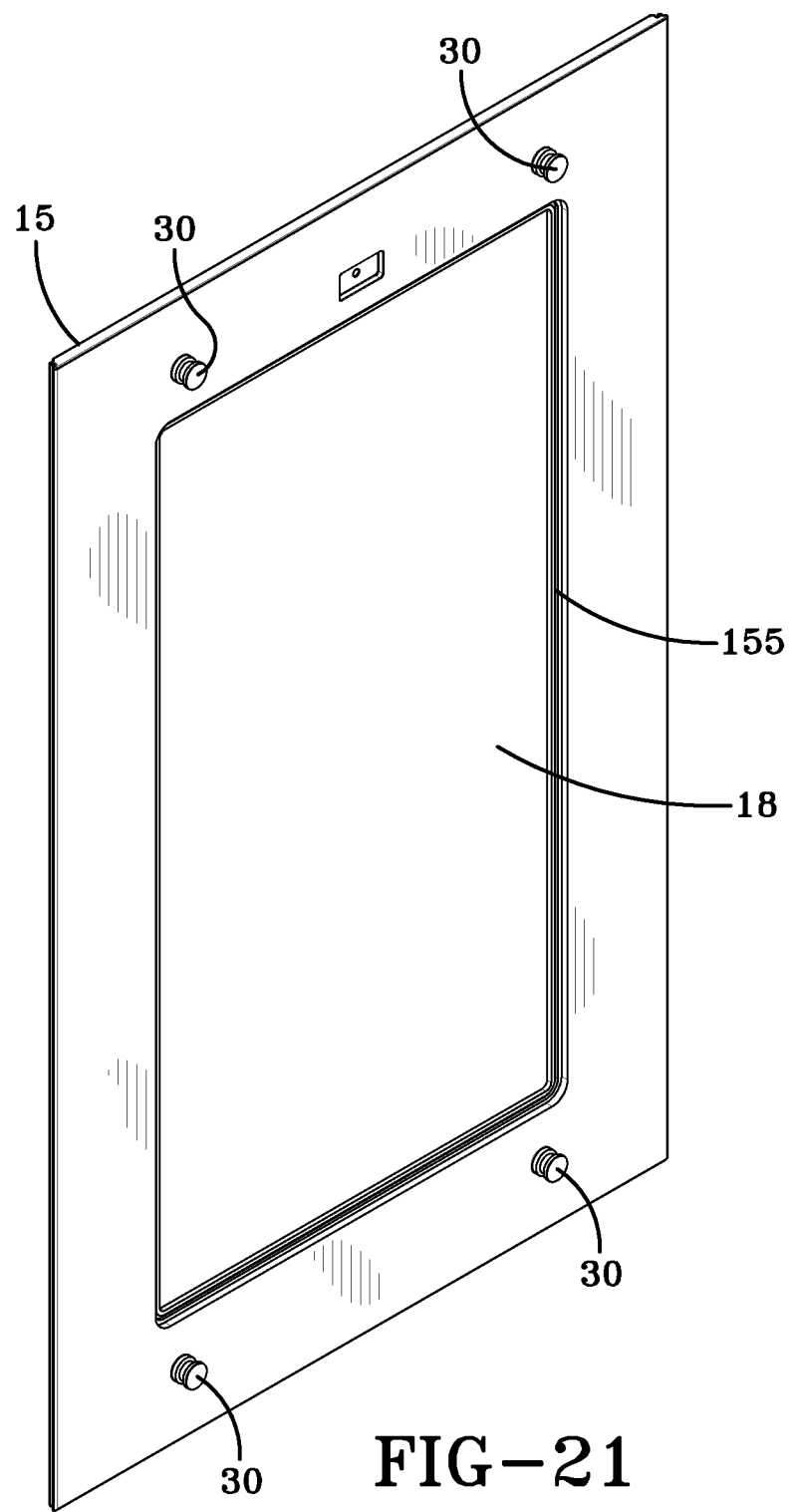
FIG. 21 is a perspective view of the exterior side of the door receiving side panel without the door.
Figure 22:
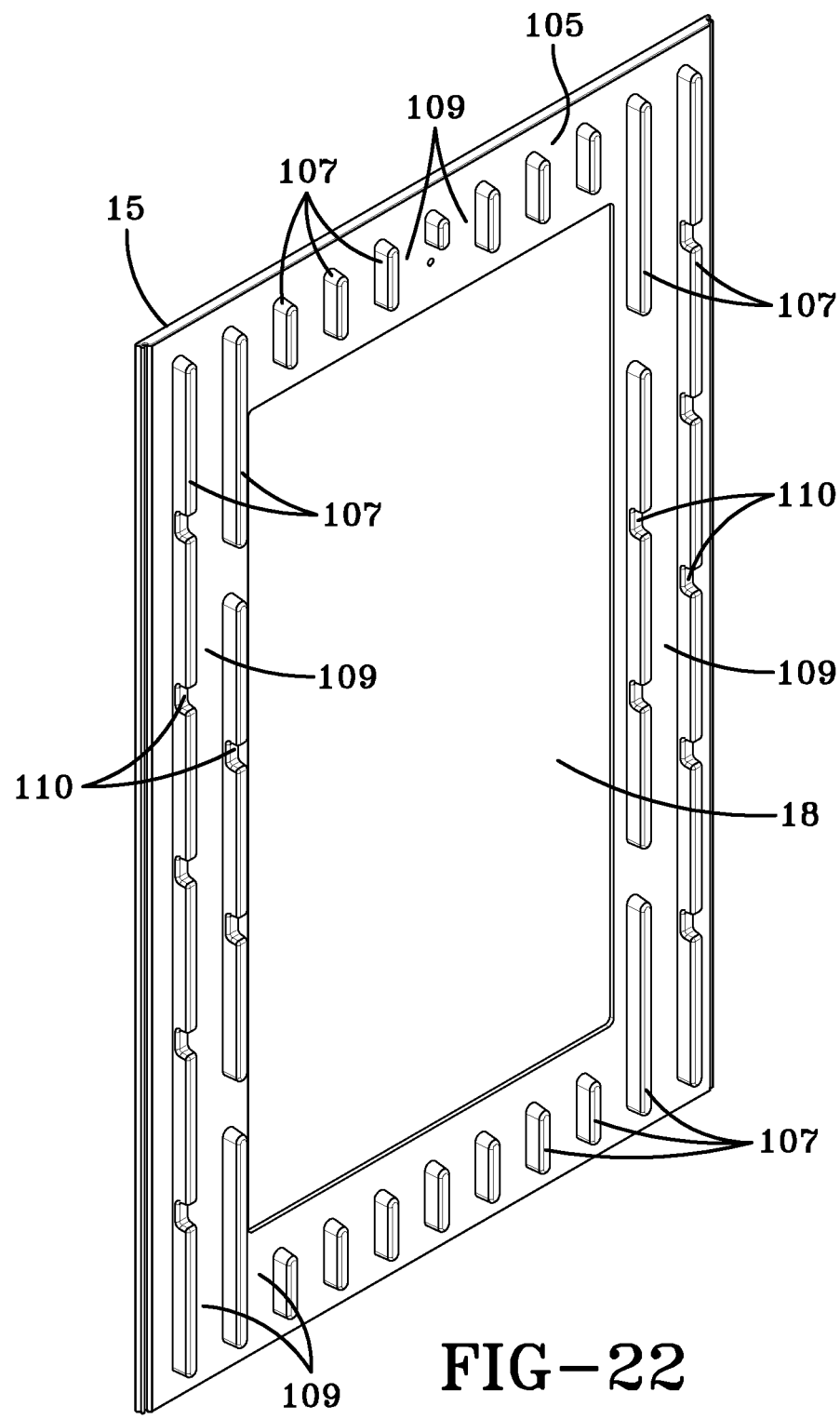
FIG. 22 is a perspective view of the interior side of the door receiving side panel without the door.

FIG. 10 is a perspective view of the exterior side of an example of one of the side panels 12, 13, 14; FIG. 11 is a perspective view of the interior side of an example of one of the side panels 12, 13, 14; FIG. 12 is a plan view of the exterior side of an example of one of the side panels 12, 13, 14; and FIG. 13 is a plan view of the interior side of an example of one of the side panels 12, 13, 14. Each of the first three side panels 12, 13, 14 is provided with a circular aperture 49. In the device of the first embodiment the circular aperture 49 in the first side panel 12 receives an air intake conduit 55 for hot air from an apparatus 54 for heating air. Air heated by the apparatus for heating air 54 passes through the air intake conduit 55 into the interior of the device 10. In the device 10 of the first embodiment the circular aperture 49 in the second side panel 13 receives a HEPA filter assembly 47. After circulating throughout the interior of the device 10 air exits the device through the HEPA filter assembly 47. In the device of the first embodiment the circular aperture 49 in the third side panel 14 receives a sealing plug insert 50 that prevents the passage of air through the circular aperture 49 in the third side panel 14. FIG. 19 is a perspective view of the exterior side of an assembly of the door receiving side panel 15 and a removable door 20; FIG. 20 is a perspective view of the interior side of the assembly of the door receiving side panel 15 and the removable door 20 with the latches 29 disposed in unlocked configurations; FIG. 21 is a perspective view of the exterior side of the door receiving side panel 15 without the door; and FIG. 22 is a perspective view of the interior side of the door receiving side panel 15 without the door. The fourth side panel 15 that receives the removable door 20 is not provided with a circular aperture like the first three side panels 12, 13, 14. The side panels 12-15, end panels 16, 17, and the removable door 20 may be manufactured of any suitable material selected in accordance with good engineering practices and manufactured using any suitable process selected in accordance with good engineering practices. It is believed that one suitable method of manufacturing the side panels, end panels and removable door is rotational molding using a dry polymeric powder as the starting material, that is to say each of these components is preferably molded as a single unit. In an exemplary device according to the present invention the side panels would have exterior dimensions of about forty inches by about thirty inches with the end panels having exterior dimensions of slightly greater than thirty inches by thirty inches to facilitate the attachment of the end panels to the side panels in a manner that is described below.

To facilitate moving, repositioning are reorienting the device the first side panel 12 is provided with one or more handles 23, 24 located on the exterior of the first side panel as shown in FIG. 1. To facilitate moving, repositioning are reorienting the device the second side panel 13 is provided with one or more handles 25, 26 located on the exterior of the second side panel as shown in FIG. 4. To facilitate moving, repositioning are reorienting the device the third side panel 14 is provided with one or more handles 27, 28 located on the exterior of the third side panel as shown in FIG. 3. To facilitate moving, repositioning are reorienting the device the removable door 20 that is secured to the fourth side panel 15 by a plurality, preferably at least four, latches 29 is provided with one or more handles 21, 22 located on the exterior of the removable door 20 as shown in FIG. 1. The one or more handles 21, 22 located on the exterior of the removable door 20 also facilitate the assembly and disassembly of the removable door 20 with the fourth side panel 15 as shown in FIG. 2. The structure of the handles 21-28 that are molded integral with the first 12, second 13 and third 14 side panels and the removable door 20 is best understood by referring now to FIG. 12 which is a plan view of the exterior side of one of the side panels 12-14; FIG. 16 which is a fragmentary cross section taken at line 16-16 of FIG. 12 of a handle on a side panel; and FIG. 1 which is a perspective view showing examples of the integrally molded handles 21-24 on a side panel 12 and the removable door 20. As shown in section in FIG. 16 each of the first, second and third side panels 12-14 is an integral molded polymeric component provided with a solid interior layer 120 provided with a surface 105 on the interior of the side panel or removable door, and a solid exterior layer 115 provided with a surface 116 on the exterior of the side panel or removable door, and with an intermediate foam layer 118 encased by the solid layers 115, 120 of the side panel or removable door. Air deflectors 107 that are solid and molded integral with the side panels, and which are described in detail below, protrude from an interior surface 105 of the solid interior layer 120 of each side panel. Each of the integrally molded handles has a first portion 124 that extends substantially perpendicularly from an exterior side of the side panel or removable door and a second portion 125 that extends substantially perpendicularly from the first portion 124 of the handle and is spaced apart from the exterior side of the side panel or removable door. A handle integrally molded to a side panel or removable door may further include one or more bracing members 126.

Figure 4A:
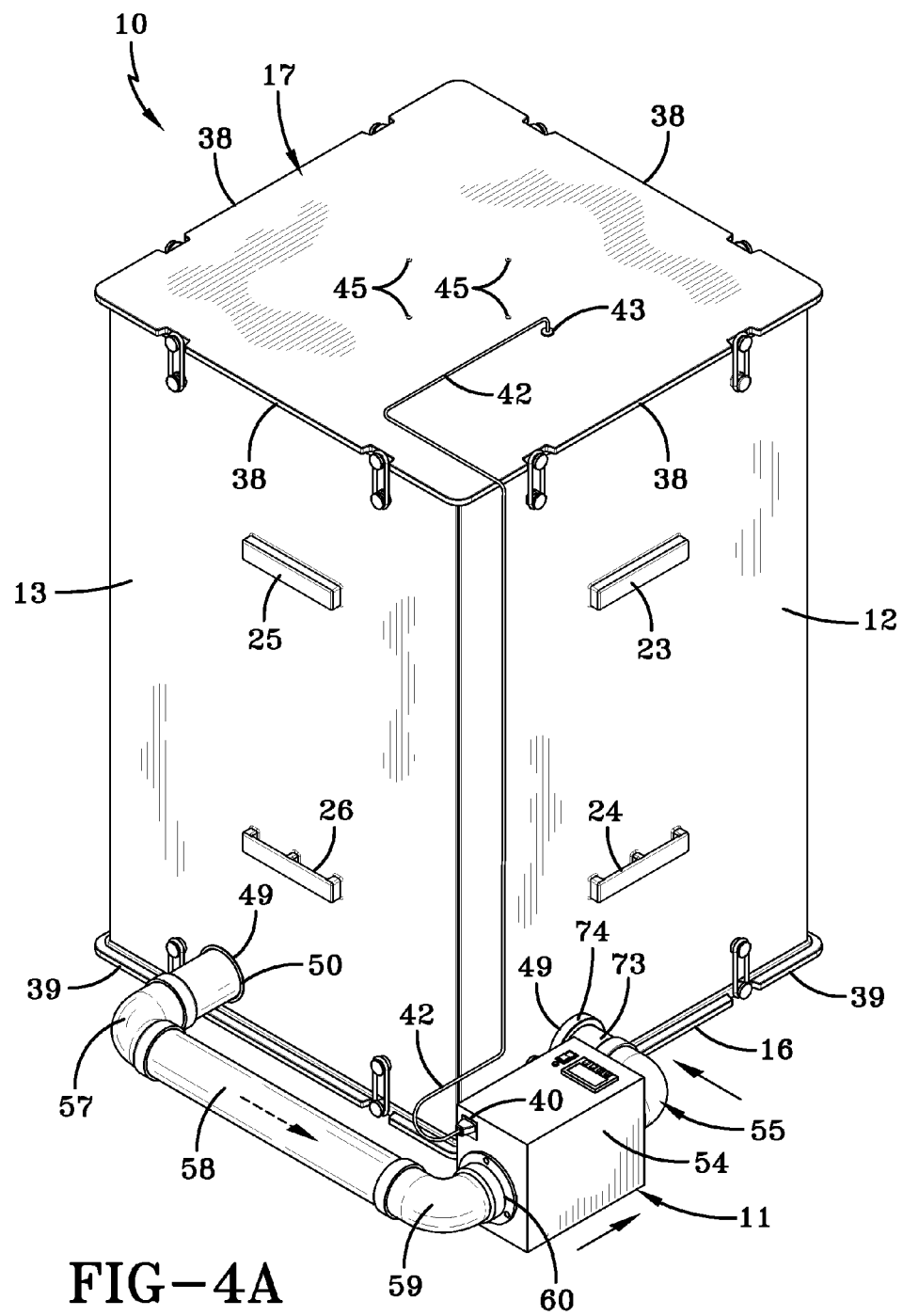
FIG. 4A is a perspective view of a second configuration of the first embodiment of the device.
Figure 5:
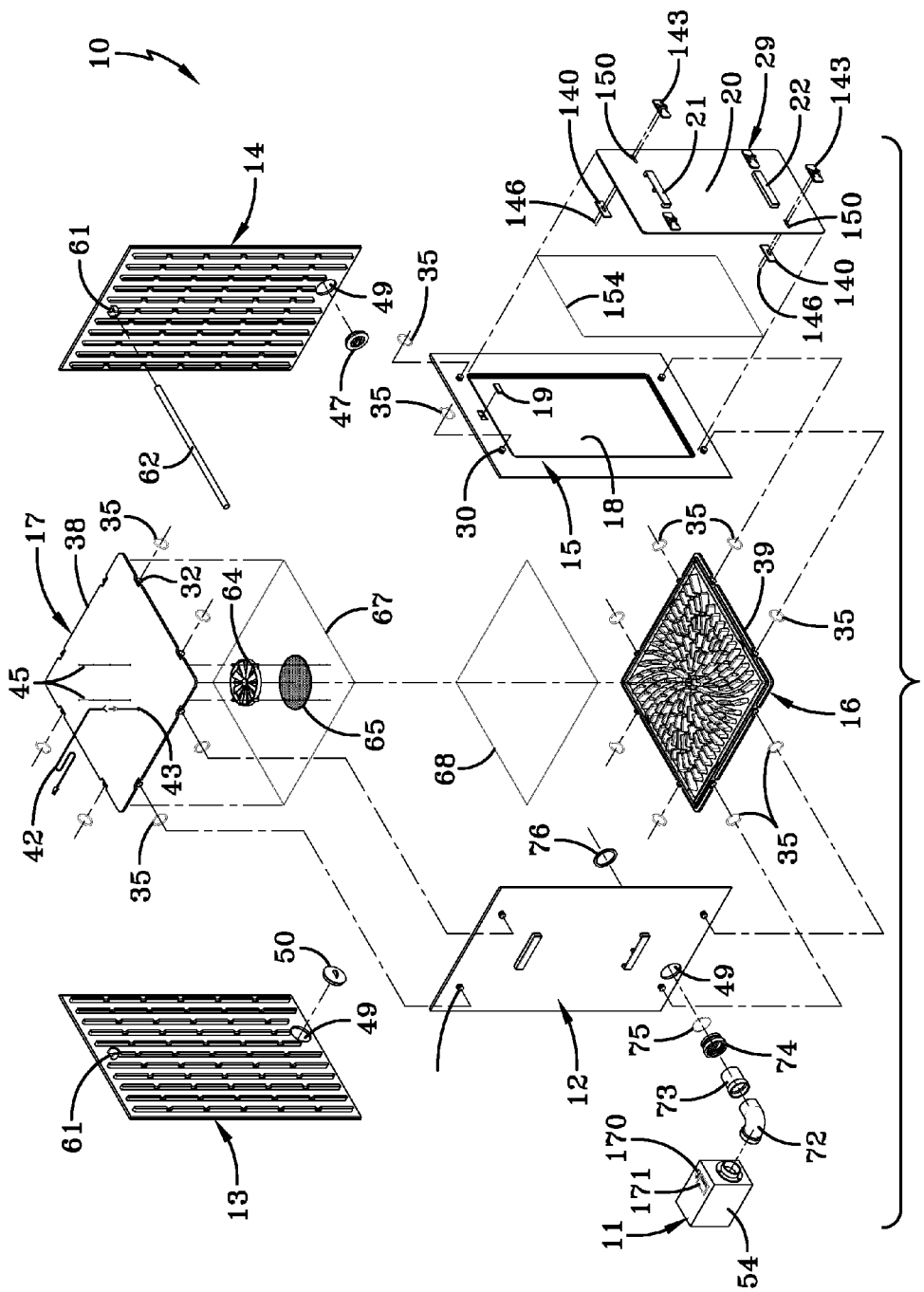
FIG. 5 is an exploded view of the device of the first configuration of the first embodiment of the device for killing insects with heat as shown in FIGS. 1-4.
Figure 7A:
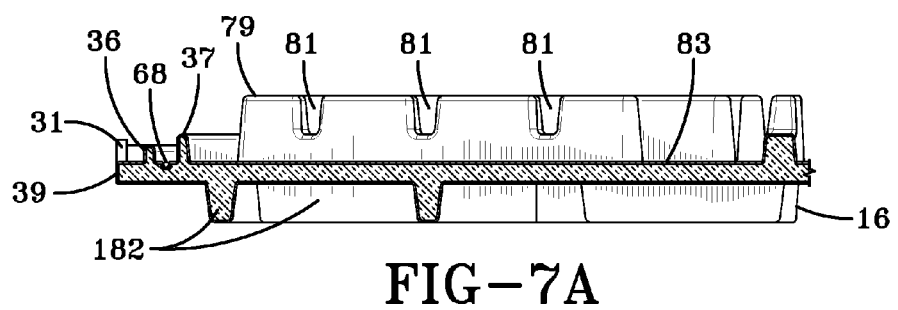
FIG. 7A is an enlarged cross section view taken at line 7A-7A of FIG. 7 showing the structural details of a raised air flow director that is a component of the end panel located at the bottom of the device in FIG. 1.
Figure 30A:
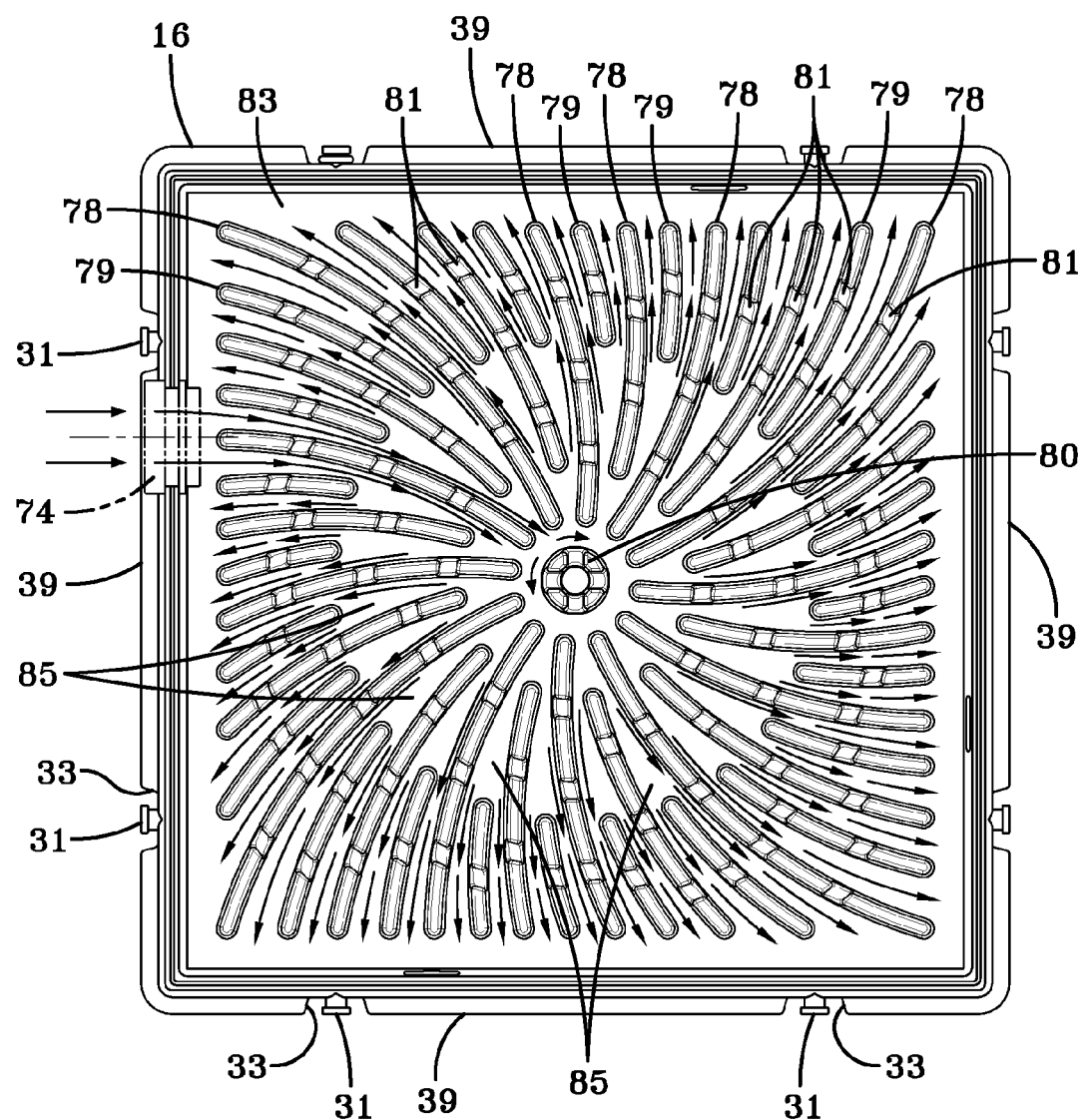
FIG. 30A is a top view looking down into the device with the end panel located at the top of the device in FIG. 1 and the hanger rod removed showing a schematic representation of air flow with respect to an interior side of the end panel located at the bottom of the device in FIG. 1.
Figure 30B:
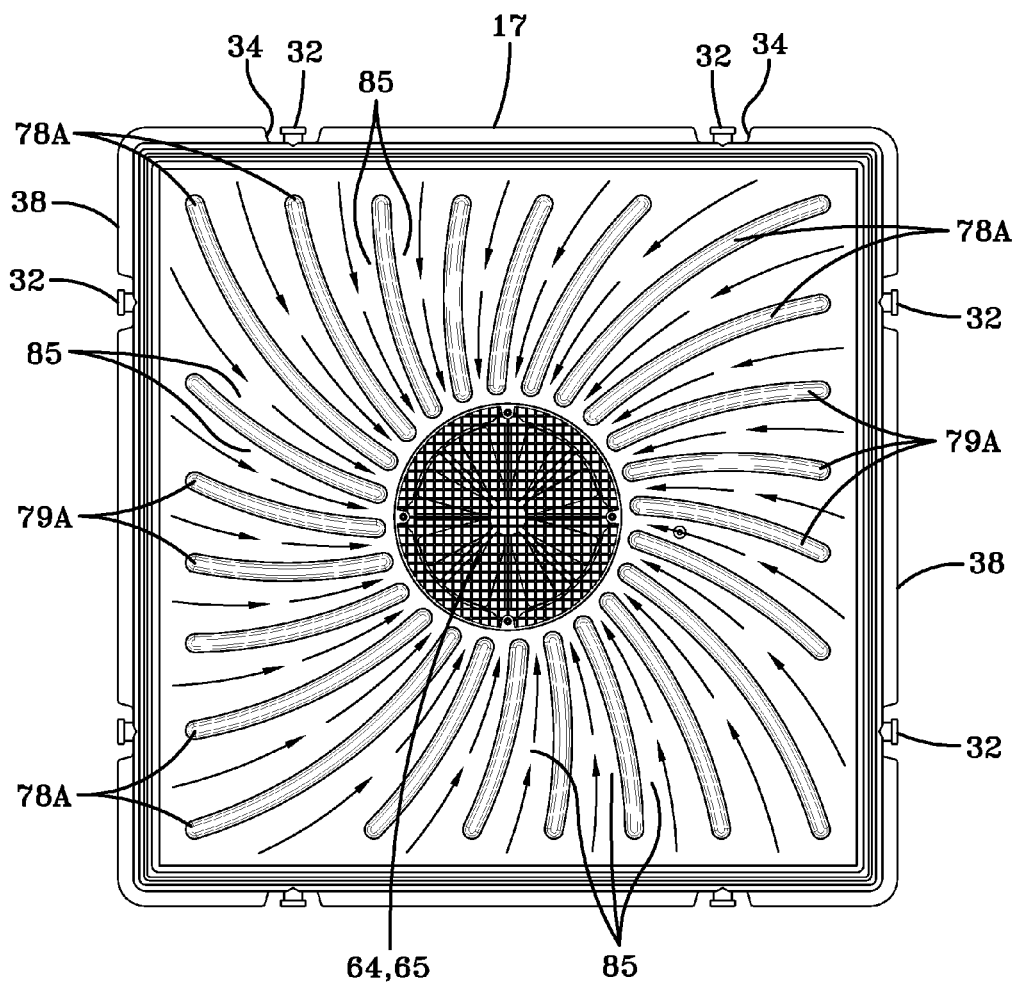
FIG. 30B is a schematic representation of air flow with respect to an interior side of the end panel located at the top of the device in FIG. 1.
Figure 30C:
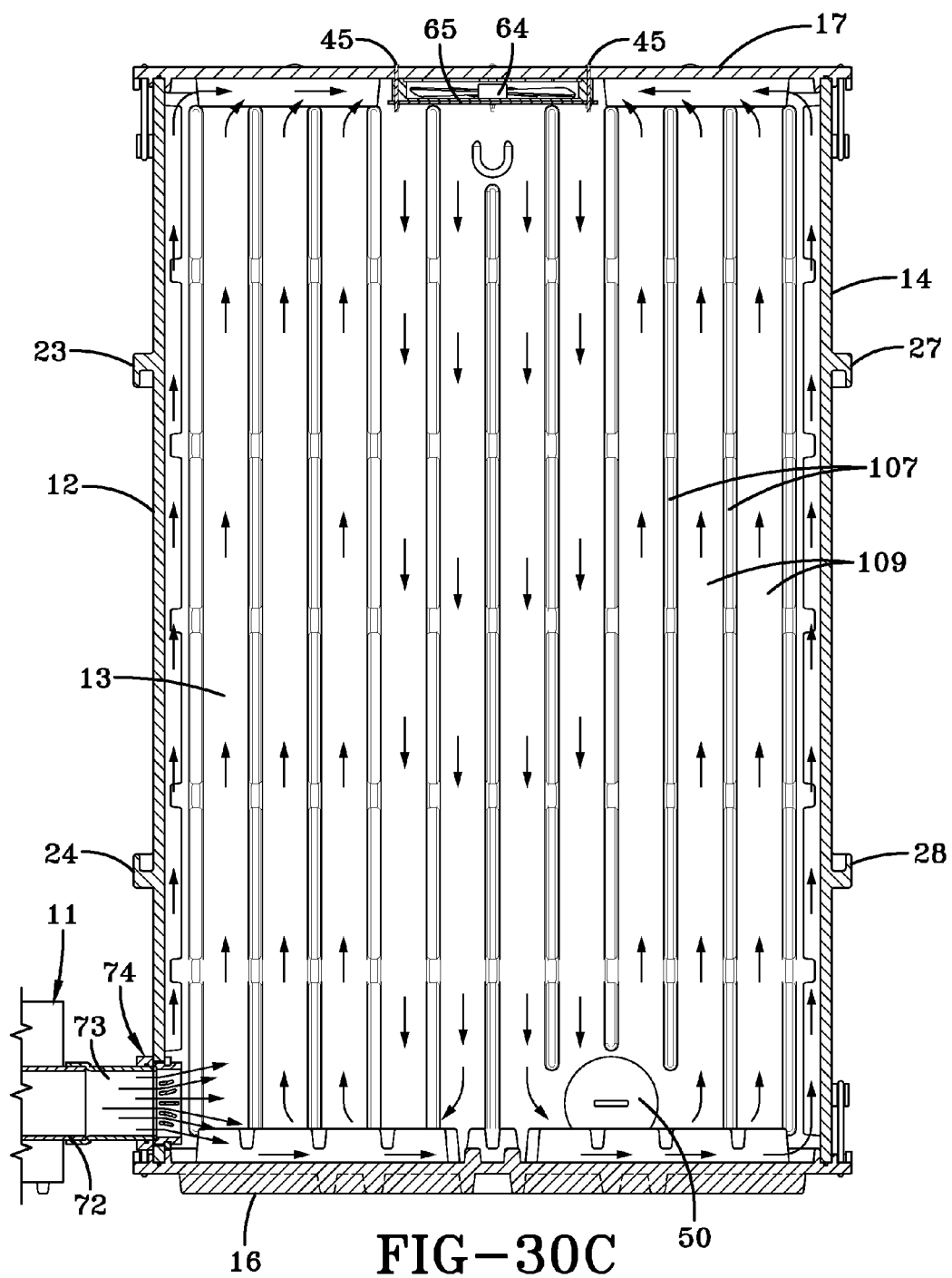
FIG. 30C is a schematic representation of air flow with respect to an interior side of side panel in a sectional view taken at line 30C-30C in FIG. 2.
Figure 48:
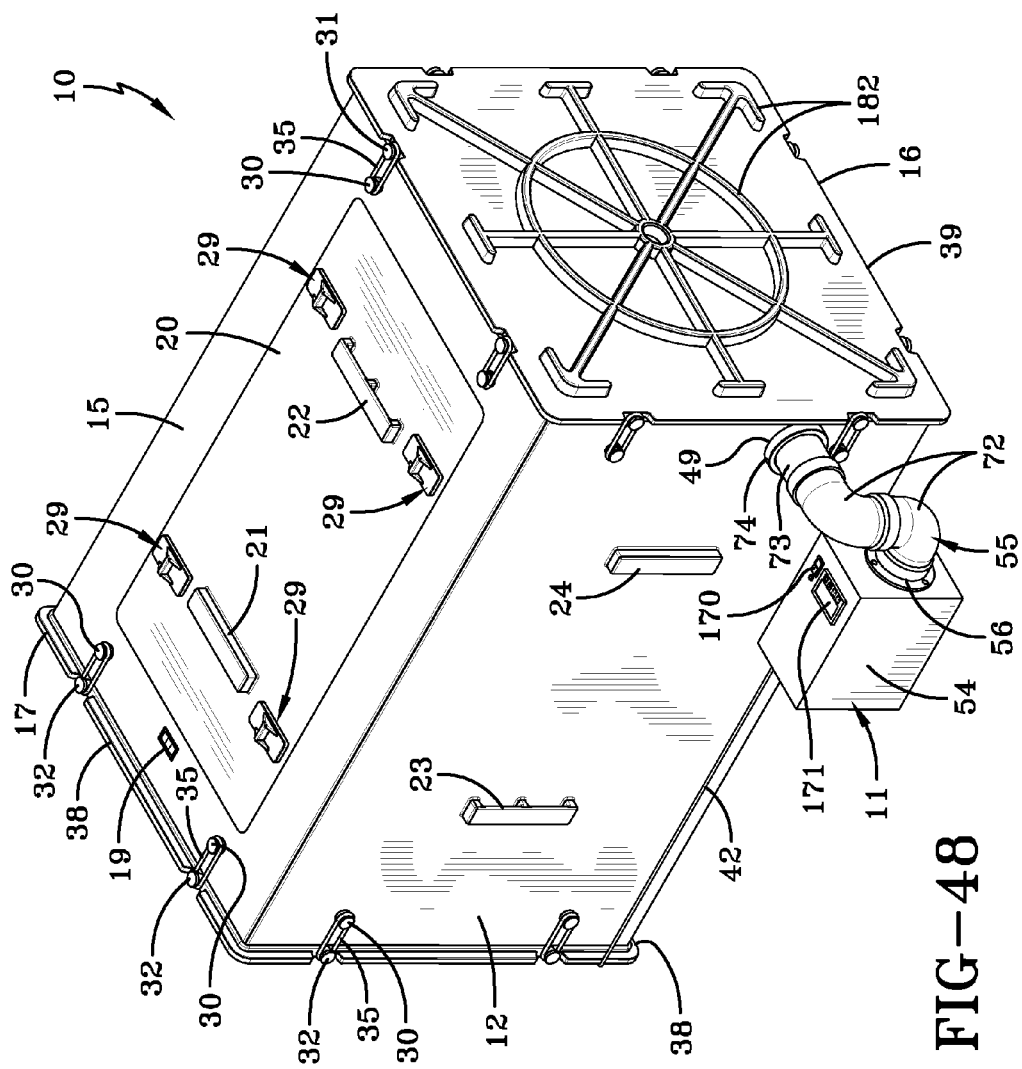
FIG. 48 is a perspective view of a third configuration of the first embodiment with the device resting on one of the side panels with the end panels oriented vertically.

The location and structure of a circulation fan 64 located inside the first embodiment of the device can be best understood by referring next to FIGS. 5, 30B and 30C. FIG. 5 there is shown an exploded view of the device 10 shown in FIGS. 1-4. FIG. 30B is a view looking towards the interior side of the second end panel 17. FIG. 30C is a schematic sectional representation of an interior side of the device taken at line 30C-30C in FIG. 2. A circulation fan 64 that is provided with a protective grill 65 is fixed to the interior of the second end panel 17 by appropriate fasteners 45. A power cord 42 conducts current to the circulation fan 64 and extends through the second end panel 17 via a passage 43 in the second end panel. The passage 43 for the power cord is provided with a grommet to provide a seal between the power cord 42 and the second end panel 17. The power cord 42 for the fan may for example extend to a power outlet 40 that is built into the electric heater 11 as shown in FIGS. 4 and 4A. The circulation fan 64 contributes to the circulation of hot air throughout the interior of the device 10 during operation of the device to kill insects inside the device using heat. The interior side of the end panel 17 that may be located at the top of the device 10 is provided with a plurality of curved air flow directors 78A, 79A. The structure of the second side panel 16 shown at the bottom of the device in FIG. 1 can be best understood with reference to FIGS. 7, 7A and 48. FIG. 7 is a top view looking down in the direction indicated by arrow 7 in FIG. 6 into the first configuration of the first embodiment of the device with the top end panel removed so the interior side of the bottom end panel 16 is visible. FIG. 7A is an enlarged cross section view taken at line 7A-7A of FIG. 7 showing the structural details of a raised air flow director that is a component of the end panel 16 located at the bottom of the device. FIG. 48 is a perspective view of the device showing an exterior side of the end panel 16. The interior side of the end panel 16 that may be located at the bottom of the device 10 is provided with a plurality of long and short curved stand offs 78, 79 and a central circular stand off 80 protruding from the end panel 16 and provided with a plurality of notches 81. The end panel 16 is further provided with features 31, 36, 37, and 68 to facilitate the assembly of the end panel with a side panel in a manner that is described below in detail. The exterior side of the end panel 16 is provided with protrusions 182 which support the device when the bottom panel is in contact with a floor or other horizontal surface so there is a space between the horizontal surface and the bottom of the device.

Figure 8A:
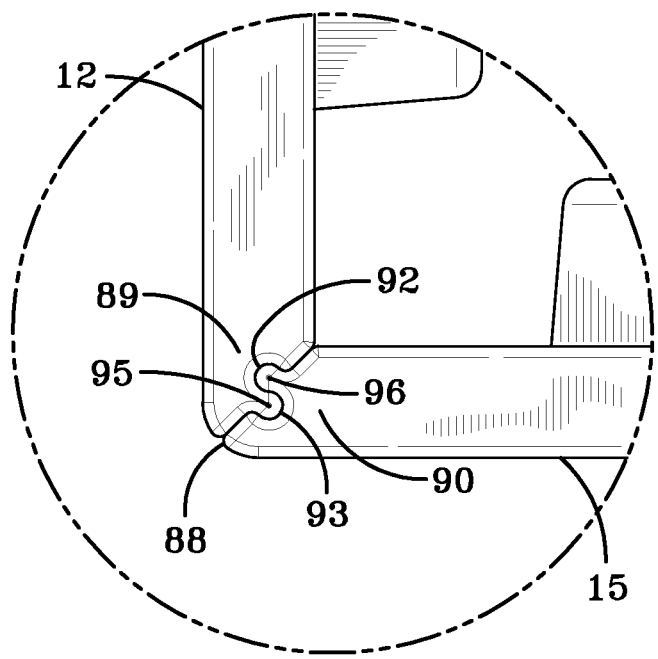
FIG. 8A is an enlarged fragmentary head on view taken at the location indicated in FIG. 7 showing two side panels fixed to one another in an interlocking manner.
Figure 8B:
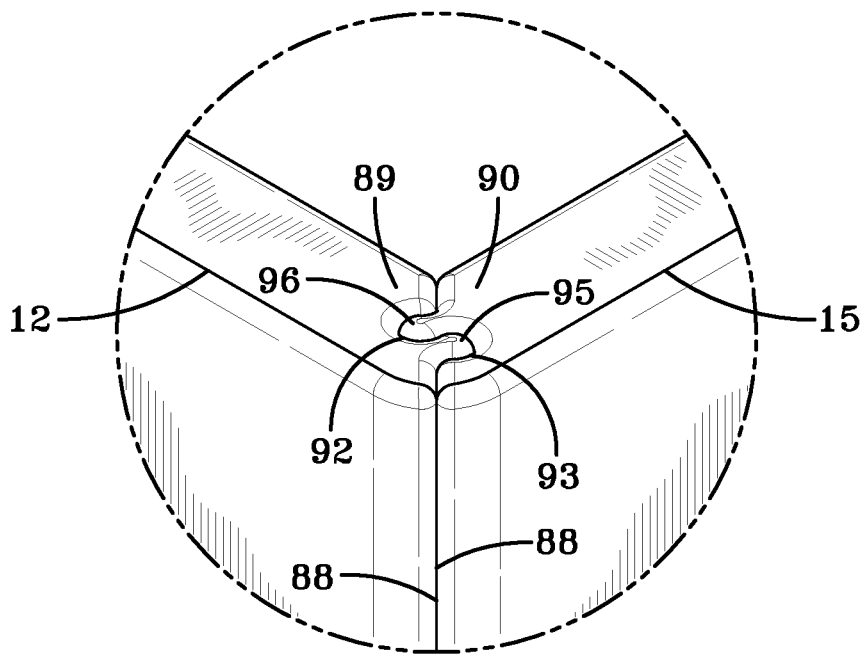
FIG. 8B is an enlarged fragmentary perspective view taken at the location indicated in FIG. 6 showing two side panels fixed to one another in an interlocking manner.
Figure 9A:
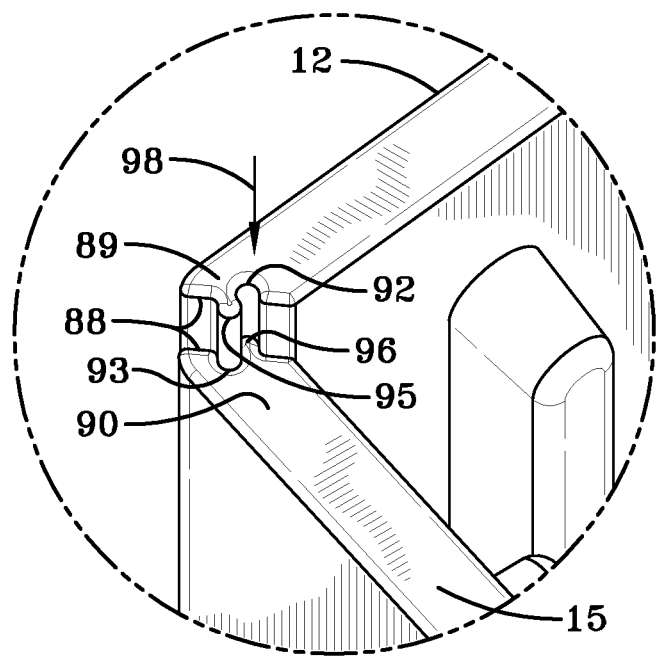
FIG. 9A is an enlarged fragmentary view illustrating the assembly of two side panels to one another by sliding interlocking features of the side panels into place.
Figure 9B:
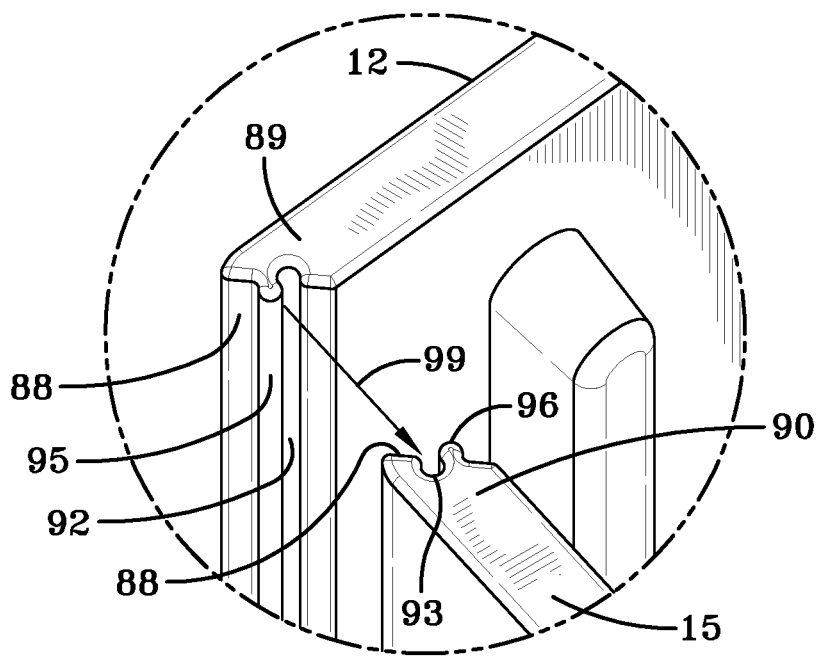
FIG. 9B is an enlarged fragmentary view illustrating the assembly of two side panels to one another by snapping interlocking features of the side panels into place.

Each of the side panels 12-15 is fixed to each of the adjacent side panels in an interlocking manner that facilitates easy assembly, disassembly and reassembly of the device 10 for killing insects with heat according to the present invention. The interlocking of each side panel to its' next adjacent side panels is best understood with reference to FIGS. 6-7, 8A-9B and 13. FIG. 6 is a perspective view of the device 10 with a top end panel removed to show two next adjacent side panels 12, 15 fixed to one another. FIG. 7 is a top view looking down towards the device with a top end panel removed. FIG. 8A is an enlarged fragmentary head on view taken at the location indicated in FIG. 7 looking down on two next adjacent side panels 12, 15 side panels fixed to one another in an interlocking manner. FIG. 8B is an enlarged fragmentary perspective view taken at the location indicated in FIG. 6 showing the two side panels 12, 15 fixed to one another in an interlocking manner. FIG. 9A is an enlarged fragmentary view illustrating the process of assembling the two next adjacent side panels 12, 15 to one another by sliding and/or snapping the interlocking features of the side panels into place. FIG. 9B is an enlarged fragmentary view illustrating the side panels 12, 15 not assembled to one another showing the interlocking features of the side panels. With reference to FIG. 13, which is a plan view of the interior side of an exemplary side panel 12, 13, 14 the longer opposing sides of a side panel are each provided with a tapered, mitered portion 88 extending the entire length of the side panel, and each of the side panels has shorter opposing ends 89-91, 170-172 extending between the longer opposing sides with the shorter opposing ends being flat instead of tapered or mitered.

As best seen in FIG. 7 each of the side panels 12-15 is provided with two mitered surfaces for mating with mitered surfaces of next adjacent side panels such that next adjacent side panels are disposed at least substantially perpendicular to one another and the device when viewed looking up towards or down towards the device has a rectangular, preferably square, shape as shown for example in FIG. 7.

Referring now to FIG. 9B a fragmentary perspective view of two side panels 12, 15 that are not yet fixed to one another shows the tapered, mitered portions 88 of the end panels and the flat ends 89, 90 of the end panels. The interlocking of mating tapered, mitered portions 88 of next adjacent end panels is achieved in this example by having each of the tapered mitered portions provided with at least one female indent 92, 93 that preferably extends the entire length of the tapered, mitered portion and at least one complementary male protrusion 95, 96 that preferably extends the entire length of the tapered, mitered portion. Each of male protrusions is fitted into a complementary female indent in another side panels as indicated by arrow 99. That is to say a tongue and groove joint is made to fix two next adjacent side panels resulting in a mitered ninety degree corner of the device for killing insects with heat. As shown in this example the male protrusions 95, 96 and the female indents 92, 93 include mating surfaces that are curved to facilitate the interlocking fixing of the next adjacent side panels to one another. It is to be understood that the sizes and shapes of the interlocking features may be of any configuration selected in accordance with good engineering practices. It is to be further understood that the interlocking features may preferably extend the entire lengths of the tapered, mitered portions of the end panels, but may in accordance with good engineering practices be discontinuous and extend along spaced apart lengths of the tapered, mitered portions of the end panels.

Referring next to FIG. 9A two side panels 12, 15 are shown partially fixed to one another with the male protrusion 95 of one side panel 12 disposed in the female indent 93 of a next adjacent side panel 15 and the male protrusion 96 of the side panel 15 disposed in the female indent 92 of the side panel 12. The insertion of the male protrusions into the female indents may be accomplished by aligning the mating components and simply sliding one of the side panels along the other side panel as indicated by arrow 98 in FIG. 9A. The sliding together of the two next adjacent slide panels continues until the ends 89, 90 of the side panels are adjacent to one another to form a mitered corner as shown in FIGS. 8A and 8B. FIG. 8A if a head on fragmentary view of a mitered interlocking joint fixing two next adjacent side panels 12, 15 to one another with the side panels disposed substantially perpendicular to one another. That is to say the flat ends 89, 90 of the assembled end panels merge together at the adjoining tapered mitered surfaces 88 to provide a flat end of the assembly with the male protrusions 95, 96 disposed in the female indents 92, 93 providing a rigid interlocking mitered joint. FIG. 8B is a fragmentary perspective view of the mitered joint shown in FIG. 8A. It is to be understood that each of the side panels 12-15 is assembled with and fixed to each of the next adjacent side panels by an interlocking mitered joint of the type that has been described herein. The interlocking mitered joints not only provide a rigid structure but prevent the escape of air and insects from the device for killing insects with heat.

As shown for example in FIG. 1 the side panels of the device for killing insects with heat are fixed to a pair of end panels 16, 17. As shown for example in FIGS. 7A, 34, 40, and 42 a pair of spaced apart substantially parallel protrusions 36, 37 extend from an interior surface of each of the end panels 16, 17 to define a channel 200, 207 for receiving an edge portion of a side panel, for example 14, in the channel 200, 207. Each of the channels has a base that is provided with a groove 201, 208 that receives a gasket 67, 68 to seal the junctions of the side panels with the end panels. That is to say the end panels 16, 17 are mated to the side panels 12-15 by placing an end portion of each side panel in a channel provided by an end panel. Each of the side panels 12-15 is provided with one or more mechanism for fixing the side panel in place with respect to the end panels after edge portions of the side panel have been inserted in the channels 200, 207 of the end panels for receiving an edge portion of a side panel. While any suitable mechanism selected in accordance with good engineering practices may be employed for fixing the side panel in place with respect to the end panels after edge portions of the side panel have been inserted in the channels 200, 207 of the end panels recommended exemplary mechanisms 20, 31, 35; 30, 32, 35 are shown for example in FIGS. 1, 1A, 1B, 5, 17, 18, 19, 30C and 39. Each of the side panels is provided with four or more studs 30. As used herein and in the claims a "stud" is understood to be an isolated cylindrical member extending substantially perpendicular from a structural member and provided at an end of the cylinder with a means such as a flange for impairing something wrapped around the cylinder from sliding off of the cylinder. Each of the end panels 16, 17 is provided with a plurality of studs 31, 32. FIG. 1 A is an enlarged fragmentary view of the device showing the attachment of a side panel 15 to an end panel 17 located at the top of the device 10 in FIG. 1. FIG. 1B is an enlarged fragmentary view of the device showing the attachment of a side panel 15 to an end panel 16 located at the bottom of the device 10 in FIG. 1. The studs 31, 32 of the end panels are located in the vicinity of edges 38, 39 of the end panels. Notches 33, 34 in the end panels facilitate alignment of the studs of the end panels with aligned studs of the side panels.

Figure 52:
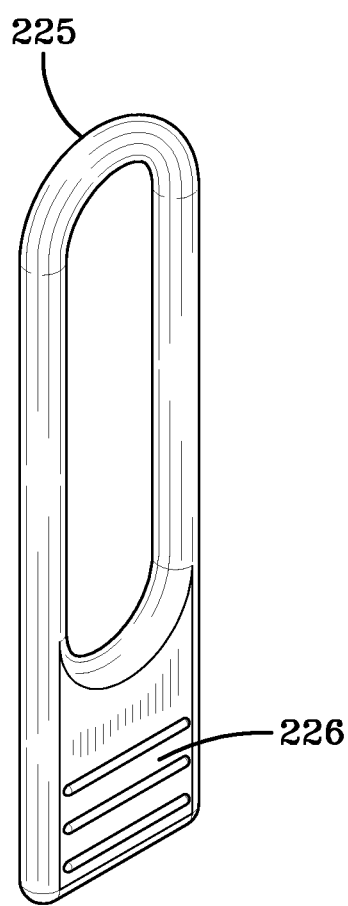
FIG. 52 is a plan view of an alternate elastomeric fastening device including a tab.
Figure 53:
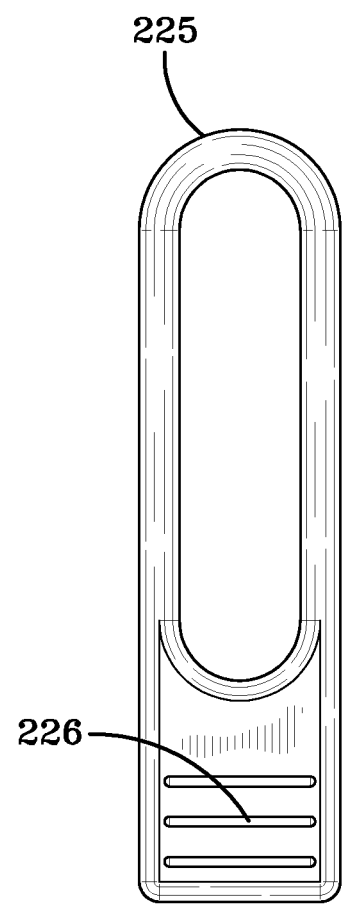
FIG. 53 is a perspective view of the alternate elastomeric fastening device of FIG. 52.

FIG. 17 is a fragmentary cross section taken at line 17-17 of FIG. 14 showing a cross section of a stud 30 that is preferably integrally molded with the side panel 12, 13, 14. FIG. 18 is a fragmentary cross section taken at line 18-18 of FIG. 14 showing a side view of a stud that is integrally molded with a side panel 12, 13, 14. Each of the side panels and end panels is preferably molded of a polymeric material whereby the panel has a foam core 118 enclosed in a hard shell 105, 115. Each stud 30 is a cylinder 130 provided with a flange 129 extending substantially perpendicular from the cylinder and in this example has a reinforcing portion 128 in the region where the stud extends substantially perpendicular from a side or end panel of the device. In the illustrated recommended exemplary mechanisms an endless elastic polymeric member 35 is placed around two aligned studs by first stretching the elastic polymeric member to extend about the two aligned studs and then allowing the elastic polymeric member to retract into a taut condition that secures the studs and associated end and side panel in a fixed position with respect to one another. As shown for example in FIG. 5 the elastic polymeric members 35 may have an annular structure like an O ring. Alternatively the elastic polymeric members may have any suitable configuration for example such as shown in FIG. 52 which is a plan view of an alternate endless elastic polymeric member 225 including a tab 226 and FIG. 53 which is a perspective view of the alternate elastic polymeric member of FIG. 52. These fastening mechanisms facilitate relatively easy assembly and disassembly of the end panels to the side panels to facilitate shipping and storage of a device for killing insects using heat according to the present invention.

As already described above and as shown in FIGS. 1, 2, 5, and 19 one of the side panels 15 is provided with an opening 18 for receiving a removable door 20 to facilitate placing items such clothing, bedding, books and other items inside the device 10 for killing insects with heat and then removing the items from the device after decontaminating the items with heat. It is to be understood that the door could be fixed to a side panel with one or more appropriate hinges, but it is believed that better access to the interior of the device is achieved by having the door removable from the device. FIG. 21 is a perspective view of the exterior side of the door receiving side panel 15 without the door. FIG. 22 is a perspective view of the interior side of the door receiving side panel 15 without the door. The side panel that receives the door 20 is provided with an opening 18 that is complementary to the size of the door with a groove 155 in the door frame for receiving a sealing gasket 154 as shown in FIGS. 2 and 5. A circumferential edge 153 of the door mates with the gasket 154 to prevent the loss of heat and the escape of insects during the operation of the device. The side panel 15 that receives the door 20 is similar to the structure of the other side panels being provided with studs 30 and air flow guiding projections 107 separated by air flow spaces 109 and provided with notches 110 for supporting racks in a manner that will be described later.

Figure 23:
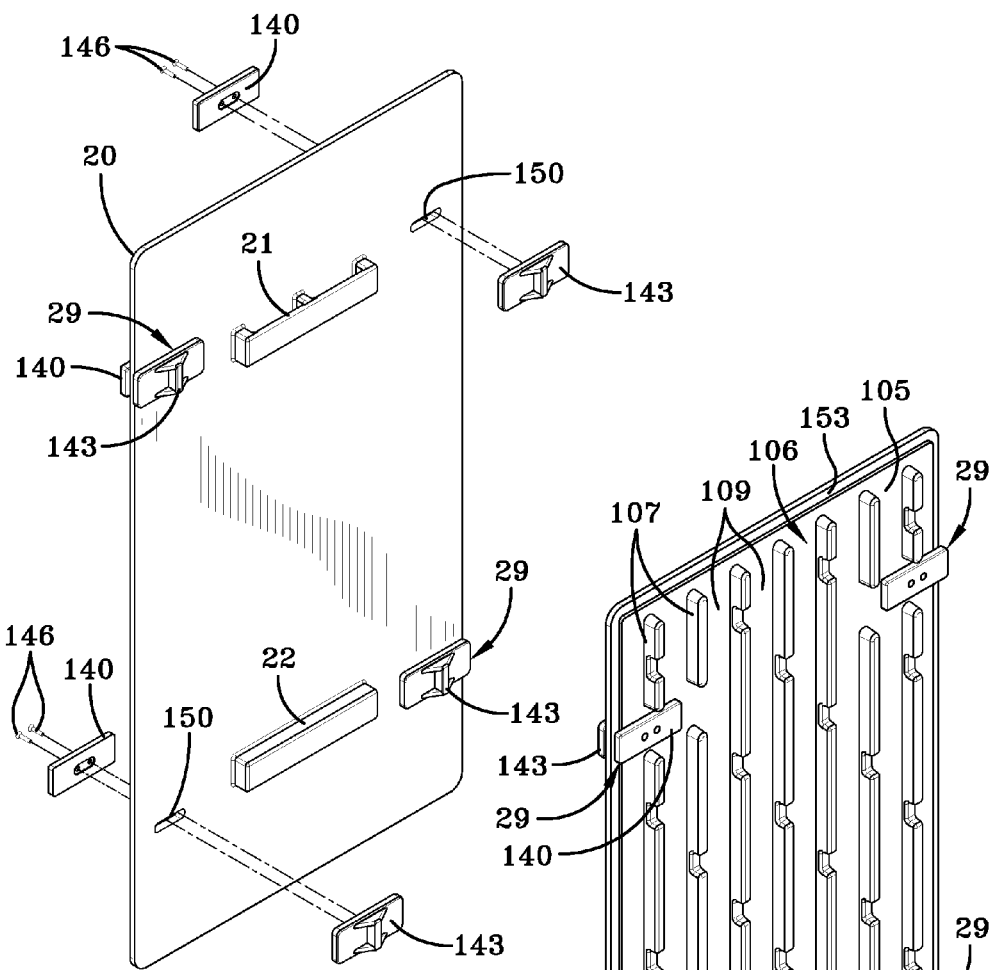
FIG. 23 is an exploded perspective view of the exterior side of the door.
Figure 24:
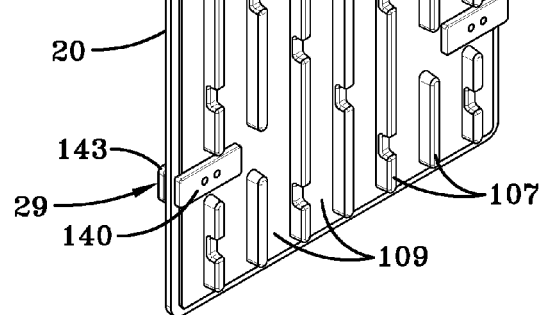
FIG. 24 is a perspective view of the interior side of the door with the latches disposed in unlocked configurations.

FIG. 23 is an exploded perspective view of the exterior side of the door 20 and FIG. 24 is a perspective view of the interior side of the door with the latches 29 disposed in unlocked configurations. The interior side of the door 20 is similar to the structure of the side panels being provided with air flow guiding projections 107 separated by air flow spaces 109 and provided with notches for supporting racks in a manner that will be described later. The door is provided with handles 21, 22 located on the exterior of the door in a manner described above with respect to the other three side panels to facilitate moving, repositioning are reorienting the device as well as the placement and removal of the door.

Figure 25:
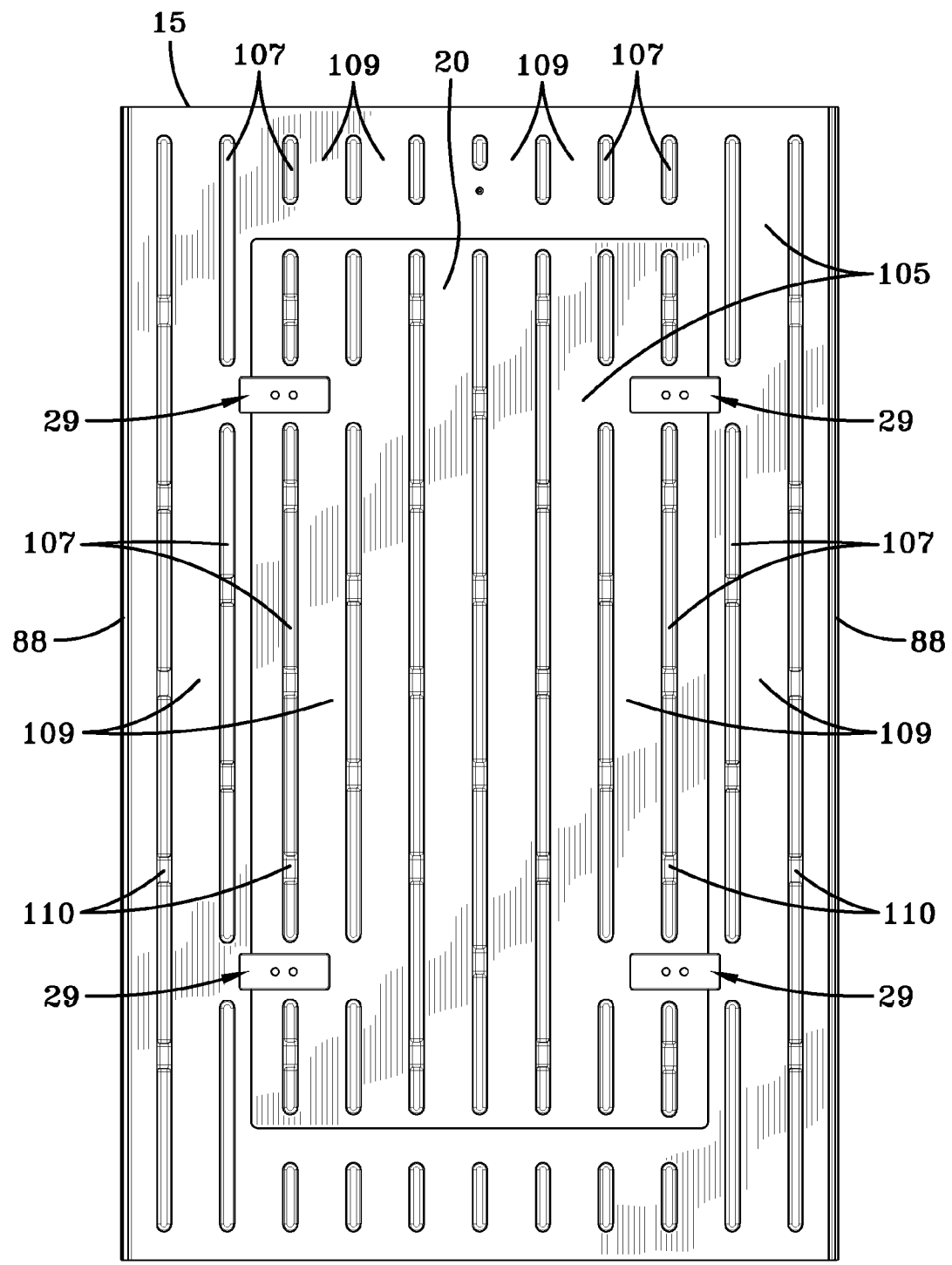
FIG. 25 is a plan view of the interior side of the assembly of the door receiving side panel and the door with the latches disposed in locked configurations.
Figure 26:
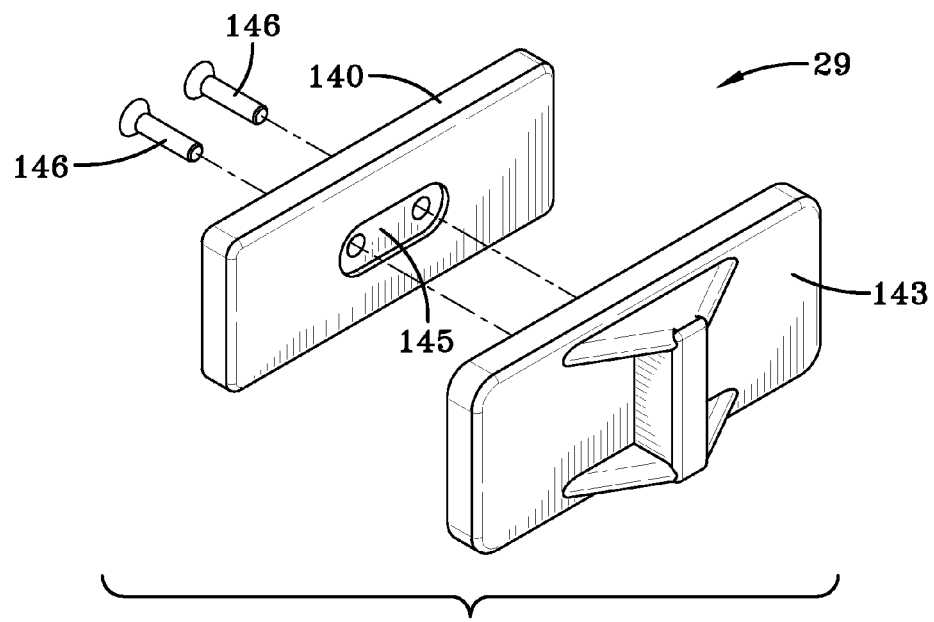
FIG. 26 is a first exploded perspective view of a door latch.
Figure 27:
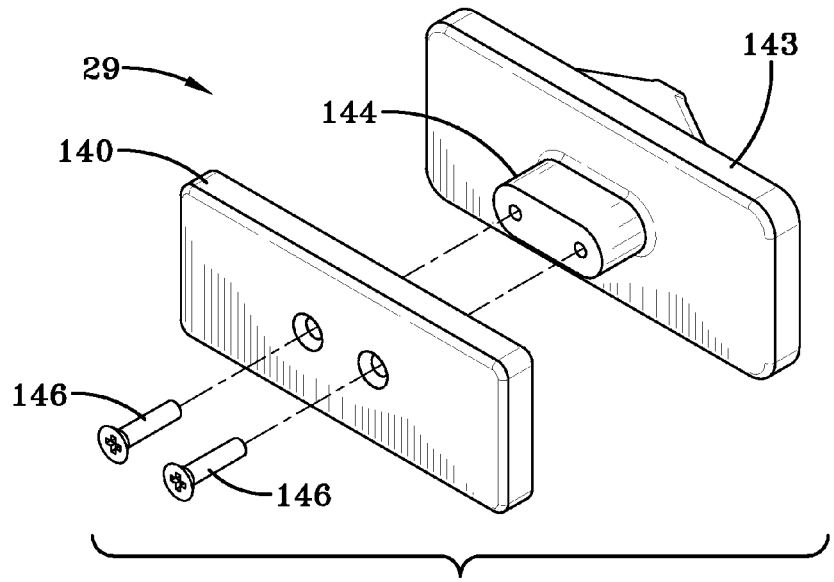
FIG. 27 is a second exploded perspective view of the door latch of FIG. 26 looking in an opposite direction from FIG. 26.
Figure 28A:
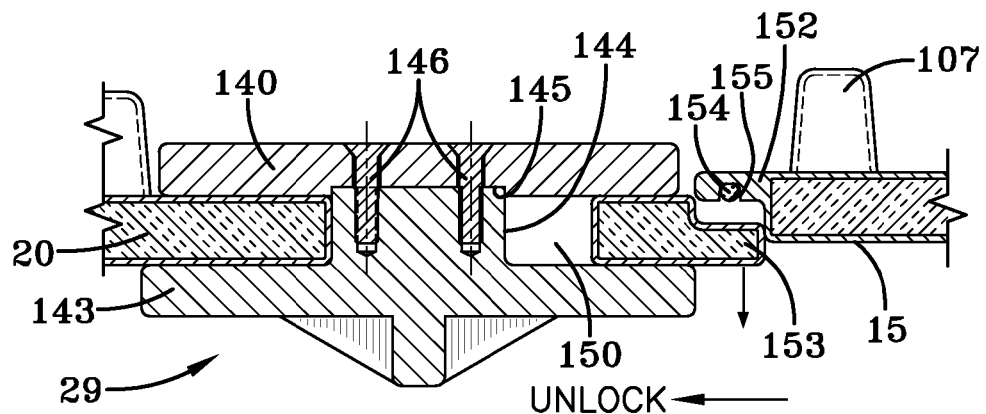
FIG. 28A is a fragmentary cross section taken at line 28A-28A in FIG. 19 with the door latch in an unlocked configuration.
Figure 28B:
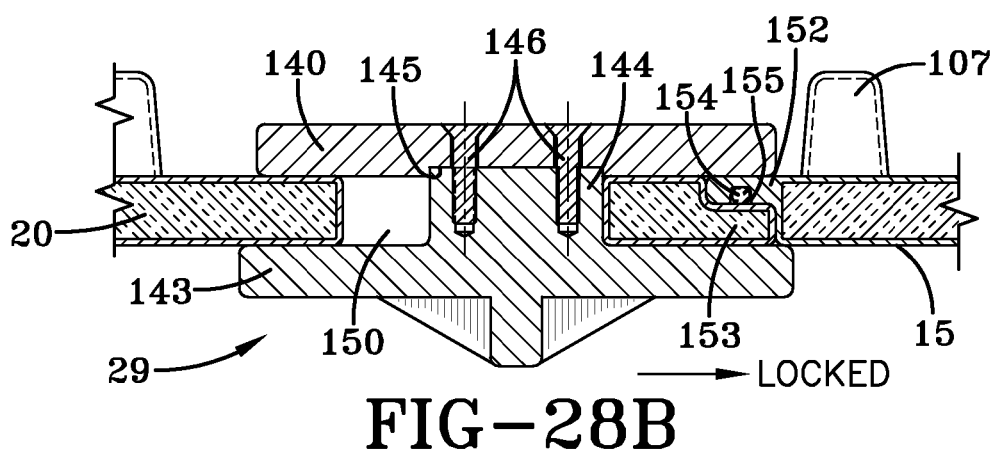
FIG. 28B is a fragmentary cross section taken at line 28B-28B in FIG. 20 with the door latch in an unlocked configuration
Figure 29:
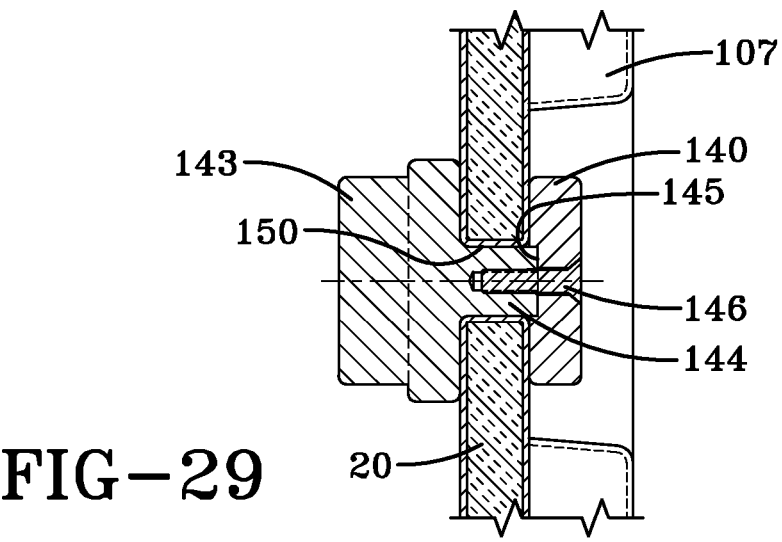
FIG. 29 is a fragmentary cross section taken at line 29-29 in FIG. 19 with the door latch in an unlocked configuration.

It is to be understood that latches of any suitable structure selected in accordance with good engineering practices may be used to secure the door in place with respect to the side panel that receives the door. The structure and operation of the exemplary door latches 29 shown in the drawings is best understood with reference to FIGS. 23, and 26-29. FIG. 23 is an exploded perspective view of the exterior side of the door 20. FIG. 26 is a first exploded perspective view of a door latch 29 and FIG. 27 is a second exploded perspective view of the door latch of FIG. 26 looking in an opposite direction from FIG. 26. As shown in FIG. 23 the door 20 is provided with appropriately located slots 150 for attaching the latches 29 to the door in an operative manner. A latch base plate 140 is located on the interior side of the door. A latch handle 143 is located on the exterior side of the door. A boss 144 of the latch handle extends through the slot 150 in the door to be received in a complementary recess 145 in the base plate 140. Threaded fasteners 146 extend through passages in the base plate to fix the base plate to the boss 144 of the latch handle as shown in the drawing figures. FIG. 28A is a fragmentary cross section taken at line 28A-28A in FIG. 19 with the door latch in an unlocked configuration. FIG. 28B is a fragmentary cross section taken at line 28B-28B in FIG. 20 with the door latch in an unlocked configuration. FIG. 29 is a fragmentary cross section taken at line 29-29 in FIG. 19 with the door latch in an unlocked configuration. The boss 144 has a length that is less than a length of the slot 150 in the door 20. At an end of the slot 150 the door 20 is provided with a ledge 152 having a recess 155 therein for receiving a sealing gasket 154. Another sealing gasket 153 is secured between the base plate 140 and the latch handle to prevent the loss of heat and the escape of insects when the device is in use. FIG. 20 is a perspective view of the interior side of the assembly of the door receiving side panel 15 and the removable door 20 with the latches disposed in unlocked configurations and FIG. 25 is a plan view of the interior side of the assembly of the door receiving side panel and the door with the latches disposed in locked configurations.

In a first embodiment of the device 10 for killing insects with heat the mechanism 11 for providing heated air to the interior of the device is disposed outside the device as shown in FIGS. 1, 2, 4, 4A, 5, 34, 43 and 44. In a first configuration of the first embodiment as shown in FIGS. 1, 2, 4, 5 and 43 the air intake 60 allows ambient air to enter the electric air heater 54. The electric air heater 154 of all configurations of the first embodiment is provided with a switch 170 to turn the electric air heater on and off. Preferably as shown in FIG. 34 the electric air heater 54 is supported on feet 180. The electric air heater 54 of all configurations of the first embodiment is further provided controls 171 with for setting the temperature, blower speed and other operating parameters. As best shown in FIG. 4 the electric air heater 54 of all configurations of the first embodiment has a power cord 41 for conducting electrical current from a power source to the electric air heater. The electric air heater 54 of all configurations of the first embodiment is still further provided with electric heating coils and a blower motor and electric fan to heat air and propel the heated air through a conduit 55, 56, 72, 73 and baffled connecter 74 into the interior of the device 10 as shown for example in FIG. 34. The conduit 55, 56, 72, 73 may be made from any suitable material selected in accordance with good engineering practices, preferably a suitable polymeric material such as sections of PVC piping.

Figure 33:
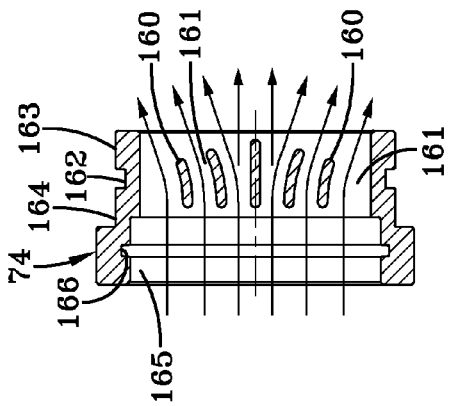
FIG. 33 is a cross section view of the air conduit of FIGS. 31A, 31B and 32 taken at line 33-33 of FIG. 32.
Figure 31B:
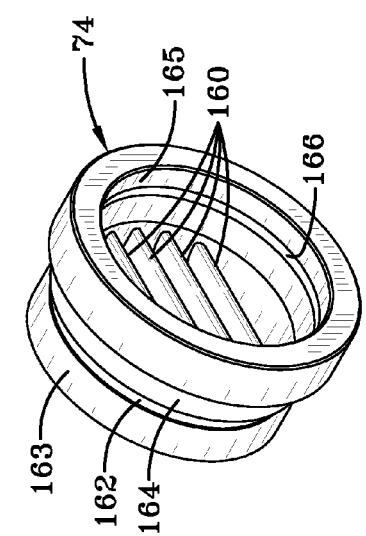
FIG. 31B is a second perspective view of the nozzle of the air conduit of FIG. 31A looking in an opposite direction from FIG. 31A.
Figure 32:
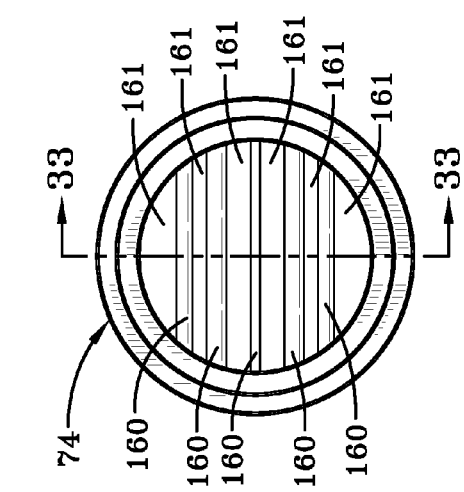
FIG. 32 is an end view of the nozzle of the air conduit of FIGS. 31A and 31B.
Figure 31A:
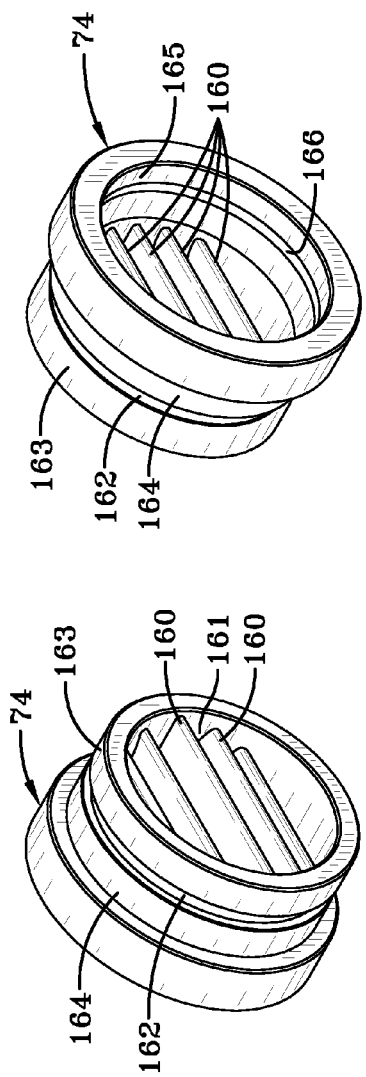
FIG. 31A is a first perspective view of a nozzle of an air conduit provided with louvers.
Figure 39:
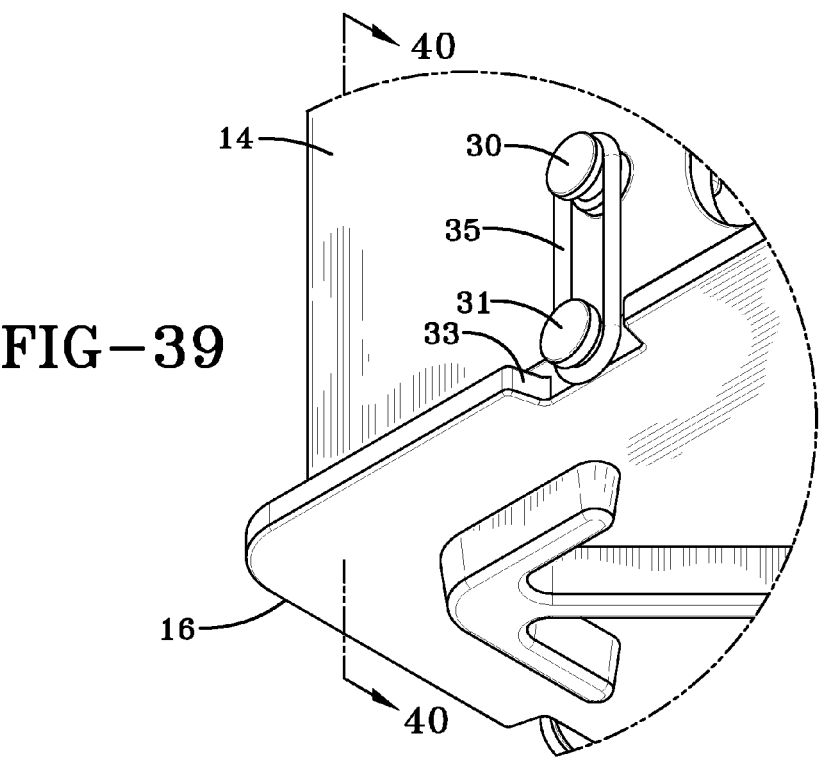
FIG. 39 is a fragmentary perspective view showing the junction of the end panel located at the bottom of the device in FIGS. 1-4A to a side panel looking generally upwards toward the exterior of the device.
Figure 40:
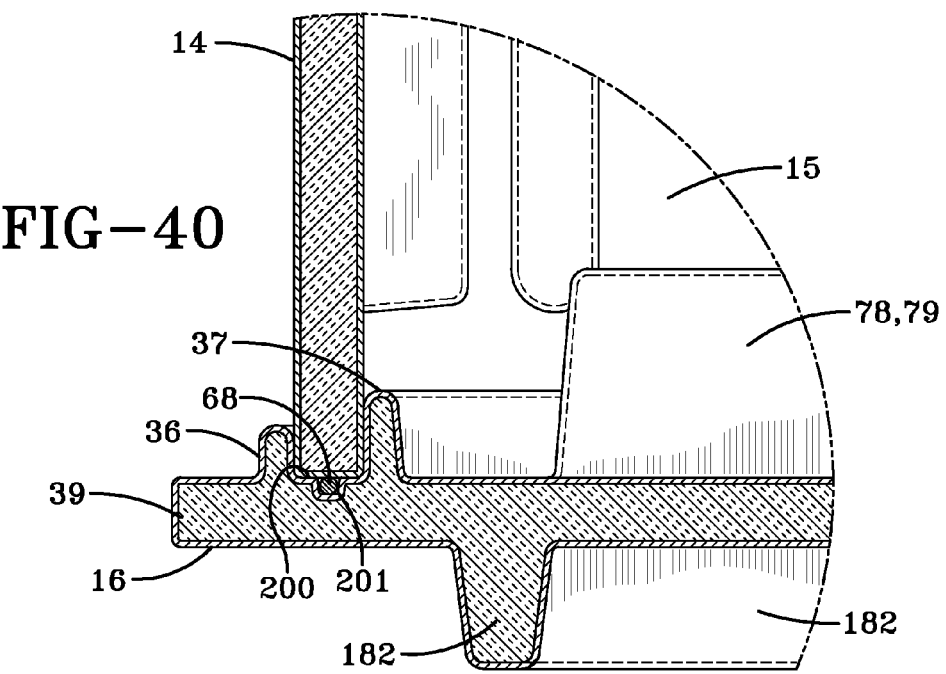
FIG. 40 is a fragmentary cross section taken at line 40-40 in FIG. 39 showing the junction of one of the side panels with the end panel located at the bottom of the device in FIGS. 1-4A.

The structure of the baffled connector 74 is best understood by referring to FIGS. 31A-33. FIG. 31A is a first perspective view of a baffled connector that functions as a nozzle of the air conduit and is provided with louvers. FIG. 31B is a second perspective view of the baffled connector of FIG. 31A looking in an opposite direction from FIG. 31A. FIG. 32 is an end view of the baffled connector of FIGS. 31A and 31B. FIG. 33 is a cross section view of the baffled connector of FIGS. 31A, 31B and 32 taken at line 33-33 of FIG. 32. The baffled connector is provided with an exterior configuration with sections 163, 164 having varying sizes to function as a step down transition from the air conduit 73 to fit inside a passage 49 (best shown in FIG. 6) in one of the side panels 12. An interior surface 165 of the baffled connector is provided with a circumferential groove 166 for receiving an O ring 75 to facilitate a snug connection between the baffled connector and a section 73 of the air conduit extending between the air heater 54 and the device 10. A circumferential groove 162 in an exterior surface of the baffled connector receives a snap ring 76 to secure the baffled connector in place with respect to the side panel 12 which is adjacent a stepped portion 164 of the exterior of the baffled connector. The baffled connector is further provided with a plurality of louvers 160 defining air passages 161 between next adjacent louvers and the interior wall 165 of the baffled connector. The baffled connector may be made from any suitable material selected in accordance with good engineering practices, preferably a suitable polymeric material.

As shown in FIG. 4 in the first configuration of the first embodiment of the device 10 the passage 49 in one of the side panels 13 is closed by a cover plate 50 to prevent the exit of air and insects from the interior of the device and the passage 49 in another 14 of the side panels has a HEPA filter assembly 47 installed therein to facilitate the exit of air from the interior of the device 10 while preventing the exit of insects from the interior of the device. The structure of the HEPA filter is best understood by referring to FIGS. 35-38. FIG. 35 is a perspective view of a HEPA filter assembly 47. FIG. 36 is an exploded view of the HEPA filter assembly 47. FIG. 37 is an end view of the HEPA filter assembly 47. FIG. 38 is a cross section of the HEPA filter assembly 47 taken at line 38-38 of FIG. 37. The exemplary HEPA filter assembly comprises a filter housing 190, a HEPA filter 191 a hold down ring 192. The HEPA filter assembly is secured to a side panel of the device as shown in FIG. 38.

In a second configuration of the first embodiment air from inside the device 10 is circulated and reheated as shown in FIG. 4A via an air conduit 50, 57, 58, 59 extending from a passageway 49 in a side panel 13 of the device to the air intake 60 of the air heater 54. This second configuration does not require a HEPA filter and in place of the HEPA filter the opening 49 that in a side panel that received the HEPA filter is instead sealed by a cover plate 50 to prevent the exit of air and insects from the interior of the device.

Figure 49:
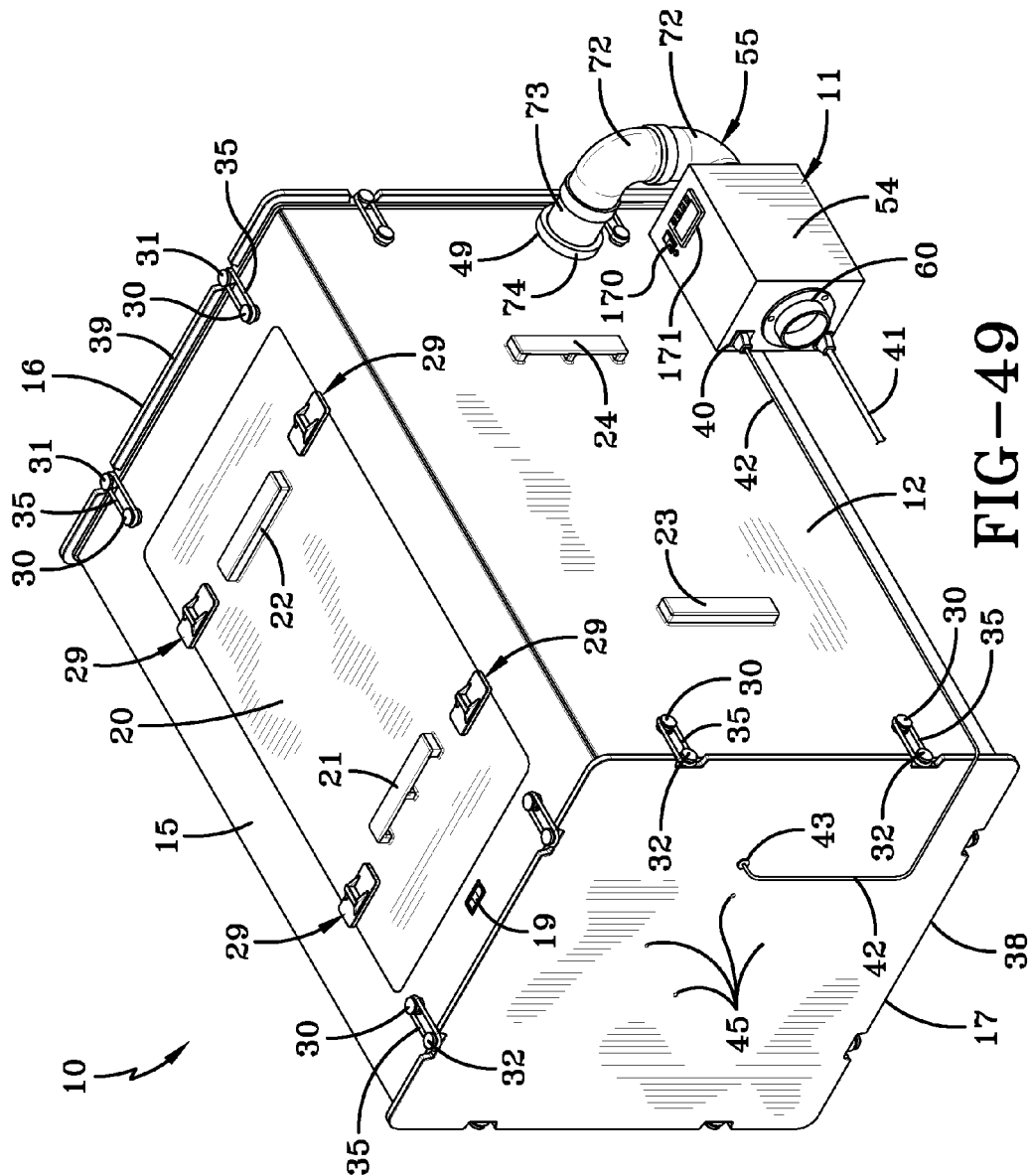
FIG. 49 is another perspective view of the third configuration of the first embodiment of the device resting on one of the side panels as in FIG. 48 looking in the opposite direction from FIG. 48.

The versatility of the first embodiment may be further demonstrated by referring to FIGS. 48-51. FIG. 48 is a perspective view of a third configuration of the first embodiment with the device 10 resting on one of the side panels with the end panels 16, 17 oriented vertically. FIG. 49 is another perspective view of the third configuration of the first embodiment of the device resting on one of the side panels as in FIG. 48 looking in the opposite direction from FIG. 48. FIG. 50 is a first side elevation view of the third configuration of the first embodiment of the device resting on one of the side panels as shown in FIG. 48. FIG. 50A is a second side elevation view of the third configuration of the first embodiment of the device resting on one of the side panels as shown in FIG. 48 looking in the opposite direction from FIG. 50. FIG. 51 is an end elevation view of the third configuration of the first embodiment of the device resting on one of the side panels as shown in FIG. 48. In this third configuration of the first embodiment a device according to the first embodiment shown in FIGS. 1-4 and 5-30 is oriented resting on one of the side panels with the end panels 16, 17 oriented vertically instead of horizontally as shown with respect to the first configuration of the first embodiment. As best shown in FIGS. 50 and 50A the device 10 rests on a floor or other horizontal surface via the handles 25, 26 that are integral to the lowest of the side panels. All of the components of the device function the same and are the same as those shown and described above and are identified by the same reference characters according to the first embodiment shown in FIGS. 1-4 and 5-30. This configuration may be employed at the discretion of a user of the device if the items to be placed in the device might be better fitted into such a configuration of the device.

Figure 44:
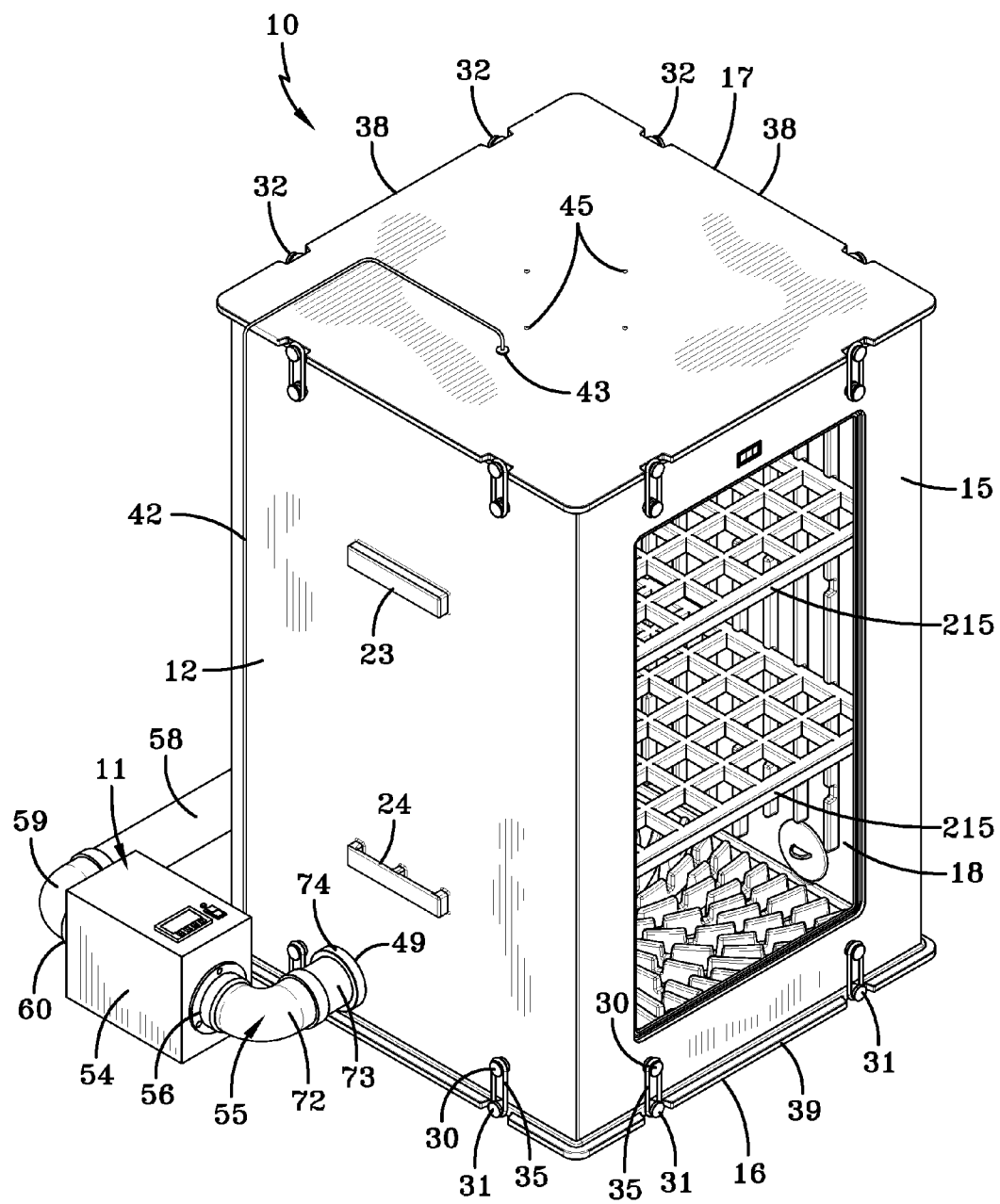
FIG. 44 is a perspective view of the third configuration of the first embodiment of the device with the door removed to show the interior of the device.
Figure 44A:
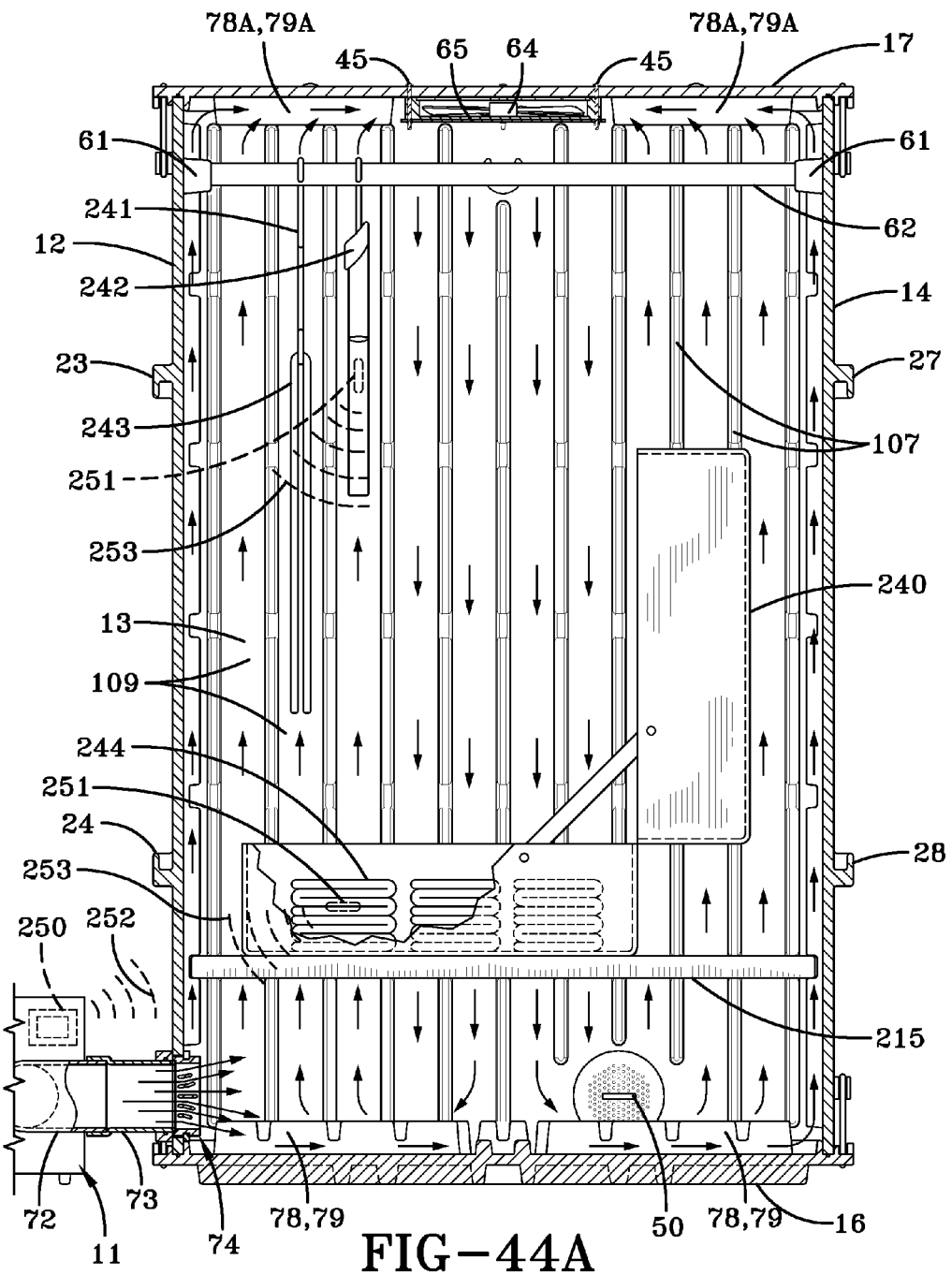
FIG. 44A is a schematic representation of air flow with respect to an interior side of side panel in a sectional view with the upper rack removed with some articles to be sanitized hanging from the hanger rod and other articles to be sanitized resting on a lower rack.

The placement of items that are at least suspected of being infested with insects such as bedbugs in the device 10 for killing insects with heat can be facilitated by providing the interior of the device with accessories such as rods for suspending items and racks for supporting items. A hanger rod 62 usable in the device of the present invention can be best understood by referring to FIGS. 6, 11, 14, 18, and 44A. FIG. 6 is a perspective view of the first configuration of the first embodiment of the device with the top panel and the air heater removed so that a hanger rod 62 and a hanger rod support bracket 61 are shown in their operative configuration. FIG. 11 is a perspective view of the interior side of one of the side panels 12, 13, 14 showing the location and configuration of a hanger rod support bracket 61. FIG. 14 is an end view of a side panel 12, 13, 14 looking in the direction indicated by arrow 14 in FIG. 13. FIG.-18 is a fragmentary cross section taken at line 18-18 of FIG. 14 of a hanger rod support 61 bracket on a side panel. FIG. 44A is a sectional view of the device with some articles to be sanitized hanging from the hanger bar 62. As shown in FIG. 11 the hanger bar support brackets 61 are substantially U shaped. As shown in FIGS. 14 and 18 the hanger bar support brackets 61 are preferably integrally molded with the vertical arms 132 of the U and the base 133 of the U protruding from the interior of a side panel of the device. As best seen in FIG. 44 the hanger bar support brackets 61 of opposed side panels support the end portions of the hanger bar 62. Items such as clothing 242, 243, are supported by hangers 241 suspended from the hanger bar. A temperature sensor and transmitter 251 may be enclosed in a suspended item to wirelessly transmit 253 temperature data to a temperature controller 250 that at least in part controls the operation of an air heating mechanism 11. If desired the temperature controller 250 can send periodic wireless inquiries 252 to the temperature sensor and transmitter 251 requesting current temperature data from the interior of the device 10.

Figure 43:
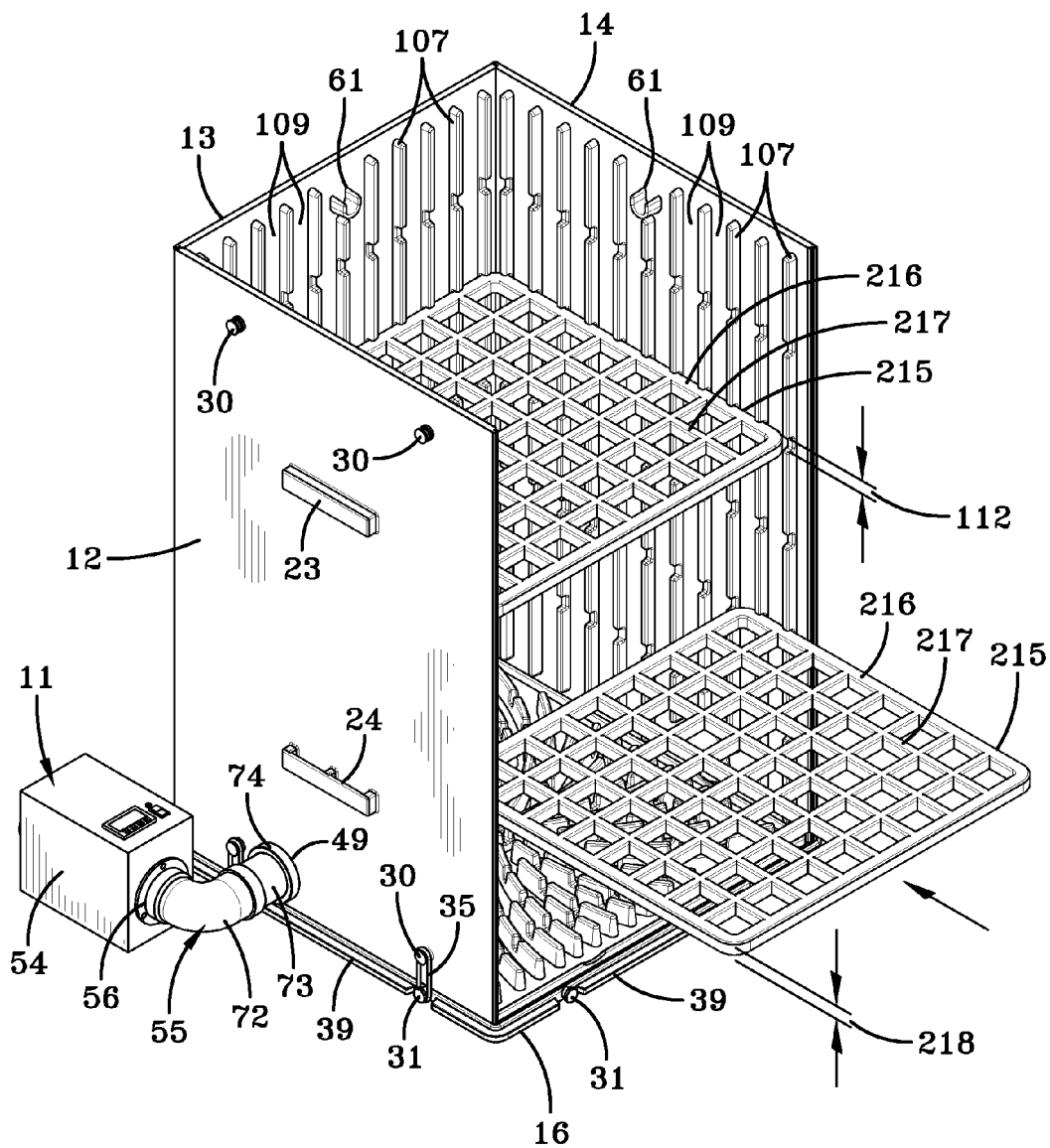
FIG. 43 is a perspective view of a third configuration of the first embodiment of the device wherein racks for supporting objects inside the device are shown, the door receiving side panel and the end panel located at the top of the device in FIG. 1 being removed.
Figure 45:
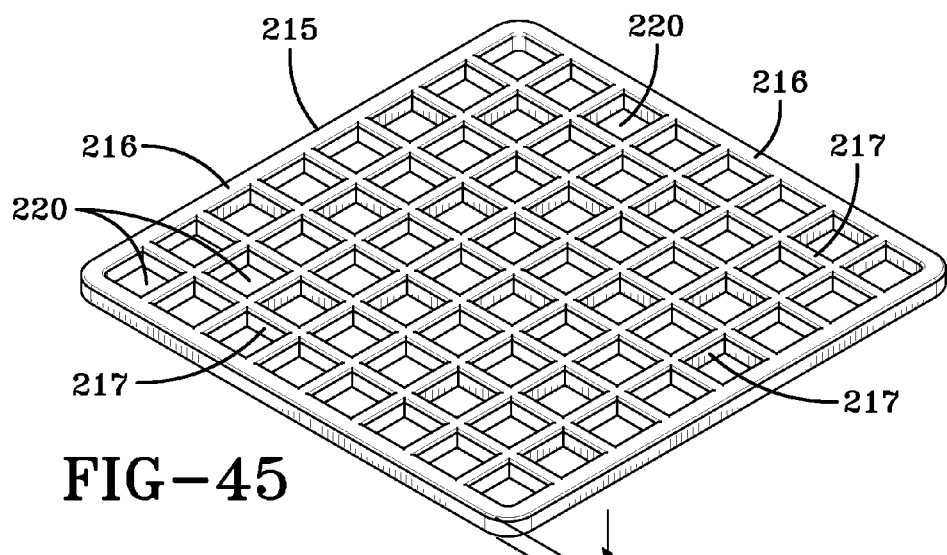
FIG. 45 is a perspective view of a rack for supporting an article placed in the device.
Figures 46, 47:
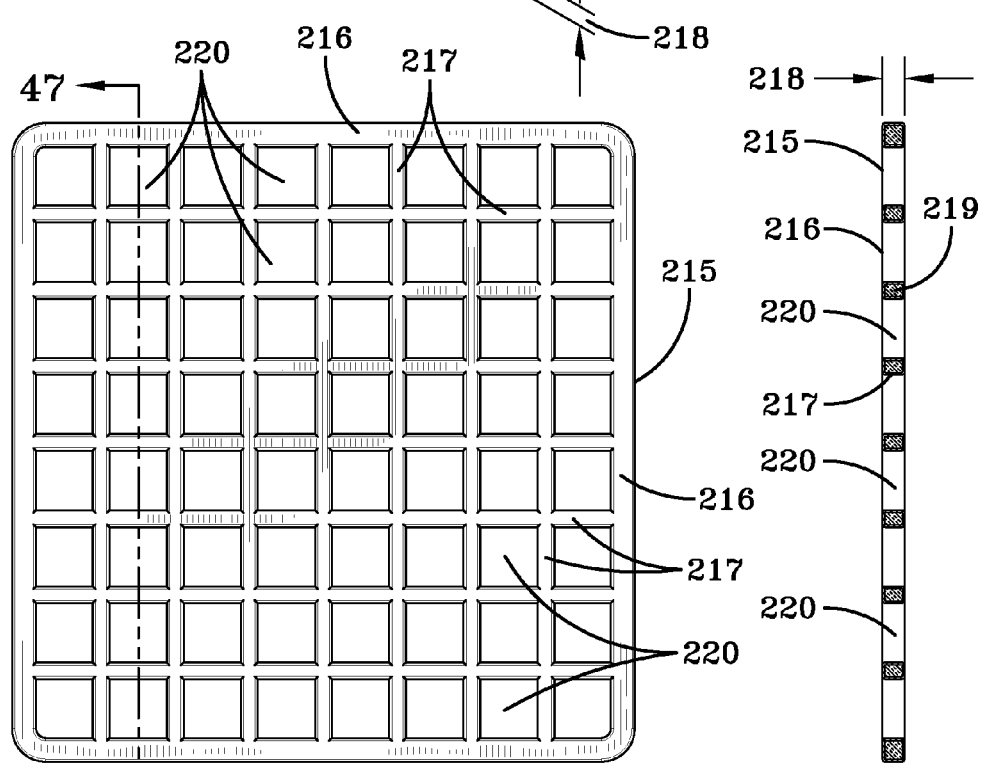
FIG. 46 is a plan view of the rack of FIG. 45.
FIG. 47 is a cross section of the rack taken at line 47-47 of FIG. 46.

Support racks 215 usable in the device of the present invention can be best understood by referring to FIGS. 43-47. FIG. 43 is a perspective view of the device wherein racks 215 for supporting objects inside the device are shown, the door receiving side panel and the end panel located at the top of the device in FIG. 1 being removed. FIG. 44A is a sectional view of the device with some articles to be sanitized supported by a rack 215. FIG. 45 is a perspective view of a rack 215 for supporting an article placed in the device. FIG. 46 is a plan view of the rack of FIG. 45. FIG. 47 is a cross section of the rack taken at line 47-47 of FIG. 46. A rack 215 has a rectangular frame 216 with a plurality of cross bars 217 extending between sides of the frame. The cross bars 217 are arranged to intersect and define openings to facilitate both the supporting of one or more items supported on the rack and the passage of air through the rack. The frame 216 has a thickness 218 that is complementary to the width 112 and depth 113 of the notches 110 in the air deflectors 107 (as shown in FIGS. 13 and 15) that are solid and molded integral with the side panels to facilitate assembly of one or more racks 215 with the device as best shown in FIG. 43. The location of the racks 215 inside the device is of course adjustable to meet the needs of a user of the device, with two racks 215 shown in their operative locations in FIG. 44. In an exemplary use of the device FIG. 44A shows a suitcase 246 containing articles of clothing 244 supported on a rack 215 in the interior of the device 10. The suitcase is shown open to allow hot air circulated inside the device to contact the clothing in the suitcase. A temperature sensor and transmitter 251 may be enclosed in the clothing inside the suitcase and function in the manner disclosed in the immediately preceding paragraph.

The circulation of heated air in the interior of a device 10 for killing insects with heat of the present invention can be best understood by referring to FIGS. 30A-30C, 34 and 44A. FIG. 30A is a top view looking down into the device with the end panel located at the top of the device in FIG. 1 and the hanger rod removed showing a schematic representation of air flow with respect to an interior side of the end panel located at the bottom of the device in FIG. 1. FIG. 30B is a schematic representation of air flow with respect to an interior side of the end panel located at the top of the device in FIG. 1. FIG. 30C is a schematic representation of air flow with respect to an interior side of side panel in a sectional view taken at line 30C-30C in FIG. 2. FIG. 34 is a cross section showing the connection of the air heater to a side panel. FIG. 44A is a schematic representation of air flow with respect to an interior side of side panel in a sectional view with the upper rack removed with some articles to be sanitized hanging from the hanger rod and other articles to be sanitized resting on a lower rack. As shown in FIG. 34 air heated by the electric air heater 11 is blown into the interior of the device through the baffled connecter 74 near the bottom of the device as indicated by the arrows in FIG. 34. The upwardly pointing arrows in FIG. 30C are a schematic representation of the upward flow of hot air in the gaps 109 between the vertically extending air deflectors 107 that are solid and molded integral with the side panels and the door. The vertically extending air deflectors also function as stand offs to prevent items placed inside the device from blocking the passage of hot air through the gaps 109 between the vertically extending air deflectors 107. The air circulation fan 64 that is provided with a protective grill 65 is fixed to the interior of the second end panel 17 as described above and causes circulating air to flow downwardly inside the device as indicated by the downwardly pointing arrows in FIG. 30C. Of course the circulating air fills all of the volume of the interior of the device that is not occupied by components of the device or items such as clothing, bedding and so forth. As described above with respect to the first configuration of the first embodiment of the device a portion of the air escapes the interior of the device though a HEPA filter as disclosed above. As described above with respect to the second configuration of the first embodiment of the device a portion of the air exits the interior of the device though an air conduit and returns to the intake of the electric air heater as disclosed above. With reference to FIG.-30A the interior of the end panel 16 is provided with long and short curved stand offs 78, 79 and a central circular stand off 80 protruding from the interior side of the end panel 16 and provided with a plurality of notches 81. The curved stand offs function both to prevent items placed inside the device from interfering with the flow of air through the gaps 85 between the long and short curved stand offs 78, 79 and to direct the flow of air through the device as indicated by the arrows in FIG. 30A. With reference to FIG. 30B the interior of the end panel 17 is provided with long and short curved stand offs 78A, 79B protruding from the interior side of the end panel 17. As described above the end panel 17 is provided with a fan 64 and a protective screen 65. The curved stand offs function both to prevent items placed inside the device from interfering with the flow of air through the gaps 85 between the long and short curved stand offs 78A, 79A and to direct the flow of air towards the fan as indicated by the arrows in FIG. 30B. FIG. 44A is a schematic representation of the flow of air inside a device of the invention when the device contains items supported on a rack 215 and suspended from a hanger bar 62. As disclosed above the air can flow through openings in the rack used to support items inside the device.

It is important that the heated air reach every interior surface of the device and every item placed inside the device for decontamination because insects such as bedbugs will attempt to find the coolest location inside the device. The air in the interior of the device must be maintained at a temperature of at least one hundred eighteen degrees Fahrenheit for at least one hour, or at least one hundred twenty five degrees Fahrenheit for at least thirty minutes, or at least one hundred thirty degrees Fahrenheit for at least fifteen minutes to kill all of the bedbugs located inside the device. The controller of the electric air heater 11 of the present invention is preferably associated with a controller that does not begin the timed operation of the device until an air temperature of at least one hundred thirty degrees Fahrenheit inside the device has been sensed.

Figure 54A:
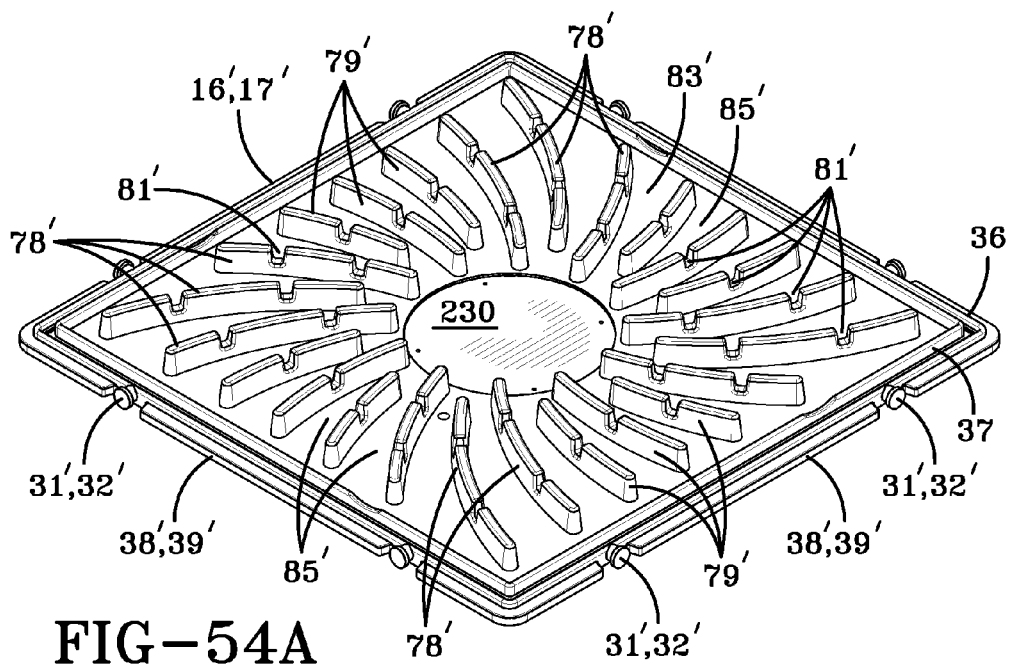
FIG. 54A is a perspective view of the interior side of an alternate end panel that may be used at either end of the device.
Figure 54B:
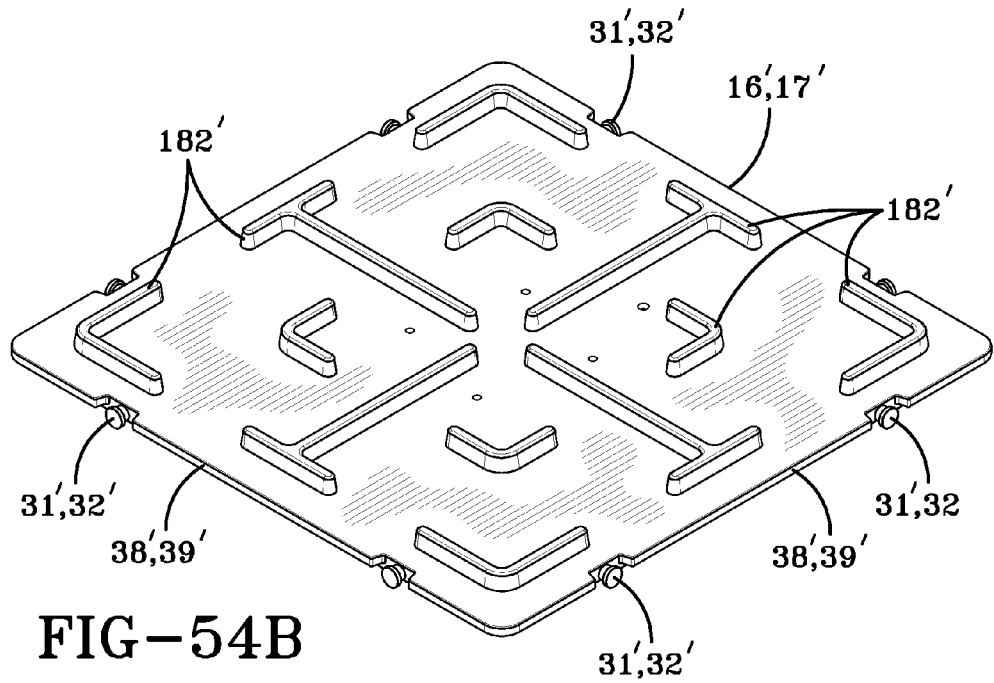
FIG. 54B is a perspective view of the exterior side of the alternate end panel shown in FIG. 54A.
Figure 55:
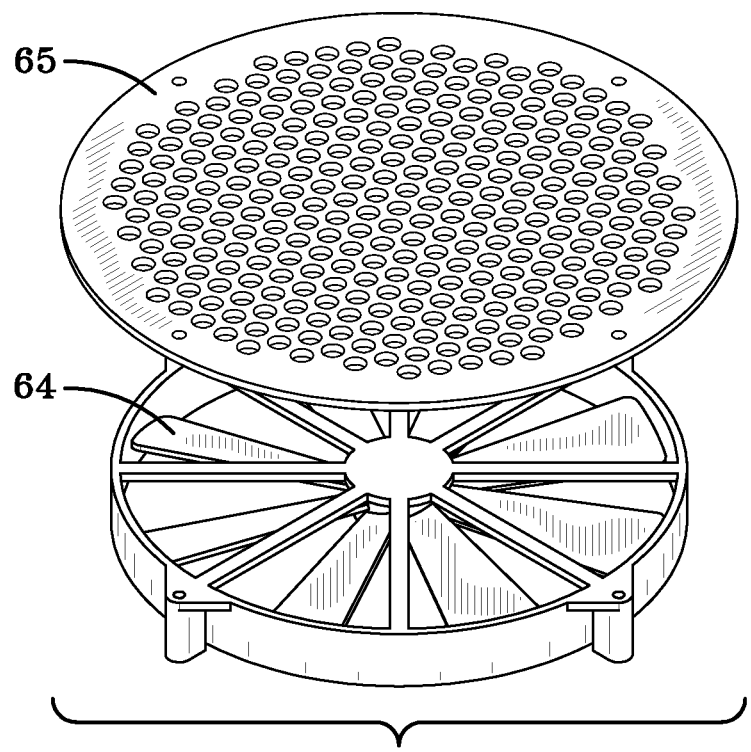
FIG. 55 is an exploded view of an air circulation fan assembly that may be mounted to the interior side of the alternate end panel shown in FIGS. 54 and 54A.
Figure 56:
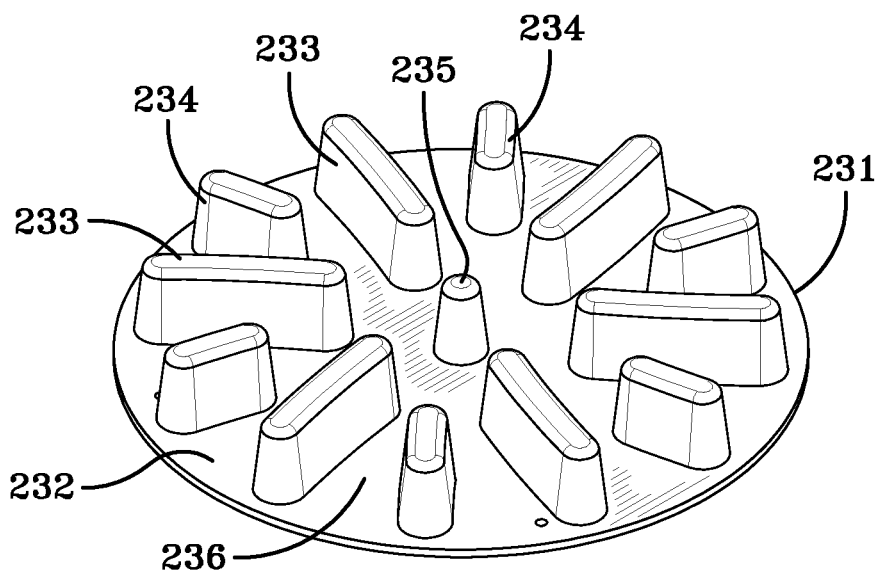
FIG. 56 is a perspective view of an insert that may be mounted to the interior side of the alternate end panel shown in FIGS. 54 and 54A.
Figure 57A:
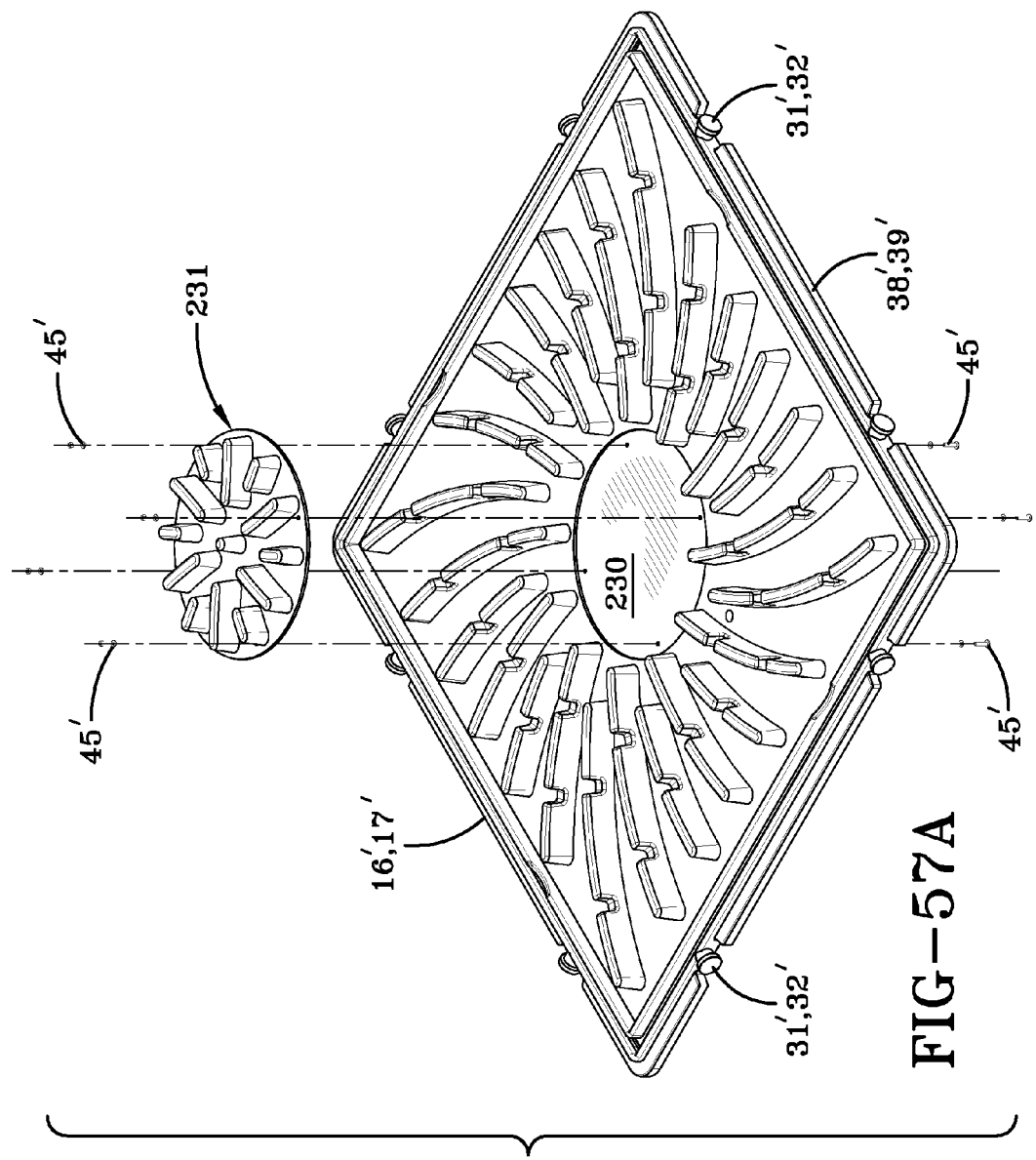
FIG. 57A is an exploded view illustrating the insert of FIG. 56 with the interior side of the alternate end panel shown in FIGS. 54 and 54A.

In the configurations of the first embodiment of the device disclosed above the two end panels have distinctly different designs. However it is believed that if a single design for a molded end panel, adaptable to various configurations were provided the cost of molds and production of the device could be significantly reduced. The proposed universal end panel configuration can best be understood with reference to FIGS. 54A, 54B, 55, 56, 57A, 57B. FIG. 54A is a perspective view of the interior side of an alternate end panel 16', 17' that may be used at either end of the device. The interior side of the universal end panel is provided with long and short curved stand off 78', 79' provided with notches 81' that function in the same manner as the stand offs disclosed above with respect to the end panels 16, 17. The alternative end panels are provided with studs 31', 32' and ledges 38', 39' that function in the same manner as corresponding features of the above disclosed end panels 16, 17. The universal end panels are provided with a flat round portion 250 of the interior side that is free of any protrusions or stand offs. FIG. 54B is a perspective view of the exterior side of the alternate end panels 16', 17' shown in FIG. 54A. The exterior side of the alternative end panels 16', 17' are provided with stand offs 182' that are molded integral to the end panels. FIG. 55 is an exploded view of an air circulation fan assembly 55 comprising a fan 64 and a protective screen 65 that may be mounted to the interior side of the alternate end panel shown in FIGS. 54 and 54A using appropriate fasteners (not shown). FIG. 56 is a perspective view of an insert 231 provided with stand offs 233, 234, 235 that protrude from a surface 232 of the insert with gaps 236 between the stand offs that may be mounted to the interior side of the alternate end panel shown in FIGS. 54 and 54A using appropriate fasteners (not shown). FIG. 57A is an exploded view illustrating the insert of FIG. 56 with the interior side of the alternate end panel shown in FIGS. 54 and 54A with fasteners 45' for fastening the insert to the interior side of the alternate end panel when the alternate end panel is to be used as the lower end panel of a device according to the present invention. FIG. 57B is an exploded view illustrating the air circulation fan assembly 64, 65 of FIG. 55 with the interior side of the alternate end panel 16', 17' shown in FIGS. 54 and 54A with fasteners 45' for fastening the fan assembly to the interior side of the alternate end panel when the alternate end panel is to be used as the upper end panel of a device according to the present invention.

A second embodiment of a device 300 for killing insects with heat is disclosed in FIGS. 58-72. The second embodiment is similar to the first embodiment with the difference that an air heater and fan assembly 311 is fixed to the interior of the upper end panel 317 of the device with ducts of connected duct sections 363, 372, 373, 380 for transmitting the heated air to the lower region of the interior of the device. At least some of the sections of the air ducts may comprise sections of PVC piping. Duct section 372 is an elbow with an opening 374 for receiving and connecting to one of the vertically oriented air ducts 380. While some dimensions of interior features of the bottom 316 and side panels 313-315 are altered slightly to accommodate the vertically extending ducts 380 located in the interior corners defined by next adjacent side panels.

Figure 59:
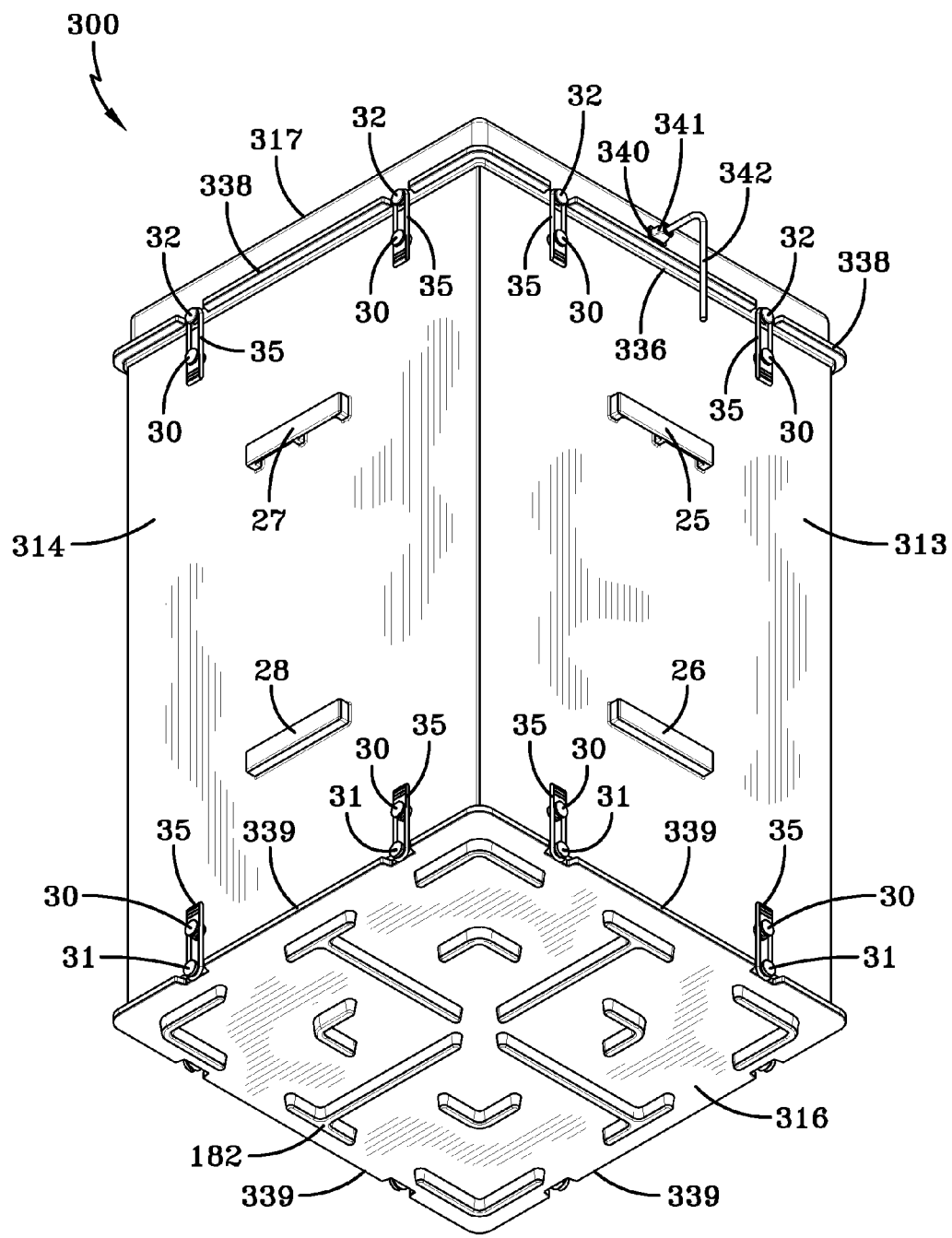
FIG. 59 is another perspective view of the second embodiment of the device for killing insects with heat according to the present invention.

FIG. 58 is a perspective view of a second embodiment of a device 300 for killing insects with heat according to the present invention. FIG. 59 is another perspective view of the second embodiment of the device 300 for killing insects with heat according to the present invention. The upper end panel 317 is similar to the upper end panel of the first embodiment being provided with a ledge 338 to accommodate the fixation of the side panels to the upper end panel. The upper end panel 317 of the second embodiment is associated with a power source including a plug 341 and a power cord 342 for providing power to the air heater and fan assembly 311 is fixed to the interior of the upper end panel. The exterior of the upper end panel is provided with an on off switch 370 and other indicators and controls 371 for the device. The side panels 313-315 and end panels 316, 317 are fixed to one another in the same manner disclosed above with respect to the first embodiment 10 of the device and are provided with securing mechanisms 30, 32, 35; 30, 31, 35 that have the structure and function of the corresponding components of the first embodiment. The door 20 has the same structure and is fixed to the door receiving side panel 315 in the same manner as the corresponding components of the first embodiment. The handles 21-28 are molded integral to the door and side panels in the same manner as the corresponding components of the first embodiment. The lower end panel 316 is similar to the lower end panel of the first embodiment being provided with stand off 182 on the exterior surface of the lower end panel and with a ledge 339 to accommodate the fixation of the side panels to the lower end panel.

Figure 60A:
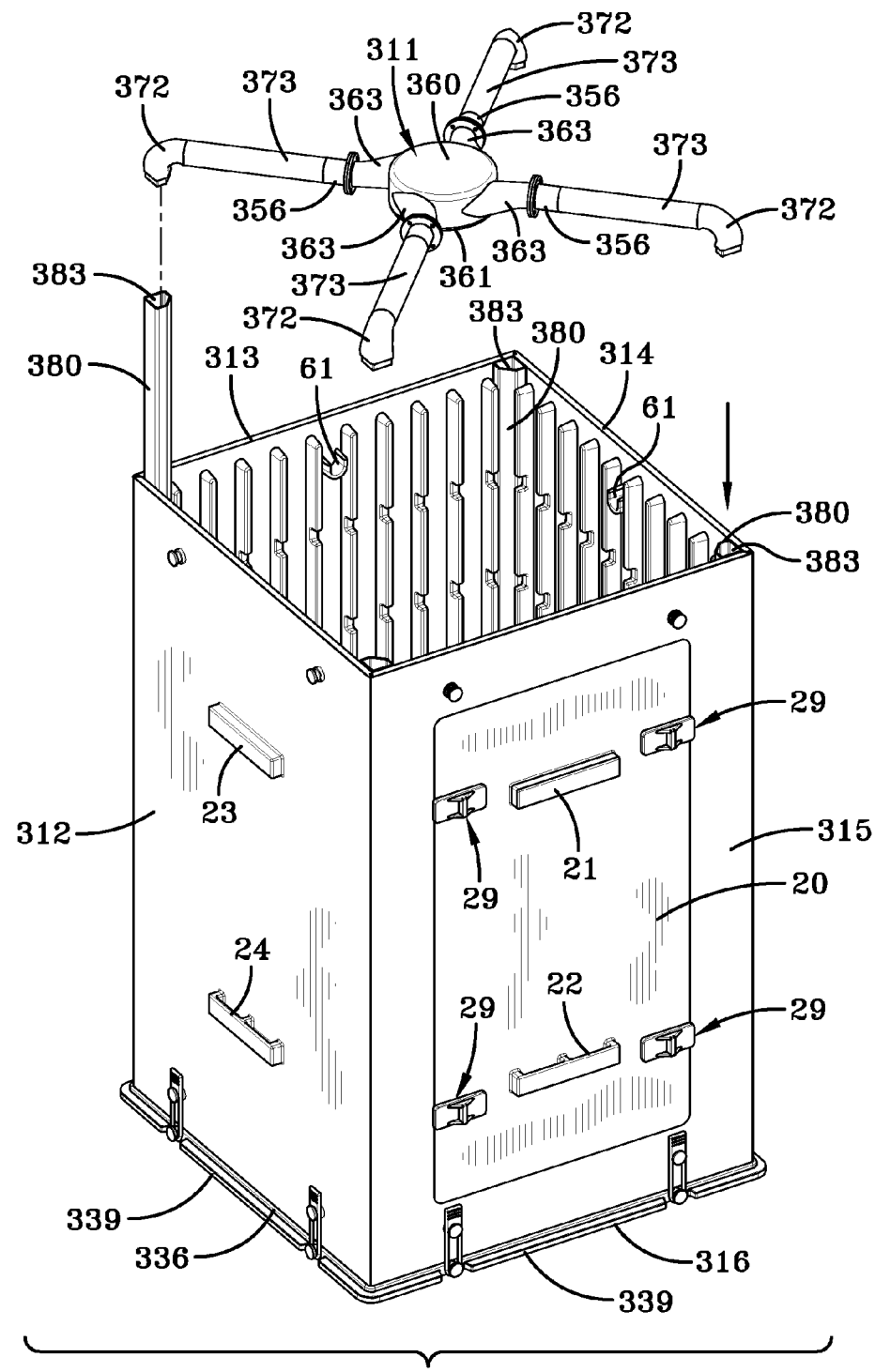
FIG. 60A is a partially exploded perspective view of the second embodiment of the device for killing insects with heat with a top end panel of the device removed and partially exploded to show some interior components of the device.
Figure 60B:
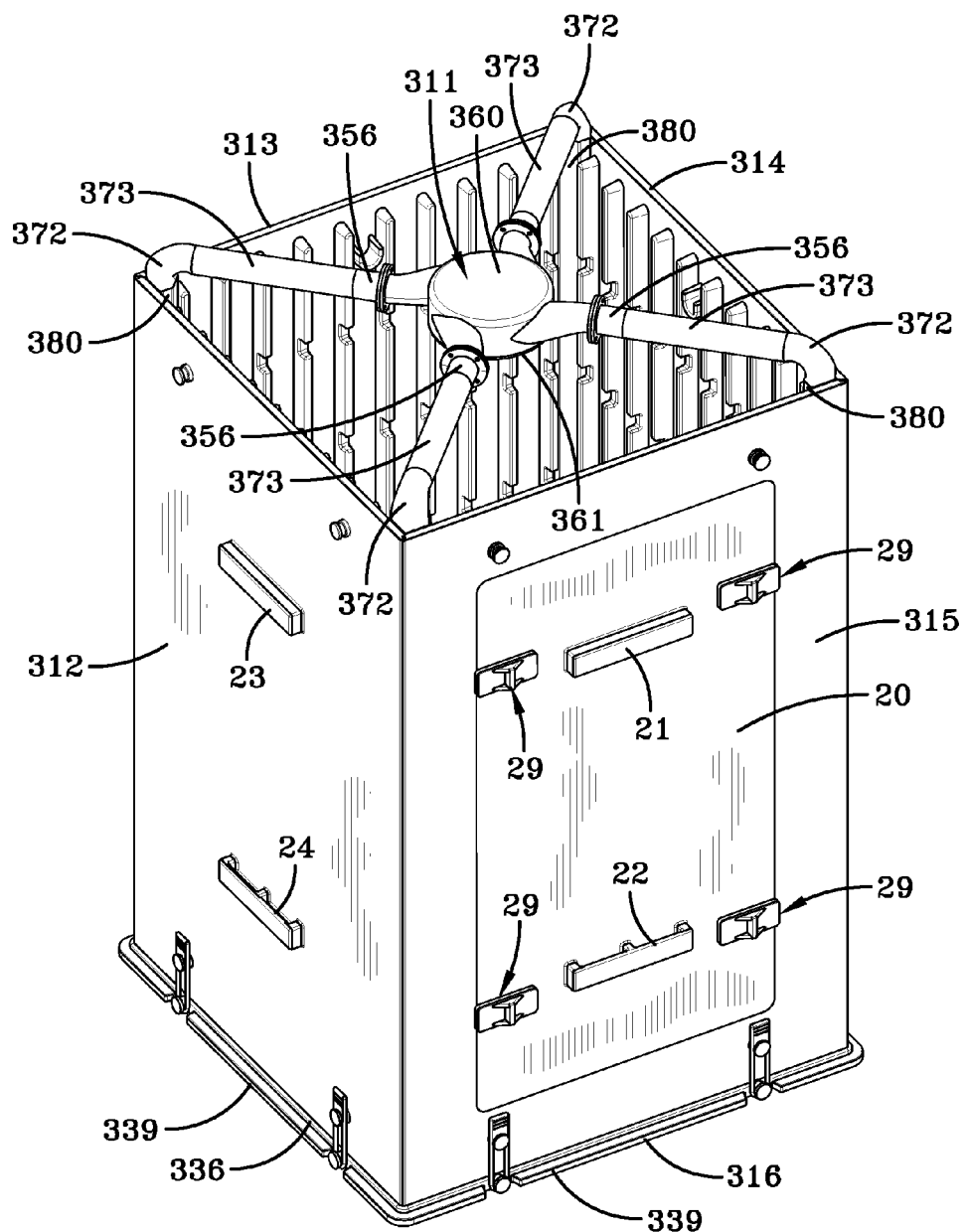
FIG. 60B is another perspective view of the second embodiment of the device for killing insects with heat with the top end panel of the device removed and showing some interior components of the device.

FIG. 60A is a partially exploded perspective view of the second embodiment of the device for killing insects with heat with a top end panel of the device removed and partially exploded to show some interior components of the device. One of the vertically extending ducts 380 located in the interior corners defined by next adjacent side panels is shown only partially inserted and must be moved downward in the direction indicated by the downwardly pointing arrow to obtain the intended operative configuration. The air heater and fan assembly 311 is shown with associated air duct segments 363, 372, 373. FIG. 60B is another perspective view of the second embodiment of the device with the top end panel of the device removed and showing the air heater and fan assembly 311 connected by substantially horizontally extending air duct segments 363, 372, 373 to the vertically extending air ducts 380 located in the interior corners defined by next adjacent side panels.

Figure 61:
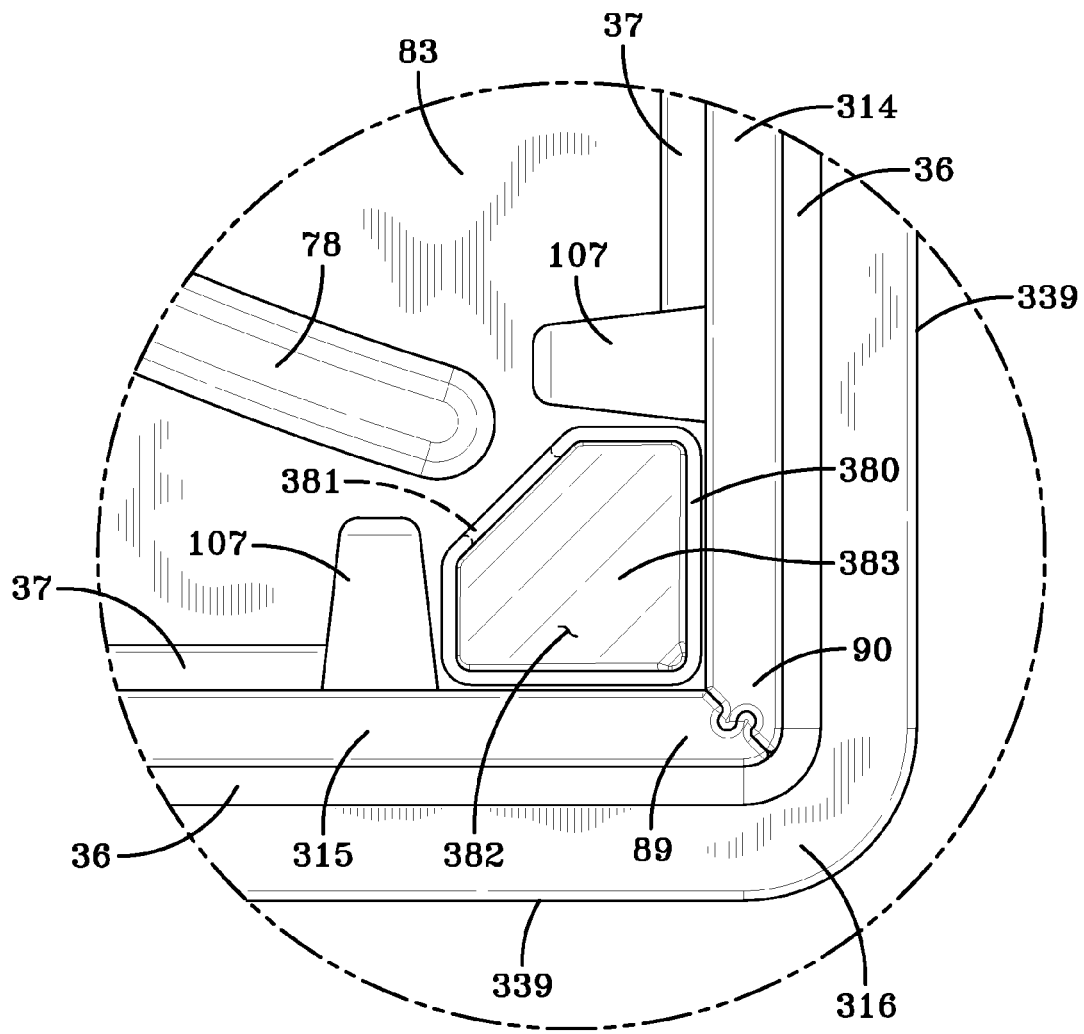
FIG. 61 is an enlarged partial view of the interior of a corner of the second embodiment looking in the direction indicated by the downwardly pointing arrow FIG. 60A.

FIG. 61 is an enlarged partial view of the interior of a corner of the second embodiment looking in the direction indicated by the downwardly pointing arrow FIG. 60A. The spacing of the vertically extending stand offs 107 nearest the mitered edges 89, 90 of the side panels 314, 315 is adjusted from the first embodiment to accommodate the dimensions of the vertically extending air duct 380 with 381 indicating the vertical wall of the vertically extending air duct, 382 indicating a bottom end wall of the air the vertically extending and 383 indicating the interior space of the vertically extending duct.

Figure 70:
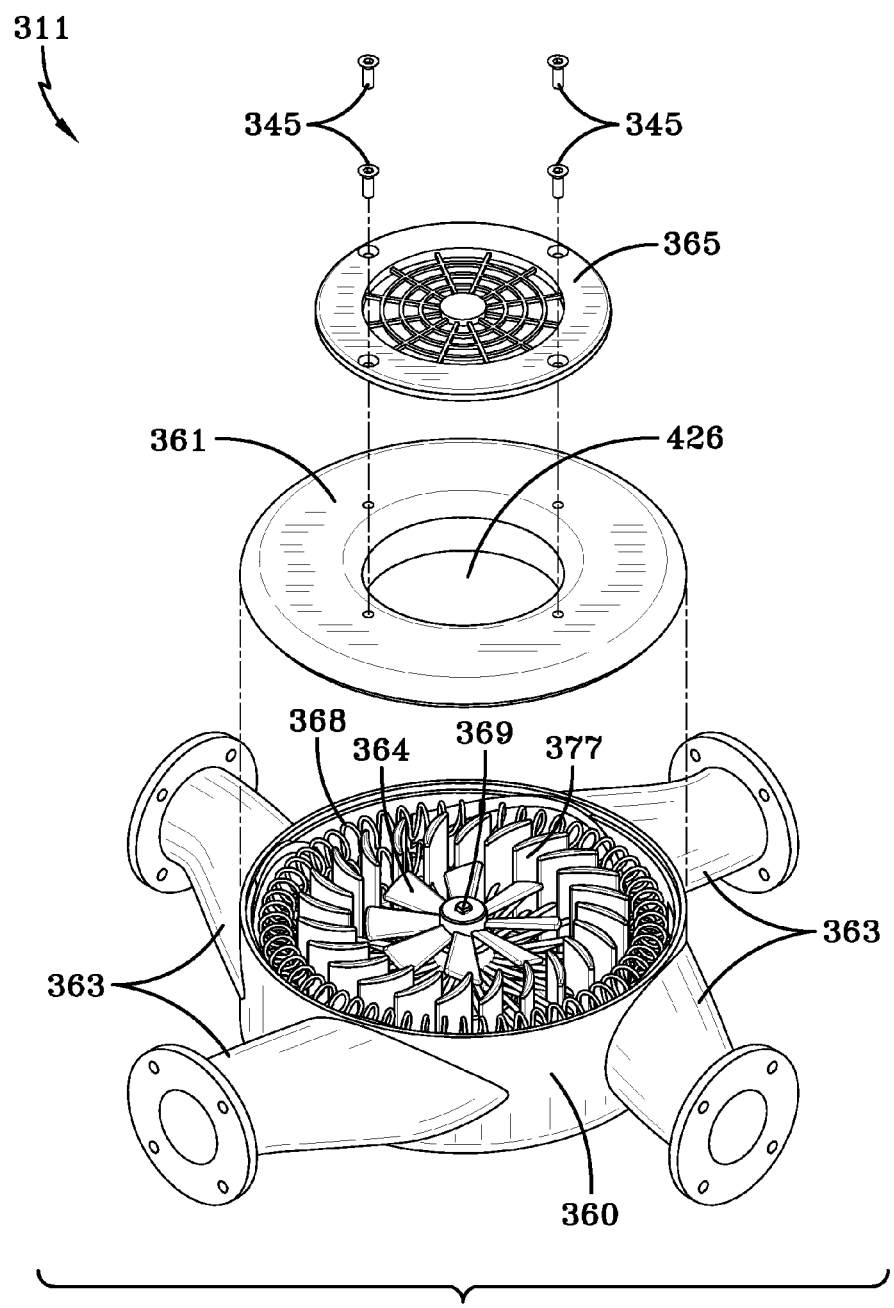
FIG. 70 is an exploded view of an air heater and circulation fan assembly that is fixed to the interior of the top side panel of the second embodiment of the device for killing insects.

FIG. 70 is an exploded view of an air heater and circulation fan assembly 311 that is to be fixed to the interior of the top side panel. A motor drives a single rotating shaft 369 which turns the blades of a first fan 364 for drawing air into a housing 360 and a second fan 377 for pushing air from the housing through electrical heating coils 368 to heat the air and into air duct segment 363 that are integral with the housing. A cover plate 361 having a passage 426 for air to go through to enter the housing 360 is covered by a protective grill 365 and is fixed to the housing 360 by a plurality of fasteners 345.

Figure 63:
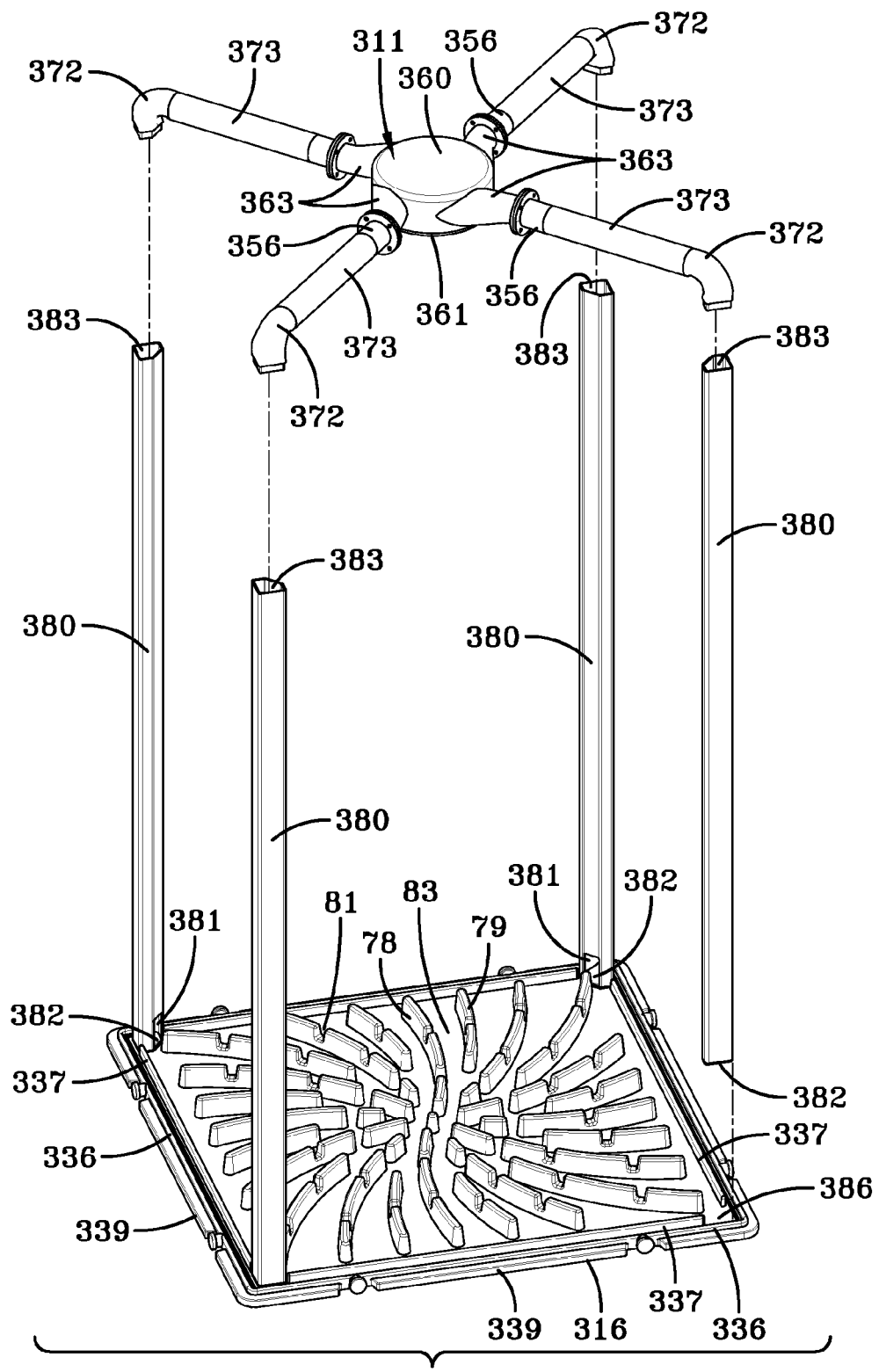
FIG. 63 is a partially exploded perspective view of the second embodiment of the device for killing insects with heat with the side panels and top end panel of the device removed to show the interior components of the device.
Figure 71A:
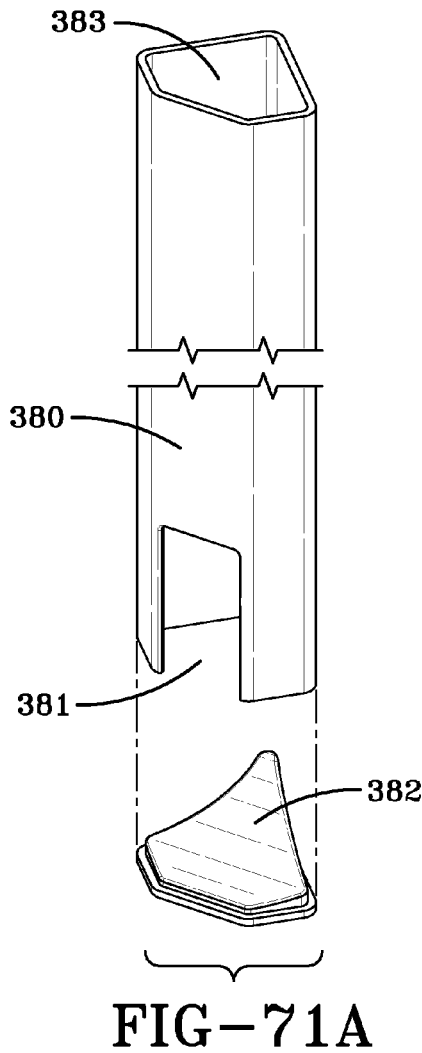
FIG. 71A is a perspective view, partially broken away, of an air duct shown vertically oriented for example in FIG. 63 that is an internal component of the second embodiment of the device for killing insects.
Figure 71B:
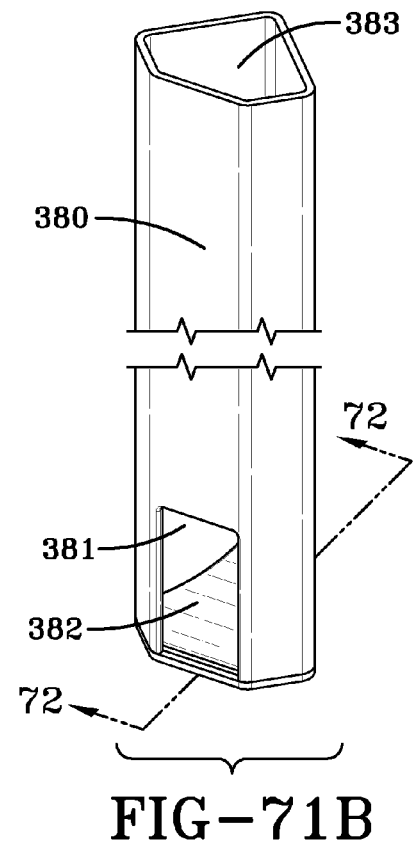
FIG. 71B is a perspective view of the air duct.
Figure 72:
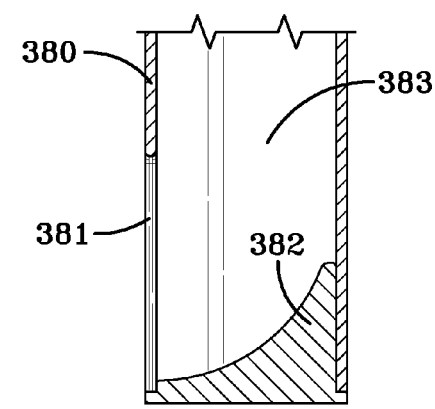
FIG. 72 is a section view of the air duct taken at line 72-72 of FIG. 71B.

FIG. 63 is a partially exploded perspective view of the second embodiment of the device with the side panels and top end panel of the device removed to show the vertically extending air ducts 380 with respect to the bottom end panel 316, one of the vertically extending air ducts shown not assembled in its operative location. The air heater and circulation fan assembly 311 is shown assembled with the associated substantially horizontally extending air ducts not yet fixed to vertically extending air ducts. FIG. 71A is a perspective view, partially broken away, of an air duct 380 shown vertically oriented for example in FIG. 63. FIG. 71B is a perspective view of the air duct 380. FIG. 72 is a section view of the air duct taken at line 72-72 of FIG. 71B. In FIGS. 71A-72 381 indicates the vertical wall of the vertically extending air duct, 382 indicates a bottom end wall of the air duct, 383 indicates the interior space of the vertically extending air duct, and 381 indicates an opening in the wall at the lower portion of the air duct to allow hot air to enter the interior of the device near the lower end panel of the device.

Figure 64:
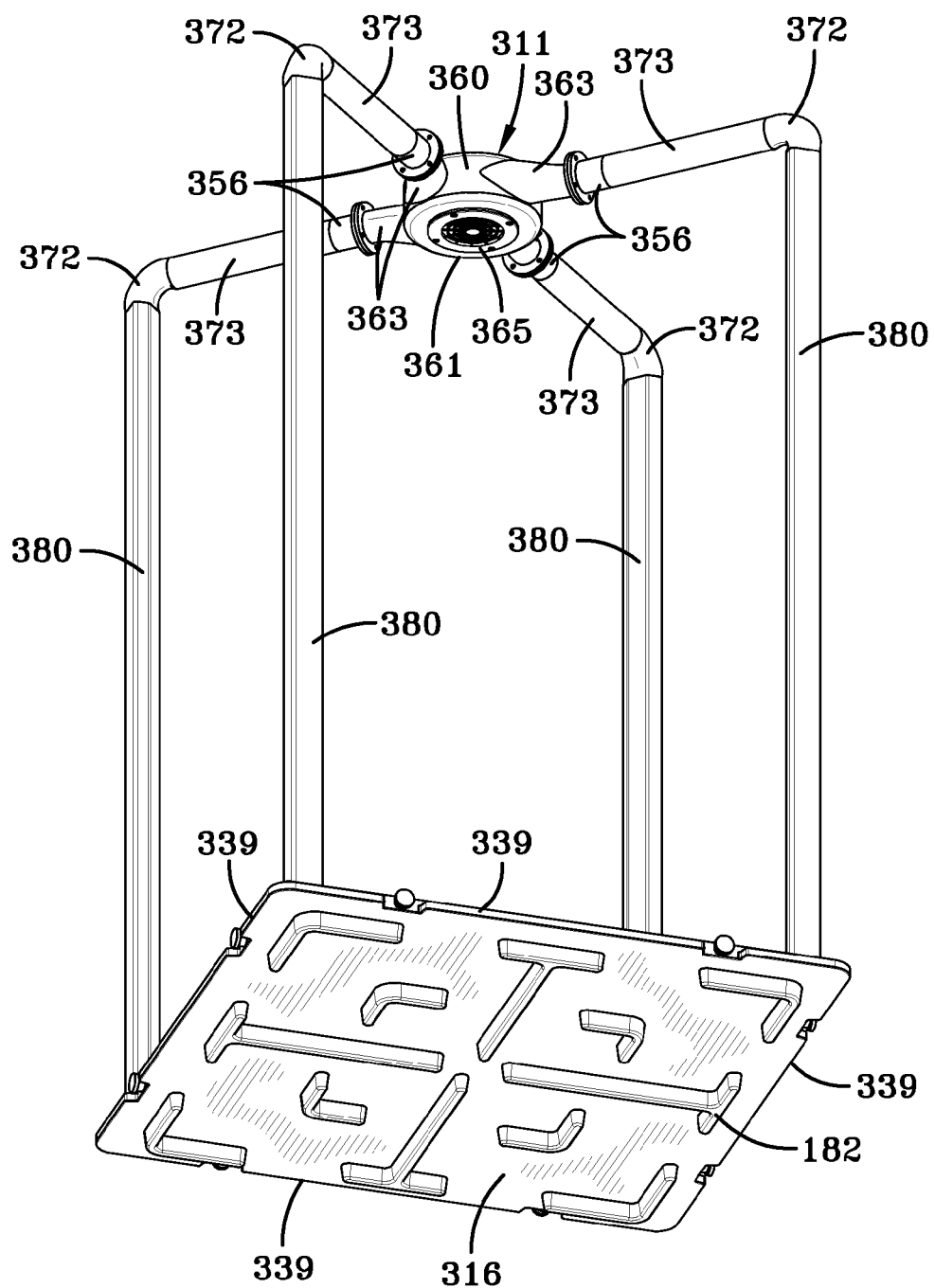
FIG. 64 is a perspective view of the second embodiment of the device for killing insects with heat with the side panels and top end panel of the device removed to show the interior components of the device.

FIG. 64 is a perspective view of the second embodiment of the device with the side panels and top end panel of the device removed to show the air heater and circulation fan assembly 311 assembled with the associated substantially horizontally extending air ducts 363, 372, 373 and the associated substantially horizontally extending air ducts 380 in an operative configuration.

Figure 65:
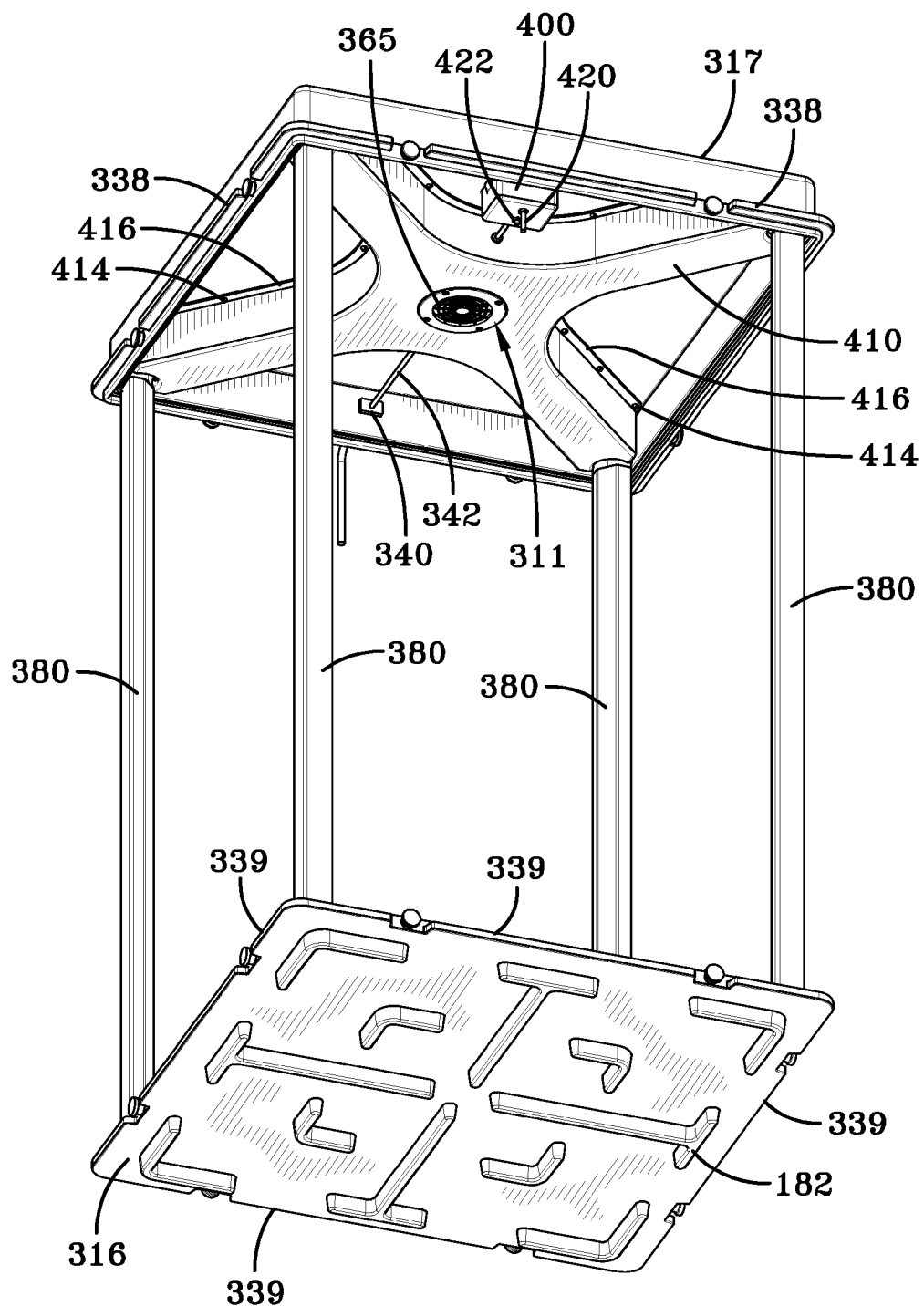
FIG. 65 is a perspective view of the second embodiment of the device for killing insects with heat with only the side panels of the device removed to show the interior components of the device.
Figure 66:
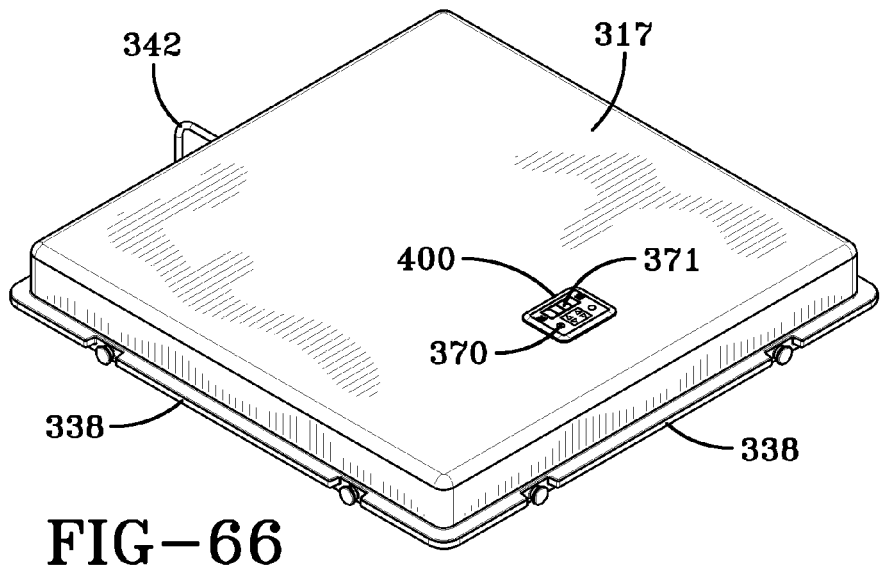
FIG. 66 is a perspective view of the exterior of the top end panel of the second embodiment of the device for killing insects with heat.
Figure 67:
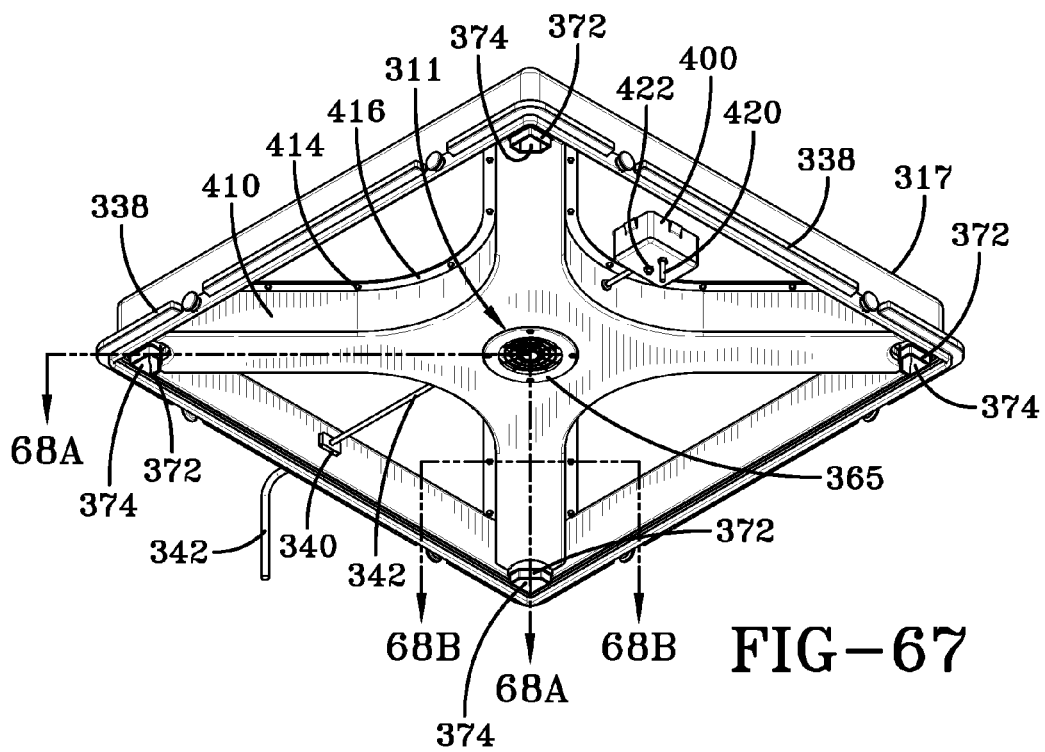
FIG. 67 is a perspective view of the interior of the top end panel of the second embodiment of the device for killing insects with heat assembled with some of the interior components of the device.

FIG. 65 is a perspective view of the second embodiment of the device with only the side panels of the device removed to show the air heater and circulation fan assembly 311 assembled with the associated substantially horizontally extending air ducts and the associated substantially horizontally extending air ducts 380 in an operative configuration. In FIGS. 65 and 67 a protective cover 410 is shown fixed to an interior side of the upper side panel 317. The power cord 342 is shown extending through a sealing grommet 340 to a housing 400 of the display panel 370 on the top exterior surface of the top end panel shown in FIGS. 58 and 66. A thermal probe 420 is associated with the display panel 370. An emergency pressure relief device 422 to vent air from the interior of the device in an emergency is also associated with the top end panel 317.

Figure 69:
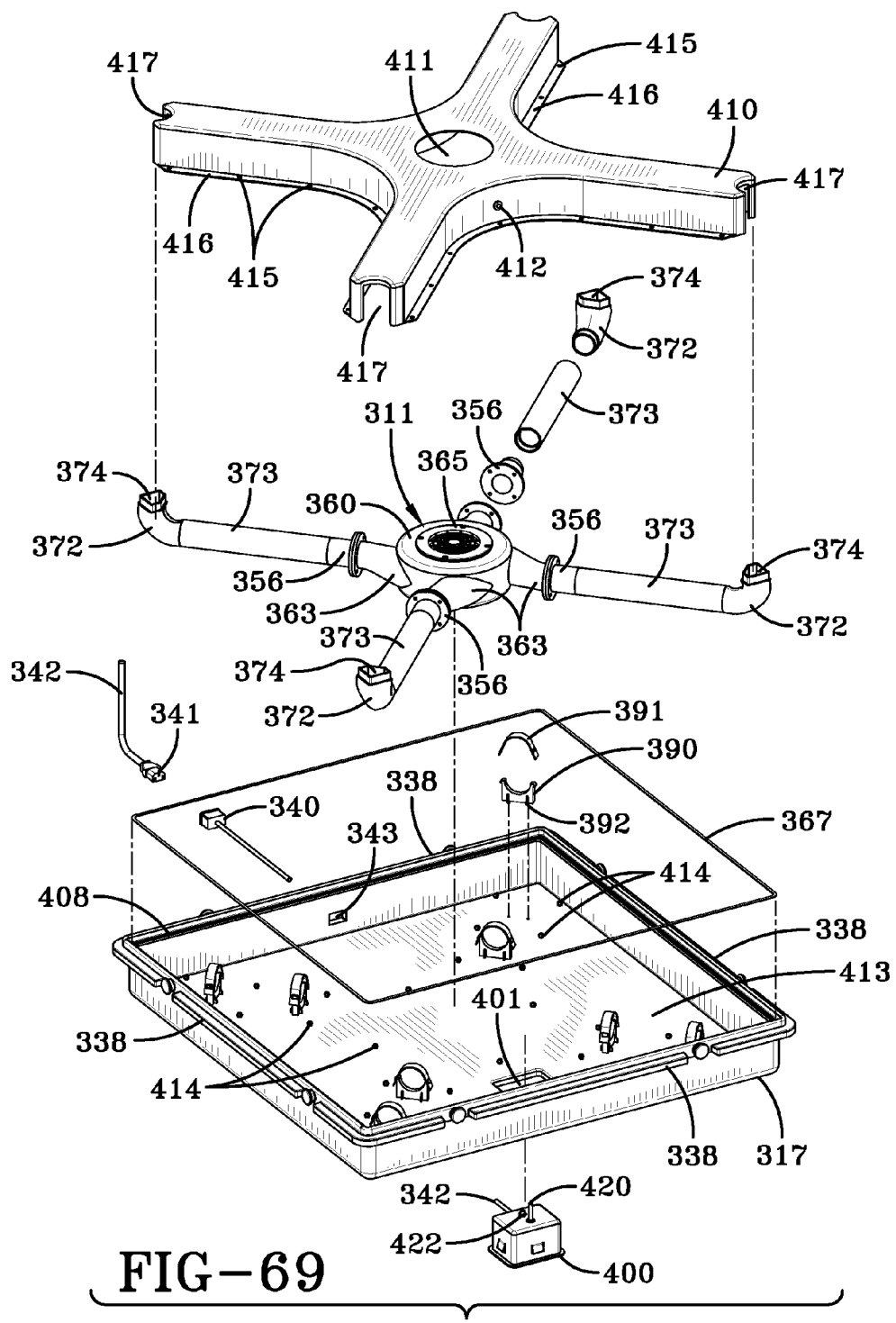
FIG. 69 is an exploded view of the interior of the top end panel of the second embodiment of the device for killing insects showing the interior components of the device that are fixed to the interior of the top end panel.

FIG. 69 is an exploded view of the interior of the top end panel 317 of the second embodiment of the device showing the interior components of the device that are fixed to the interior of the top end panel. Most of the components shown in FIG. 69 have already been described in the preceding description of the second embodiment and will not be further elaborated upon. The sealing gasket 367 mates with the top end panel and functions in the same manner described above for the corresponding components of the first embodiment. Hangers 390 for supporting sections 373 of the substantially horizontally extending air ducts, as shown in detail in FIG. 68B which is a section view taken at line 68B-68B of FIG. 67, are fixed to an interior side of the top end panel. The hangers include a mounting bracket 390 fixed to the top end panel 317 by appropriate means such as pins 392 and a hanger strap 391 is secured to the mounting bracket such that the hanger fits around a section 373 of the air duct. The protective cover 410 is preferably a unitary cast polymeric member having the overall shape of a plus sign with a top wall and side walls 416 and an opening 411 at the center of the plus sign that is aligned with the air intake of the air heater and circulation fan assembly 311 that has already been described above. The protective cover 410 is fixed to the interior of the top end panel as best shown in FIG. 68B by appropriate fasteners 414 that extend through flanges 415 at ends of the sidewalls 416 of the protective housing 410. In FIG. 68B a connecting flange 356 of the air duct is visible.

Figure 62:
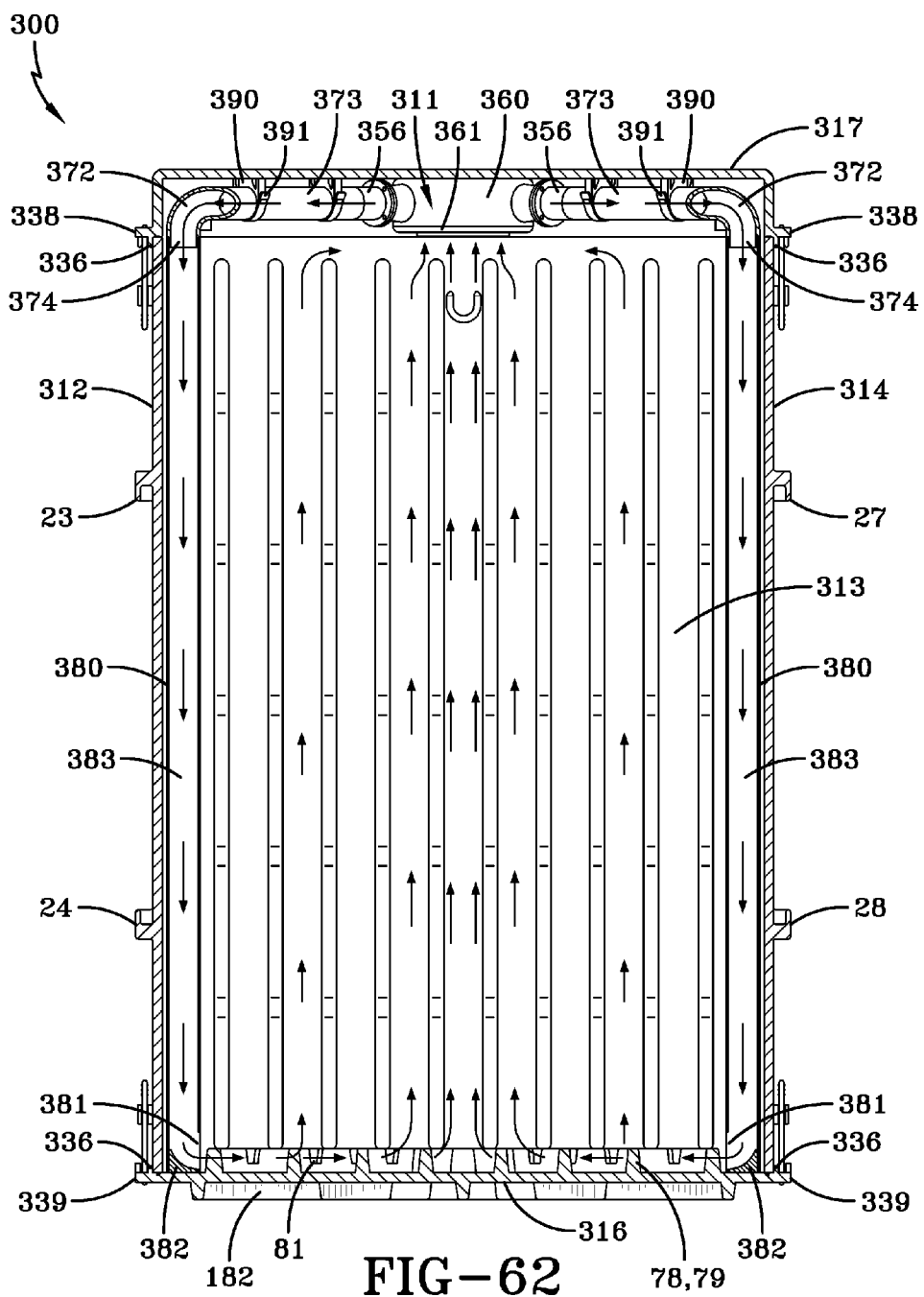
FIG. 62 is a section view taken at line 62-62 of FIG. 58 showing in elevation the interior structure of the second embodiment of the device for killing insects with heat.

The interior of a device according to the second embodiment may provided with a hanger bar and racks as described above with respect to the first embodiment. The flow of air inside the device of the second embodiment can best be understood with reference to FIGS. 62 and 68A. FIG. 62 is a section view taken at line 62-62 of FIG.-58 showing in elevation the interior structure of the second embodiment of the device for killing insects with heat. FIG. 68A is a section view taken at line 68A-68A of FIG. 67 showing some of the interior components of the second embodiment of the device that are fixed to the interior of the top end panel 317 of the device. It is to be noted that as shown none of the side panels of the second embodiment is provided with any passages that could facilitate the evacuation of air from the interior of the device. Air inside the device flows generally upward as indicated by the upwardly pointing arrows in FIG. 62. A first fan 364 of the air heater and circulation fan assembly 311 pulls air through the air intake of the housing 361 of the air heater and circulation fan assembly 311 that has already been described above with respect to FIG. 70. A second fan 377 of the air heater and circulation fan assembly 311 pushes air through a chamber 399 and annular heating coils 388 into and through the substantially horizontally extending sections 356, 372, 373 of the air conducting ducts. The air then enters the vertically extending air ducts 380 and flows downwardly through the interiors 383 of vertically extending air ducts as indicated to the openings at the bottom of the vertically extending air ducts to be directed horizontally through gaps 81 between the stand offs 78, 79 on the interior of the lower end panel 316, then flows upwardly. This air circulation pattern is repeated throughout the operation of the second embodiment of the device.

It is understood that the various temperature sensors and controls disclosed above with respect to FIG. 44A for the first embodiment may be employed with the second embodiment in the manner described above with respect to the first embodiment.

While the invention has been described with reference to certain exemplary embodiments, obvious modifications and alterations are possible by those skilled in the related art. Therefore, it is intended that the invention include all such modifications and alterations to the full extent that they come within the scope of the following claims or the equivalents thereof.

What is claimed is:

1. A device for killing insects with heat comprising:
    (a) an enclosure comprising:
        (i) four rectangular side panels, each side panel having a pair of opposed mitered edges, one mitered edge of the pair of opposed edges of each side panel provided with a female indent and another mitered edge of the pair of opposed edges of each side panel provide with a male protrusion, the male protrusion and female indent of each side panel being complimentary to the male protrusions and female indents of the other side panels, each side panel is fixed to two adjacent side panels of said four rectangular side panels by a mitered joint with the male protrusion of each side panel interlocked with the female indent of one side panel of the two adjacent side panels, one of the side panels being provided with an opening for receiving a door for accessing an interior space of the enclosure;
        (ii) two rectangular end panels, each of the end panels being fixed to all four of the side panels in an interlocking manner, an interior side of each of the side panels and one of the end panels being provided with stand offs for directing a flow of air in gaps between adjacent stand offs of the stand offs;
    (b) an air heater for providing heated air to the interior space of the enclosure;
    (c) a fan for circulating heated air in the interior space of the enclosure;
    (d) at least one sensor for sensing a temperature of the heated air in the enclosure; and
    (e) controls for controlling the air heater and the fan based at least in part on data provided by the at least one sensor.

2. The device for killing insects with heat according to claim 1 wherein the female indents and male protrusions extend entire lengths of the respective mitered edges of the side panels.

3. The device for killing insects with heat according to claim 1 wherein the air heater is an electric air heater located outside the enclosure and the heated air is provided to the interior space of the enclosure via a duct that extends from the air heater through a passage in one of the side panels, and the fan for circulating heated air in the interior space of the enclosure is located inside the enclosure and is fixed to one of the end panels.

4. The device for killing insects with heat according to claim 3 wherein one of the side panels is assembled with a HEPA filter assembly that extends through another passage in one of the side panels.

5. The device for killing insects with heat according to claim 3 further comprising an air return duct having a pair of ends, one end of the pair of ends of the air return duct fixed to another one of the side panels at another passage through the another one of the side panels and the other end of the pair of ends of the air return duct is fixed to an air intake port of the air heater.

6. The device for killing insects with heat according to claim 1 wherein the air heater and the fan are both located inside the interior space of the enclosure and are both fixed to one of the end panels.

7. The device for killing insects with heat according to claim 1 wherein the air heater and the fan are combined in an air heater and fan assembly that is fixed to an interior side of one of the end panels located at a top of the enclosure, the air heater and fan assembly comprising a housing that contains a motor that drives a single rotating shaft which turns blades of a first fan for drawing air from the interior space of the enclosure into the housing and a second fan for pushing air from the housing through at least one electrical heating coil to heat the air and into an air duct system for moving the heated air to an opening in the air duct system located in a vicinity of a lowest part of the interior space of the enclosure, the enclosure being completely sealed to prevent an escape of air from the interior space of the enclosure.

8. The device for killing insects with heat according to claim 7 further comprising a portable sensor for sensing a temperature of an item located inside the interior space of the enclosure for decontamination wherein the portable sensor transmits the data wirelessly to a controller of the controls that receives the data and can make appropriate adjustments to an operation of the air heater and fan assembly.

9. The device for killing insects with heat according to claim 1 further comprising at least one rack disposed in the interior space of the enclosure, the at least one rack having at least two edges that are interlocked with notches in the stand offs in opposed side panels of the side panels.

10. The device for killing insects with heat according to claim 1 further comprising at least one hanger bar disposed in the interior space of the enclosure, the at least one hanger bar having two ends that are supported by hanger bar brackets that are fixed to opposed side panels of the side panels.

11. The device for killing insects with heat according to claim 1 wherein the at least one sensor further comprising a portable sensor for sensing a temperature of an item located inside the interior space of the enclosure for decontamination wherein the portable sensor transmits the data wirelessly to a controller of the controls that receives the data and can make appropriate adjustments to an operation of at least one of the air heater and the fan.

12. The device for killing insects with heat according to claim 1 wherein at least one of the side panels is provided with at least two handles fixed to the at least one of the side panels and located on an exterior side of the at least one of the side panels.

13. A device for killing insects with heat comprising:
(a) an enclosure comprising:
(i) four rectangular side panels, each side panel having a pair of opposed mitered edges, one mitered edge of the pair of opposed edges of each side panel provided with a female indent and another mitered edge of the pair of opposed edges of each side panel provided with a male protrusion, the male protrusion and female indent of each side panel being complementary to the male protrusions and female indents of the other side panels, each side panel is fixed to two adjacent side panels of said four rectangular side panels by a mitered joint with the male protrusion of each side panel interlocked with the female indent of one side panel of the two adjacent side panels, one of the side panels being provided with an opening for receiving a door for accessing an interior space of the enclosure;
(ii) two rectangular end panels, each of the end panels being fixed to all four of the side panels in an interlocking manner, an interior side of each of the side panels and one of the end panels being provided with stand offs for directing a flow of air in gaps between adjacent stand offs of the stand offs;
(b) an air heater and fan assembly that is fixed to an interior side of one of the end panels located at a top of the enclosure, the air heater and fan assembly comprising a housing that contains a motor that drives a single rotating shaft which turns the blades of a first fan for drawing air from the interior space of the enclosure into the housing and a second fan for pushing air from the housing by at least one electrical heating coil to heat the air and into an air duct system having at least one substantially horizontally extending portion that is fixed to a substantially vertically extending portion for moving the heated air to an opening in the air duct system located in a vicinity of a lowest part of the interior space of the enclosure, the enclosure being completely sealed to prevent an escape of air from the interior space of the enclosure;
(c) at least one sensor for sensing the temperature of heated air in the enclosure; and
(d) controls for controlling an operation of the air heater and fan assembly based at least in part on data provided by the at least one sensor.

14. The device for killing insects with heat according to claim 13 wherein the substantially vertically extending portion of the air duct system is located at a corner of the interior space of the enclosure defined by two adjacent side panels of the side panels.

15. The device for killing insects with heat according to claim 14 further comprising at least one rack disposed in the interior space of the enclosure, the at least one rack having at least two edges that are interlocked with notches in the stand offs in opposed side panels of the side panels.

16. The device for killing insects with heat according to claim 14 further comprising at least one hanger bar disposed in the interior space of the enclosure, the at least one hanger bar having two ends that are supported by hanger bar brackets that are fixed to opposed side panels of the side panels.

17. The device for killing insects with heat according to claim 13 further comprising at least one rack disposed in the interior space of the enclosure, the at least one rack having at least two edges that are interlocked with notches in the stand offs in opposed side panels of said four side panels.

18. The device for killing insects with heat according to claim 13 further comprising at least one hanger bar disposed in the interior space of the enclosure, the at least one hanger bar having two ends that are supported by hangar bar brackets that are fixed to opposed side panels of the side panels.

19. The device for killing insects with heat according to claim 13 wherein the at least one sensor further comprising a portable sensor for sensing a temperature of an item located inside the interior space of the enclosure for decontamination wherein the portable sensor transmits the data wirelessly to a controller that receives the data and can make appropriate adjustments to the operation of the air heater and fan assembly.

20. The device for killing insects with heat according to claim 13 wherein at least one of the side panels is provided with at least two handles fixed to the at least one of the side panels and located on an exterior side of the at least one of the side panels.

\* \* \* \* \*